US008631038B2

(12) United States Patent
Mellmer et al.

(10) Patent No.: US 8,631,038 B2
(45) Date of Patent: Jan. 14, 2014

(54) MANAGING DIGITAL IDENTITY INFORMATION

(75) Inventors: Joseph Andrew Mellmer, Salt Lake City, UT (US); Russell T. Young, Pleasant Grove, UT (US); Arn D. Perkins, Alpine, UT (US); John M. Robertson, Pleasant Grove, UT (US); Jeffrey Neil Sabin, Spanish Fork, UT (US); Michael C. McDonald, Orem, UT (US); Douglas Phillips, Orem, UT (US); Robert Michael Sheridan, Oak Hill, VA (US); Nadeem Ahmad Nazeer, Orem, UT (US); DeeAnne Barker Higley, Provo, UT (US); Stephen R. Carter, Spanish Fork, UT (US); Douglas G. Earl, Orem, UT (US); Kelly E. Sonderegger, Santaquin, UT (US); Daniel T. Ferguson, Orem, UT (US); Farrell Lynn Brough, West Jordan, UT (US)

(73) Assignee: EMC Corporation, Hopkinton, MA (US)

( * ) Notice: Subject to any disclaimer, the term of this patent is extended or adjusted under 35 U.S.C. 154(b) by 1779 days.

(21) Appl. No.: 10/943,090

(22) Filed: Sep. 16, 2004
(Under 37 CFR 1.47)

(65) Prior Publication Data

US 2005/0044423 A1 Feb. 24, 2005

Related U.S. Application Data

(62) Division of application No. 09/670,783, filed on Sep. 27, 2000, now Pat. No. 7,680,819.

(60) Provisional application No. 60/165,344, filed on Nov. 12, 1999, provisional application No. 60/173,432, filed on Dec. 29, 1999, provisional application No. 60/179,953, filed on Feb. 3, 2000, provisional application No. 60/182,642, filed on Feb. 15, 2000.

(51) Int. Cl.
*G06F 7/00* (2006.01)
*G06F 17/30* (2006.01)

(52) U.S. Cl.
USPC ............................ 707/783; 707/784; 707/785

(58) Field of Classification Search
USPC ............................................... 715/507; 707/9
See application file for complete search history.

(56) References Cited

U.S. PATENT DOCUMENTS 5,428,738 A 6/1995 Carter et al. .................. 715/804
5,432,934 A * 7/1995 Levin et al. ..................... 726/16
(Continued)

OTHER PUBLICATIONS

"Let the Robot do it!", pp. 1-6, http://www.prizetower.com/robotformfill.htm.*
(Continued)

*Primary Examiner* — Mariela Reyes
(74) *Attorney, Agent, or Firm* — Barry N. Young

(57) ABSTRACT

A basic architecture for managing digital identity information in a network such as the World Wide Web is provided. A user of the architecture can organize his or her information into one or more profiles which reflect the nature of different relationships between the user and other entities, and grant or deny each entity access to a given profile. Various enhancements which may be provided through the architecture are also described, including tools for filtering email, controlling access to user web pages, locating other users and making one's own location known, browsing or mailing anonymously, filling in web forms automatically with information already provided once by hand, logging in automatically, securely logging in to multiple sites with a single password and doing so from any machine on the network, and other enhancements.

17 Claims, 29 Drawing Sheets

(56) References Cited

U.S. PATENT DOCUMENTS

| | | | | |
|---|---|---|---|---|
| 5,677,851 | A | 10/1997 | Kingdon et al. | 364/514 C |
| 5,692,129 | A | 11/1997 | Sonderegger et al. | 395/200.11 |
| 5,727,163 | A | 3/1998 | Bezos | 705/27 |
| 5,758,344 | A | 5/1998 | Prasad et al. | 707/10 |
| 5,761,499 | A | 6/1998 | Sonderegger | 395/610 |
| 5,781,724 | A | 7/1998 | Nevarez et al. | 395/186 |
| 5,784,560 | A | 7/1998 | Kingdon et al. | 709/201 |
| 5,787,175 | A | 7/1998 | Carter | 713/165 |
| 5,794,259 | A * | 8/1998 | Kikinis | 715/507 |
| 5,818,936 | A | 10/1998 | Mashayekhi | 713/167 |
| 5,828,882 | A | 10/1998 | Hinckley | 719/318 |
| 5,832,487 | A | 11/1998 | Olds et al. | 707/10 |
| 5,859,978 | A | 1/1999 | Sonderegger et al. | 709/226 |
| 5,870,564 | A | 2/1999 | Jensen et al. | 709/241 |
| 5,878,415 | A | 3/1999 | Olds | 707/9 |
| 5,878,419 | A | 3/1999 | Carter | 707/10 |
| 5,892,828 | A | 4/1999 | Perlman | 380/25 |
| 5,893,116 | A | 4/1999 | Simmonds et al. | 707/201 |
| 5,893,118 | A | 4/1999 | Sonderegger | 707/203 |
| 5,913,025 | A | 6/1999 | Higley et al. | 726/4 |
| 5,915,253 | A | 6/1999 | Christiansen | 707/103 R |
| 5,916,310 | A | 6/1999 | McCain | 710/67 |
| 5,933,826 | A | 8/1999 | Ferguson | 707/9 |
| 5,960,411 | A | 9/1999 | Hartman et al. | 705/26 |
| 5,991,810 | A | 11/1999 | Shapiro et al. | 709/229 |
| 5,999,932 | A * | 12/1999 | Paul | 707/10 |
| 6,000,832 | A | 12/1999 | Franklin et al. | 700/232 |
| 6,016,499 | A | 1/2000 | Ferguson | 707/104 |
| 6,029,247 | A | 2/2000 | Ferguson | 713/201 |
| 6,047,312 | A | 4/2000 | Brooks et al. | 709/203 |
| 6,061,740 | A | 5/2000 | Ferguson et al. | 709/246 |
| 6,061,743 | A | 5/2000 | Thatcher et al. | 709/302 |
| 6,067,572 | A | 5/2000 | Jensen et al. | 709/241 |
| 6,073,138 | A * | 6/2000 | de l'Etraz et al. | 707/104.1 |
| 6,076,166 | A * | 6/2000 | Moshfeghi et al. | 726/4 |
| 6,081,900 | A | 6/2000 | Subramaniam et al. | 713/201 |
| 6,105,069 | A | 8/2000 | Franklin et al. | 709/229 |
| 6,108,619 | A | 8/2000 | Carter et al. | 704/9 |
| 6,108,649 | A | 8/2000 | Young et al. | 707/4 |
| 6,112,228 | A | 8/2000 | Earl et al. | 709/205 |
| 6,119,230 | A | 9/2000 | Carter | 713/200 |
| 6,148,342 | A * | 11/2000 | Ho | 709/225 |
| 6,192,380 | B1 * | 2/2001 | Light et al. | 715/505 |
| 6,199,079 | B1 * | 3/2001 | Gupta et al. | 715/507 |
| 6,253,202 | B1 * | 6/2001 | Gilmour | 707/9 |
| 6,505,230 | B1 * | 1/2003 | Mohan et al. | 709/202 |
| 6,643,624 | B2 * | 11/2003 | Philippe et al. | 705/26 |
| 2002/0013788 | A1 * | 1/2002 | Pennell et al. | 707/507 |

OTHER PUBLICATIONS

Frank Ueckert, Michael Goerz, Maximilian Ataian, Sven Tessmann and Hans-Ulrich Prokosch, Empowerment of patients and communication with health care professionals through an electronic health record, International Journal of Medical Informaticsvol. 70, Issues 2-3, , MIE 2002 Special Issue, Jul. 2003, pp. 99-108.*

* cited by examiner

MANAGING DIGITAL IDENTITY INFORMATION

RELATED APPLICATIONS

The present application claims priority to and incorporates the content (e.g., claims, textual description, drawings) of the following commonly owned copending provisional applications: Ser. No. 60/165,344 filed Nov. 12, 1999; Ser. No. 60/173,432 filed Dec. 29, 1999; Ser. No. 60/179,953 filed Feb. 3, 2000; and Ser. No. 60/182,642 filed Feb. 15, 2000 ("incorporated applications").

This application also claims priority and the benefit as a division of U.S. Ser. No. 09/670,783, filed Sep. 27, 2000, now U.S. Pat. No. 7,680,819 entitled "Managing Digital Identity Information."

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The copyright owner does not hereby waive any of its rights to have this patent document maintained in secrecy, including without limitation its rights pursuant to 37 C.F.R. §1.14.

FIELD OF THE INVENTION

This application relates generally to computer networks, and relates more particularly to the manner in which personal information of network users is managed within a global computer network.

TECHNICAL BACKGROUND

The number and variety of services and products available on the Internet, and in particular on the World Wide Web, has grown dramatically in recent years. Hundreds of new web sites go online every day. People can buy products and services, communicate with others worldwide for business or personal reasons, and access enormous amounts of information on many different topics.

Infrastructure to support various online activities is growing. For instance, electronic business card documents are known; see, e.g., http://www.oasis-open.org/cover/rifkinX-Marks.html, and http://www.imc.org/pdi/vcardwhite.html. Using a Palm Computing device IR port to beam business cards, phone lists, memos, and add-on applications to other IR-enabled Palm Computing devices is also known. Beaming payments directly from a credit card or bank account is also apparently already known; see http://www.herring.com/insider/1999/0723/vc-confinity.html.

In addition, the identity space generally includes entities such as ezlogin.com, PassLogix, Inc., populardemand, SuperProfile, Zcentral.com, Jotter@Your Service, PrivacyBank.com, PrivaSeek, Microsoft Passport, verticalone.com, Zero-Knowledge Systems, Brodia-Remote Control Shopping, Anonymizer, Virtual Backpack, InterTrust Technologies, Corporation ProxyMate, ePassword Keeper, MSN MoneyCentral, yourcommand, and perhaps others.

A book entitled *Net Worth: Shaping Markets When Customers Make the Rules* (Hagel and Singer, Harvard Business School: January 1999) introduced a new Internet marketing term, "infomediary". Essentially, an infomediary is an agent that acts on a user's behalf to interact with online sites based on the policies the user creates. For example, with the help of an infomediary, a user could put out what amounts to a personal Request For Proposal (RFP) in search of the best deals for a product or service. A user might even use an infomediary to exchange valuable Profile information for discounts or even cash. The infomediary could then use the power of demand to get better deals, thus creating a more competitive environment.

It should also be noted that documents being made of record in the Patent Office in this matter describe various goods and/or services which are already available to Internet users.

However, even technically sophisticated users of the Internet have expressed frustration with aspects of Internet usage. For instance, the '432 provisional application includes an article by Novell systems engineer Carrie Oakes entitled "The Human Face of NDS". This article points out problems such as the tedium of providing the same personal information time and again at different web sites, and the risk of unscrupulous use of private information. It also discusses an embodiment of the present invention in the form of Novell DigitalMe™ technology. DIGITALME is a trademark of Novell, Inc.

Other articles in the '432 provisional application also discuss the DigitalMe™ technology, Novell Directory Services ("NDS") technology, the marketplace for tools that help Web users control their personal information, and the need for such tools. Discussions in the incorporated applications of previous technology, illustrations of the need for control over personal information online, and other aspects of the technical background of the present invention are specifically incorporated herein by this reference. Underlying technology such as NDS is also discussed at appropriate points in the description of the invention later in this document, and in other materials that will be made of record in this document's Patent Office file. NDS is a registered trademark of Novell, Inc.

Review of such materials in the present context shows that it would be an advance in the art to provide better ways to manage personal information on the Internet. For instance, improvements are needed to reduce user tedium, to increase users' control over their private information, and to provide better ways to manage personal information according to the relationship of the parties involved.

Such improvements are disclosed and claimed herein.

BRIEF SUMMARY OF THE INVENTION

With the popularity of use of the Internet increasing, concerns arise regarding how to manage a user's digital identity. For instance, how a user logs on to a certain web site and how the user provides authentication credentials are areas that call for significant technology improvements.

The present invention provides tools and techniques to manage digital (e.g., online or connectable) identity information to support policies and membership in communities. In various embodiments, it helps provide and maintain the integrity of relationships, and helps provide reliable information access, within a secured storage platform using an extensible schema. Thus, the invention relates generally to computer software and networks, and more particularly, to a system and method for enabling users to manage their digital identities in a computer network environment such as the Internet or other network. The invention provides improved technologies for maintaining, leveraging and controlling relationships between users, or between users and any on-line entity.

Various software tools provided include an identity server, zero-byte and full featured clients, web server enhancements, and rapid application development tools. Industry standard protocols such as SSL, HTTP/HTTPS, LDAP are used wherever appropriate to provide secure access for user-administered account management of identity information such as Profiles, relationships, an address book, automatic form fill data, autologin, and the like.

In one embodiment, the identity server holds new Novell Directory Services ("NDS") objects created for Novell's DigitalMe™ technology, such as Safe objects and Vault objects, and other services, such as account creation and NDS itself. Both Safe objects and Vault objects are container objects. Each Safe object belongs to and is managed by a particular DigitalMe™ user. The user stores his or her identity information in this Safe object. By default, only the user has rights to the Safe object, since administrative rights are filtered. As the owner of the Safe object (and by extension the information contained therein), each user can set policies to determine access to his or her own information.

A Vault object can hold Safe objects and other Vault objects. There can be multiple Vault objects within a single NDS tree. A Vault object can be created as a subordinate container object to Organization, Organizational Unit, Locality, Domain, or other Vault objects. Multiple levels of Vault objects enable a hierarchy for ease of management and partitioning. A company such as an ISP hosts the Vault object and creates a policy for each User object. This policy can limit the resources the user consumes or set password and login restrictions. Although the host company creates policies for User objects and provides the physical storage for the DigitalMe™ information, this company does not manage Safe objects and all of the information stored in these objects. Only the user has rights to his or her Safe object.

In one embodiment, the Vault object is defined in three layers. An Access Protocol layer allows users to access their information via industry standard protocols such as Lightweight Directory Access Protocol (LDAP) and HTTP. Secure Sockets Layer (SSL) encryption is preferably available on top of both protocols to ensure security during the transmission of the data. An Identity Server layer extends LDAP and HTTP to provide additional access to data stored in the Vault object. These extensions provide functionality such as secret store technology, transparent access to files stored at file locations in NDS, and the ability to set file access rights. The identity server functions as an NDS access point and does not need to execute on every server in the NDS tree. An Identity Management layer uses standard NDS authentication and authorization methods, for instance, to control access to information. Like any network operating system, Novell NetWare can be vulnerable to intruders who have physical access to the server. To protect confidential information such as passwords and credit card numbers from any intruders, some DigitalMe™ information is stored in NDS using encryption such that a host company cannot change a user's password and then log on as the user to obtain the user's secrets.

Users may access the identity server using a zero-byte client. Internet users do not have to install a special DigitalMe™ client; they simply need a browser such as Netscape Navigator 4.x or Internet Explorer 4.x. When an Internet user wants to access DigitalMe™ feature, lightweight JavaScript and Java applets are downloaded from the DigitalMe™ web site. This zero-byte client then accesses the identity server using standard protocols such as SSL, HTTP, or LDAP.

When the Internet user logs in to a DigitalMe™ web site, that user is prompted to enter NDS credentials such as a password. The user is then presented with a Profiler, which is a graphical book that holds the user's Profiles and provides management tools to help the user manage his or her information. The Profiler displays only the user's information; the Profiler doesn't allow access to any other objects in the NDS tree. In addition, the Profiler provides various services. For instance, with an Account Management service, users can edit unique credentials within their User object. For example, they can change their passwords or set user-defined preferences such as being listed or not being listed in the public address book.

With a Profiles service, users can view, create, edit and delete Profiles, which are displayed graphically as "meCards". Profiles include text fields as well as graphical fields. For example, a user can create a business Profile with a professional picture, a personal Profile with a sound file, or an anonymous Profile without a picture. With a Relationships service, users can create, delete, and edit relationships to the meCards. For example, a user can create a Profile that contains anonymous information and then grant a web site or a Group object access to that information. With an Address Book service, users can keep a personal address book of Contacts. The address book also allows the user to send meCards via standard e-mail clients. With an Auto-Form Fill service, the zero-byte client can use the identity information in the User object to automatically complete an HTML form for the user. The zero-byte client can save credentials for future access to this web site. With an Autologin service, the zero-byte client logs the user in with the appropriate credentials when a user browses a web site that requests a username and password. Thus, the user has a kind of "single sign-on" to the Internet and does not have to remember multiple Internet identities.

Other services are also possible, such as email blocking, a web switchboard to locate other users, and web publishing management. Moreover, different embodiments may provide various combinations of these and other services for managing digital identity information as disclosed and claimed herein. Other features and advantages of the invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

The present invention relates to methods, articles, signals, and systems for managing digital identity information, such as an Internet user's name, addresses, credit card numbers, and other personal information of individuals and/or businesses. Discussions in the incorporated applications of technical aspects of the present invention are incorporated herein by this reference.

Systems Generally

Figure 1:
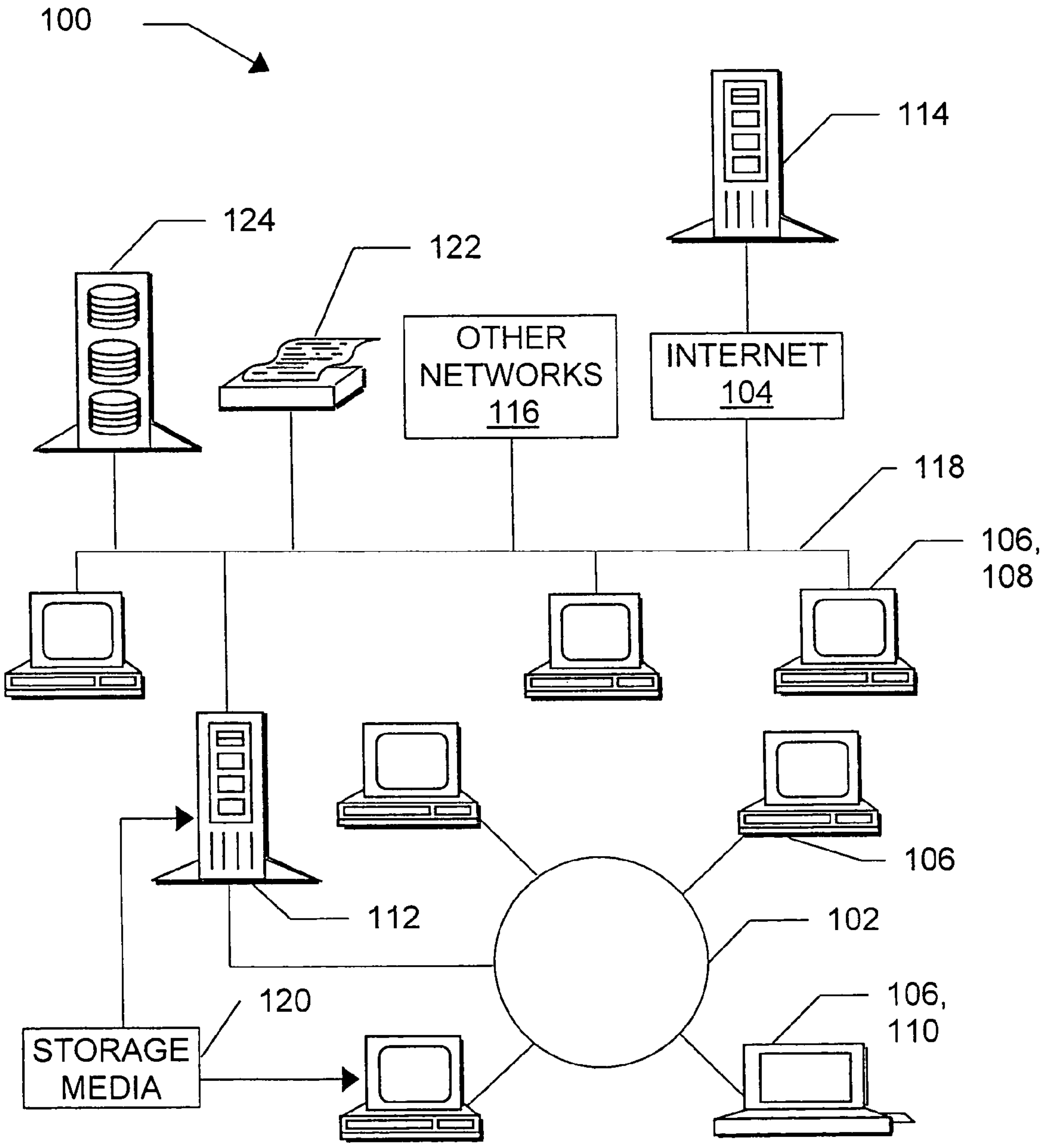
FIG. 1 is a diagram illustrating network operating environments for systems and methods according to the invention.

FIG. 1 illustrates some operating environments 100 for systems according to the invention. The environment may include individual computers and computer networks which have been configured through software and/or special-purpose hardware to operate according to the invention. Suitable computer networks include, by way of example, local networks 102, wide area networks, and/or the Internet 104. "Internet" as used herein includes variations such as a private Internet, a secure Internet, a value-added network, a virtual private network, or an intranet, as well as the global computer network which includes the World Wide Web. User computers 106 employed according to the invention may be workstations 108, laptop computers 110, disconnectable mobile computers, LAN servers 112, computing clusters, mainframes, or a combination thereof. Suitable machines 106 include, without limitation, personal computers available from Apple, from vendors of "IBM-compatible" computers, and from vendors of handheld computing devices. Web server and other remote server 114 computers provide information to user computers 106, and are primarily responsible for otherwise managing digital identity information as described herein. The hardware of computers 106, 112, 114 may initially be general-purpose, special purpose, stand-alone, and/or embedded; general-purpose hardware is configured by software to operate according to the invention. The local network 102 may include or connect to other networks 116, such as one or more LANs, wide-area networks, wireless networks (including infrared networks), Internet servers and clients, intranet servers and clients, or a combination thereof, through a gateway or similar mechanism.

The networks 102, 104, 116 or portions thereof may include Novell NetWare® network operating system software (NETWARE is a registered trademark of Novell, Inc.), NetWare Connect Services, VINES, Windows NT, Windows 95, Windows 98, Windows 2000, LAN Manager, or LANtastic network operating system software, UNIX, Linux, TCP/IP and NFS-based systems, Distributed Computing Environment software, SAA software (VINES is a trademark of Banyan Systems; NT, WINDOWS 95, WINDOWS 98, WINDOWS 2000, and LAN MANAGER are trademarks of Microsoft Corporation; LANTASTIC is a trademark of Artisoft; SAA is a mark of IBM).

One system according to the invention uses several servers 112, 114 that are connected by network signal lines 118 to one or more network clients 106. The servers 112, 114 and network clients 106 may be configured by those of skill in the art in a wide variety of ways to operate according to the present invention. The servers 112, 114 and clients 106 may be uniprocessor or multiprocessor machines. The servers 112, 114 and clients 106 each include an addressable storage medium 120 such as random access memory and/or a non-volatile storage medium such as a magnetic or optical disk. The signal lines 118 may include twisted pair, coaxial, or optical fiber cables, telephone lines, satellites, microwave relays, modulated AC power lines, RF connections, other wireless connections, and/or other data transmission "wires" known to those of skill in the art. Signals according to the invention may be embodied in such "wires" and/or in the addressable storage media 120.

In addition to the computers 106, 112, a printer 122, an array of disks 124, and/or other peripherals may be attached to a particular local system 102. A given computer 106 may function both as a client and a server; this may occur, for instance, on computers 106 running Microsoft Windows NT software. Although particular individual and network computer systems and components are identified here, those of skill in the art will appreciate that the present invention also works with a variety of other networks and computers.

The servers 112, 114, and the network clients 106 are capable of using floppy drives, tape drives, optical drives or other means to read the storage medium 120. A suitable storage medium 120 includes a magnetic, optical, or other computer-readable storage device having a specific physical substrate configuration. Suitable storage devices include floppy disks, hard disks, tape, CD-ROMs, PROMs, RAM, flash memory, and other computer system storage devices. The substrate configuration represents data and instructions which cause a computer system to operate in a specific and predefined manner as described herein. Thus, the medium 120 tangibly embodies a program, functions, and/or instructions that are executable by the servers 112 and/or servers 114 and/or network client computers 106 and/or other computers to perform identity information management steps of the present invention substantially as described herein. The invention also provides novel signals which are used in or by such programs. Inventive signals may be embodied in computing systems, in computer-readable storage media (volatile and/or non-volatile), and/or in "wires", RAM, disk, or other storage media or data carriers in a network such as the network.

Suitable software and/or hardware implementations of the invention are readily provided by those of skill in the art using the teachings presented here and programming languages and tools such as Java, Pascal, C++, C, Perl, shell scripts, assembly, firmware, microcode, logic arrays, PALs, ASICs, PROMS, and/or other languages, circuits, or tools.

DigitalMe™ System Architecture and Overview

The invention is described with particular reference to Novell's DigitalMe™ system and services architectures, including particular software components, which embody and/or illustrate the invention. However, other embodiments of the invention are also possible. Like other commercial goods and services, DigitalMe™ designs and implementations are also subject to change. This discussion begins with a general overview of DigitalMe™ architecture and then moves through to more detailed architectural layers.

Personal information is an important asset in the online marketplace, both to the person who owns that information and to the web sites which that person uses. Successful online merchants collect information profiles on their customers so they can improve their sales. Many merchants also purchase such information from other merchants. On one hand, this is a useful and proper enterprise; vendors need to know about the users to ensure the validity of transactions, and marrying customer interests with offerings is an accepted marketing practice. On the other hand, abuses have occurred. Companies sometimes gamer information without the surfer's knowledge or consent. They sometimes sell the information or inundate the Internet user with unwanted promotional advertising ("spam"). As a result, individuals increasingly want more control over the data about themselves that is collected over the Internet. Governments and advocacy groups are in turn taking a greater interest in the protection of people's personal information. The DigitalMe™ products and services help empower individuals to control the many pieces of personal information that are shared over the Internet. When this information is protected, organized, and presented to the user, services and application can be added to build on this core.

The summation of a person's personal data can be termed a "digital identity". In some cases, the user is assigned new information that is required to interact with an online entity, such as a member ID. Other personal information includes postal addresses, email addresses, telephone and fax numbers, credit card numbers, and so on.

Figure 2:
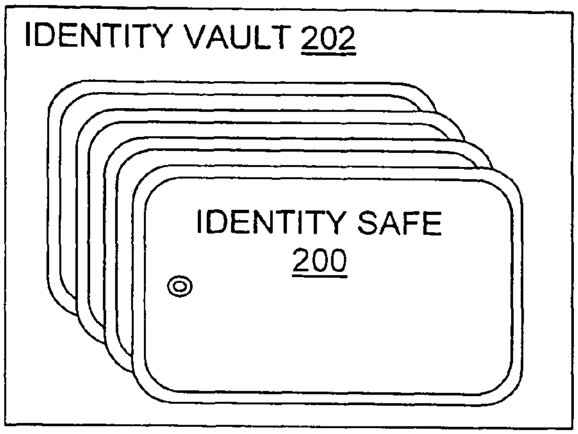
FIG. 2 is a diagram illustrating the relationship between identity data safes and vaults according to the invention.

Since much of the information a person chooses to save using DigitalMe™ products and services is private, access is preferably limited to entities that have been authorized by the user to see this data. Also, when the data is sent and retrieved it is preferably encrypted to protect it from abuse. The high level of protection preferably afforded by DigitalMe™ products and services is reflected in the naming of storage mechanisms: the single user's data is stored in a "Safe" and multiple Safes are kept in a "Vault". This relationship between Safes 200 and a Vault 202 is illustrated in FIG. 2.

Figure 3:
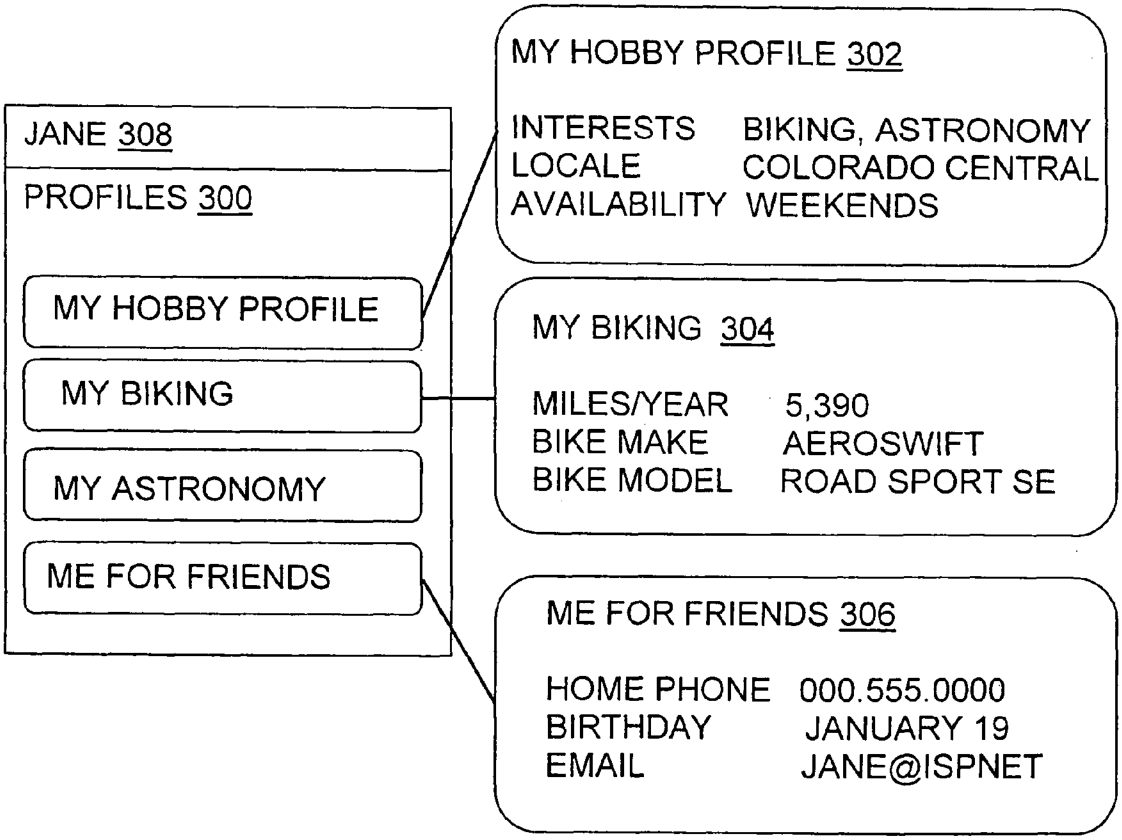
FIG. 3 is a diagram illustrating user profiles according to the invention.

As there are many aspects of a person's real identity, there can also be many aspects of a DigitalMe™ digital identity; these multiple aspects are called "Profiles". FIG. 3 illustrates a set of Profiles 300 for a user object 308 for a user named Jane. As shown in FIG. 3, a Profile 300 can contain other Profiles, e.g., Profiles 302, 304, 306. Jane discloses parts of her digital identity, such as her hobbies and personal email address, in particular Profiles 300. The different Profiles 300 for a given user may contain distinct pieces of identity data, or they may share certain pieces of data, e.g., a user's work phone number may appear in more than one Profile 300 of that user.

A Profile 300 can exist for more than just individuals. Companies also have a digital identity and different Profiles 300 which they disclose at various times to other entities. Services can also have an identity with various Profiles 300.

Figure 4:
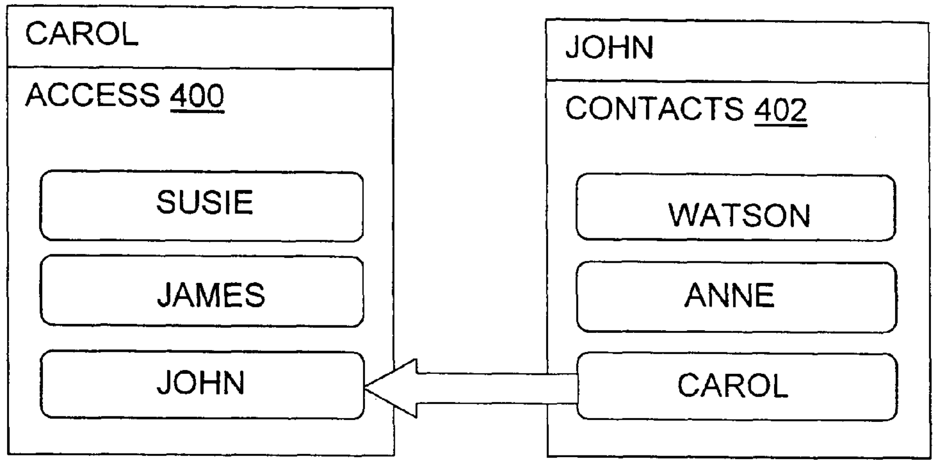
FIG. 4 is a diagram illustrating user contacts and access granted according to the invention.

DigitalMe™ products and services provide ways for individuals (including private persons and/or companies, organizations, etc.) to voluntarily exchange their information by sharing a Profile 300. In FIG. 4, user Carol gives user John access by identifying John in an access list 400 and John includes Carol in his Contacts list 402. Carol defines the Profile and DigitalMe™ tools and techniques grant appropriate rights to the access structure 400. As shown in the diagram, an access structure 400 can have multiple accessors, e.g., Susie, James, and John.

Summary of DigitalMe™ Architectural Features

The following discussion lists some of the benefits of the inventive architecture as embodied in existing or proposed DigitalMe™ products and services.

The end user is a beneficiary. For instance, information exchange over a network is consensual, rather than covert as is often the case with "cookie" data structures that are placed on clients by servers. The Safe 200 guards information about the user. User-defined Profiles 300, accesses 400, and accessors give the user control over the data that is available to other entities on the Internet. In addition, DigitalMe™ architecture allows personalized relationship data to be stored on the network, and allows it to be re-used from any computer 106 which that particular user logs in from. An identity server 114/510 holds a user's data and a web server 114/504 running inventive servlets 508 makes the data available and usable from any client computer 106.

A web-enabled organization may also be a beneficiary. An organization can establish a community with valuable (and voluntary) customer/member data. An organization can purchase marketing data from an infomediary, which has obtained and stored identity information of users. Organizations or infomediaries can install an identity server and maintain a community of interested entities. Users maintain the contents of a Vault 202 (a collection of Safes 200), in which identity information is stored. Also, an organization can purchase marketing data from an infomediary, which has obtained and stored identity information of users. An identity protocol facilitates exchange of identity information among multiple identity servers 114 and applications which are written to a suitable identity exchange protocol. Some relationships define an ongoing exchange of information such as frequent flier miles, a person's change of address, and a change of credit card. Rules can define an automatic exchange of information and the agreed-upon mechanism for exchange. In a similar manner, the Vault 202 itself can synchronize with other Vaults, in a manner that is reminiscent of (and/or is supported by) replica synchronization in NDS.

Application programmers may also benefit. Programmers can write applications to access identity services through the DigitalMe™ Application Program Interface ("API"). Java and OLE automation (e.g., COM) language bindings can provide access to the DigitalMe™ API. Rapid Application Development ("RAD") tools can accelerate the development cycle. An abstracted storage model allows programmers to write without regard to the underlying storage, whether it is a file system or Novell Directory Services storage. Storage providers tailored for particular requirements can be deployed without affecting program implementation. In fact, storage providers can be chosen at runtime based, for example, on resource analysis. All storage functions that modify data preferably generate notifications. Clients can subscribe to the notifications of any object, such as access control lists, folders, files, and attributes.

NDS Software

Novell Directory Services ("NDS") software is a preferred tool to implement the DigitalMe™ technology. NDS technology is an evolving tool, but it is generally familiar to many of skill in the art. Recent changes to Novell directory services include NDS version eight, which scales to support over one billion objects with outstanding performance; cross-platform support for popular operating systems such as Solaris, Windows NT, and Linux; and directory-enabled third-party devices and third-party applications.

One can create NDS objects for user, files, printers, application, databases, routers, and policies. After creating these objects in an NDS tree, one has tools to manage the relationships between these objects. Users also benefit because their network resources are available to them whenever and wherever they log in. NDS technology also allows for disparate database systems to use NDS as the gatekeeper for authentication. For example, NDS software integrates with PeopleSoft, Oracle for NetWare, Windows NT applications, and Novell's secret store technologies (marks of their respective owners). For more information about NDS and PeopleSoft, see "NDS Integration for PeopleSoft: Bridging the Gap Between Human Resources and IT," NetWare Connection, June 1999, pp. 28-33. For more information about Novell's secret store technologies, visit http://www.novell.com/corp/security/nds.html, or see "With NICI It's All Holes Barred," NetWare Connection, December 1998, pp. 8-20. One can download this article from http://www.nwconnection.com/past.

With proper schema extensions, NDS provides capabilities that are useful in the DigitalMe™ technology and possibly also in other implementations of the present invention.

As to identity, names in an NDS tree are unique. Although it does not know everything about a given user, NDS knows exactly who the user is and the environment in which the user object exists, with respect to that directory services context. In addition, identities in NDS can have rich and descriptive relationships, so one can store a variety of information. The personal information and these policies help create a digital representation of users.

As to policies, because NDS provides granular access control, one can easily manage and control access to one's information. For example, a user can grant a person the rights to read, but not modify, only one characteristic of the user's digital identity. The user can grant close associates the right to view the user's telephone number but prevent everyone else from viewing this information. If the user wants to make certain information public, the user can establish a policy that enables everyone to view this information.

As to membership in communities, NDS has an inherent ability to represent communities of interest. For example, one can create a group object to represent people who have the same common interest, such as diving. NDS then allows one to control the relationships one has with one's communities of interest. To determine what information will be available to each community that a user belongs to, one can create policies in NDS.

As to integrity of relationships, NDS support consistency despite changes. One's personal information changes at times. One's interests, address, telephone number, the place that one works, is all subject to change. A user's relationships to other people and their relationships to the user should not break when the user's information changes.

As to reliable information access, the information that is stored in a User object or in another replicated object is automatically fault tolerant. NDS provides this fault tolerance behind the scenes by replicating and distributing information in more than one place. If information is unavailable from one server, NDS finds another server that has the information and retrieves it, transparently. Replicating information to provide system fault tolerance is an important requirement for Novell's DigitalMe™ technology. After all, if one stores a copy of one's digital identity in a digital Safe, that identity is preferably always available to those to whom one has granted access. In addition, one must be able to access the replicated information with a variety of applications. Because NDS is standards based, one can access the replicated information through standard protocols, such as Lightweight Directory Access Protocol (LDAP). Supporting standards ensures compatibility with a variety of applications.

As to providing a Secured Storage Platform, NDS was developed from the ground up to be a secure repository. Novell has also enhanced NDS systems with open standards security services, such as an international cryptographic infrastructure, an enhanced authentication service, and a manageable, directory-integrated Public Key Infrastructure Service (PKIS). Many third-party security companies are using different types of security access methods (such as digital certificates, smart cards, and biometrics) to authenticate people to NDS. This kind of security is important if Internet users are to trust their information to a digital Safe.

As to flexibility, NDS provides an extensible schema, so the NDS directory service is able to accommodate new types of objects. Because NDS has an extensible schema, one can add new types of objects to NDS. These objects can automatically take advantage of all NDS services. As a result, new innovative services can be easily directory-enabled; an example is provided by Novell's ZENworks products for desktop management. ZENWORKS is a trademark of Novell, Inc.

Other data manipulation systems, such as other directories, databases, file systems, and/or authentication mechanisms, may be used with or in place of NDS software in particular embodiments of the invention.

High-Level Architecture

Figure 5:
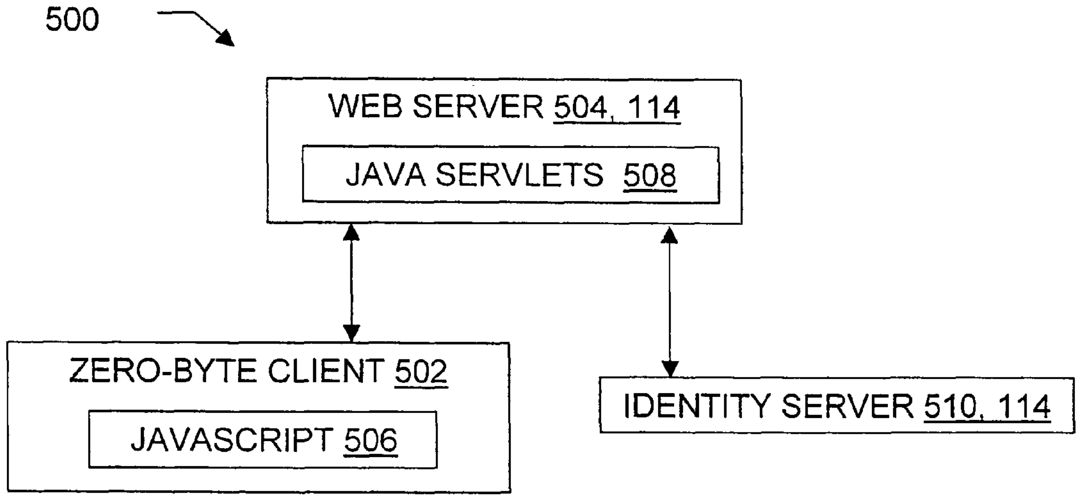
FIG. 5 is a diagram illustrating a user's zero-byte client, a web server, and an identity server according to the invention.
Figure 40:
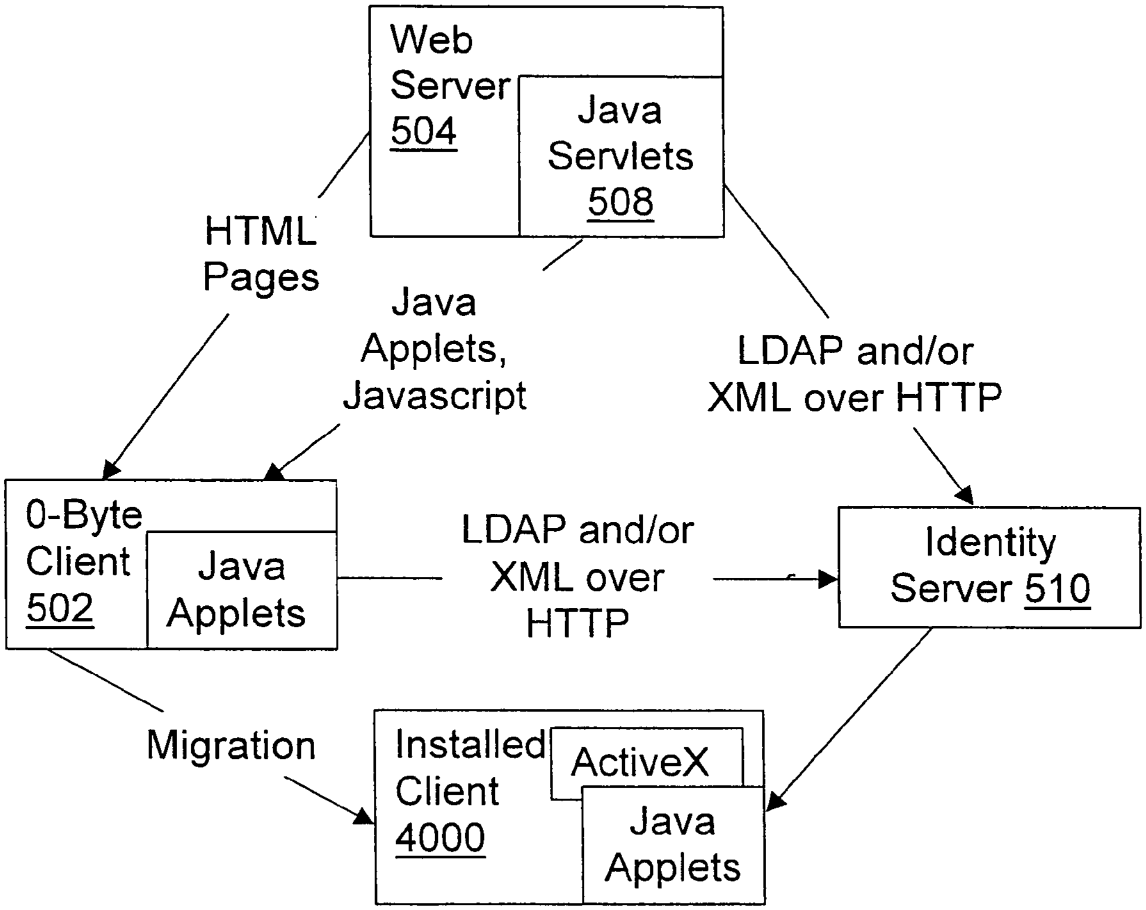
FIG. 40 is a diagram illustrating an alternate architecture according to the invention, including an identity server, a web server, and a zero-byte client which migrates into an installed client.

FIG. 5 illustrates a DigitalMe™ architecture 500 including several architectural modules. A zero-byte client 502 may initially be a generic Internet client without DigitalMe™ software installed. The zero-byte client 502 accesses DigitalMe™ functionality through a web server 504 as HTML with JavaScript 506 served by a servlet 508. The web server 504 acts as a proxy to an identity server 510 for zero-byte clients 502. In some embodiments, a user can migrate a zero-byte client 502 to an installed client 4000, as shown in FIG. 40, for example. The installed client 4000 resides on the client machine 106 as an installed application. The zero-byte client 502 plus the web server 504 with servlets 508 are functionally similar or identical with the installed client 4000, with respect to a user 106 at the machine 106 who is sending, receiving, and using digital identity information according to the invention.

The identity server 510 holds the Vault 202 and its Safe(s) 200. Other services may also be hosted on the identity server 510, such as account creation and NDS services. The web server 504 may initially be a generic web server. It is configured to run DigitalMe™ Java servlets 508, or configured as an application server, or as a server using CGI, Pearl, ASP software, or other middleware. The configured server 504 serves up web pages with JavaScript 506 to zero-byte clients 502. It also retrieves identity data from clients 106 (zero-byte or installed) and stores that data on the identity server 510.

Architecture in Greater Detail

Figure 6:
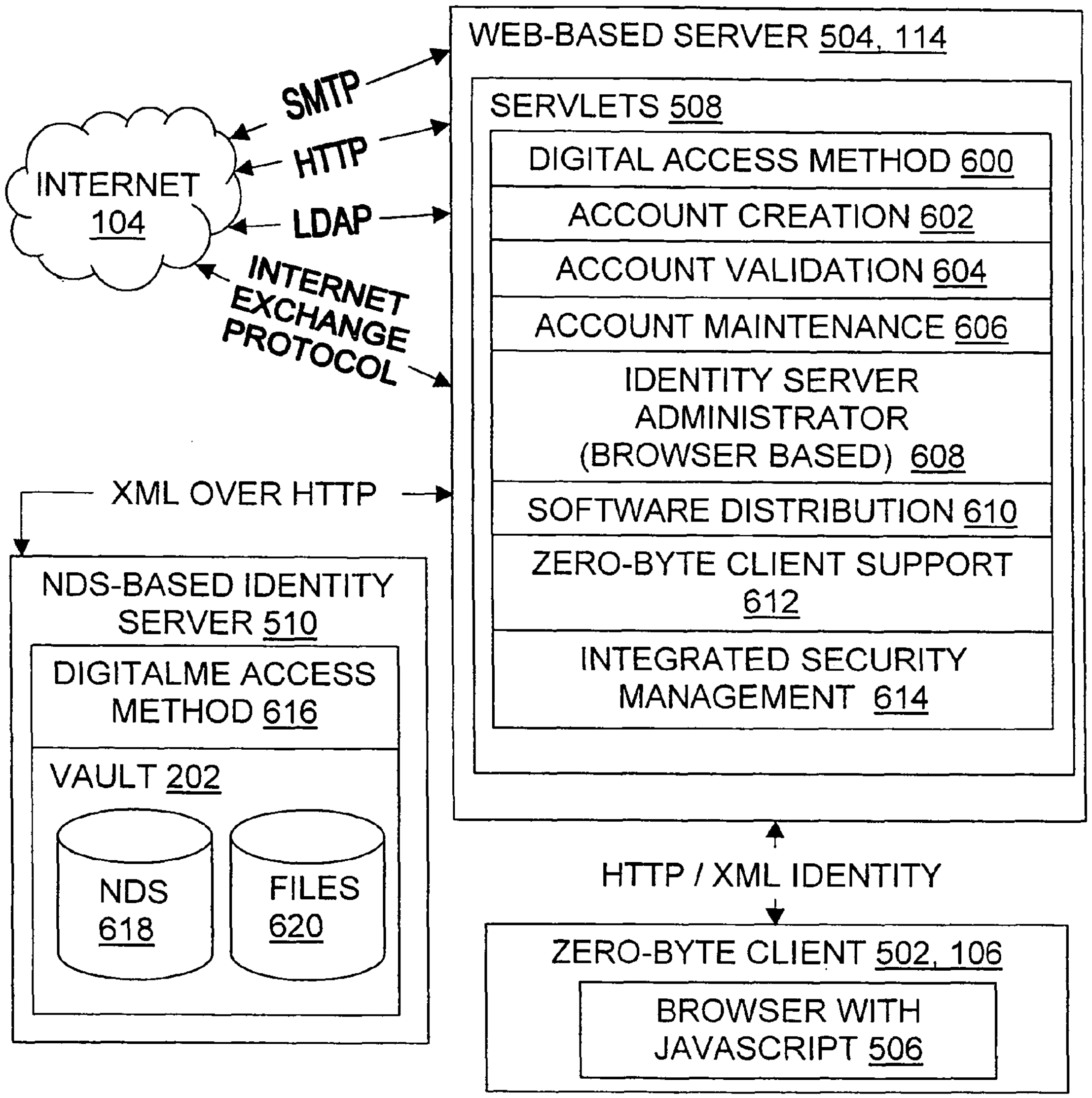
FIG. 6 is a diagram further illustrating the user's zero-byte client, the web server, and the identity server in one embodiment according to the invention.

FIG. 6 illustrates in greater detail one version of the DigitalMe™ architecture of FIG. 5; FIGS. 7, 13, 40, and 41 further illustrate possible architectures for implementing the present invention. One operating environment includes a browser 1314 configured with JavaScript 506. The user's browser 1314 receives HTML pages with JavaScript and Java applets that provide DigitalMe™ functionality and access to identity data stored in NDS storage 618. On a zero-byte client 502, these pages are served up by the web server(s) 504; on an installed DigitalMe™ client 4000, the pages are generated from data on the identity server 510. The web server 506 can use basic server hardware and software having brands such as Solaris, Linux, Windows NT, or NetWare (marks of their respective owners), so companies can use their existing environment to host Novell's DigitalMe™ technology.

Some applications 1300 possible with these architectures include automatic web form fill-in, an identity toolbar, contact lists, a drop box, and various third-party applications that use the identity access method, such as e-commerce applications, community applications, anonymity applications, and so forth.

Servlets 508 hosted on the web server 504 provide access to and management of identity information on the NDS-based identity server 510. A servlet-supported DigitalMe™ access method 600 is the programmer's primary interface to identity data stored in the Vault 202. This component 600 offers a high level representation of identity, Profiles 300, and Profile access. The server 504 side uses the same access method as the installed client 4000.

In many embodiments, account creation 602, validation 604, and maintenance 606 servlets offer the functions of creating new accounts, verifying that the accounts are unique, and maintaining those accounts. An identity server administration application 608 is a Java-based application hosted by the web server 504. A software distribution module 610 distributes software, such as client software. A zero-byte client support module 612 supports drawing web pages from identity data and serving them up to DigitalMe™ users. The web server 504 can also serve up Java applets for the client 106 as required by DigitalMe™ applications. A certificate management module 614 or other integrated security management module may be present, so the web server 504 can be called upon to create certificates and/or otherwise manage identity security.

On the NDS-based identity server 510, a DigitalMe™ access method 616, such as one comprising layers 700 and 702, provides programmatic access to identity data stored in the Vault 202. The access method may be implemented using Java servlets. The access method models are all preferably provided in both OLE Automation (COM) 4100 and Java 4102 language bindings 4104. An HTTP stack (HTTP protocol) is implemented natively on the NDS server, e.g., as httpstk.nlm for NetWare servers 510.

The Vault 202 is a secure storage place for user Safes 200. The Vault 202 saves user identity information as NDS 618 attribute values and/or files 620. The Vault 202 is preferably protected by at least NDS authentication technology, along with encryption of user form secrets such as passwords. Users own their respective Safe(s) 200 (and by extension the data therein) and can determine access to data in their Safe(s). The identity Vault 202 is a collection of one or more Safes 200. In one embodiment, an identity Vault 202 encompasses an entire NDS tree but does not include multiple trees.

Figure 7:
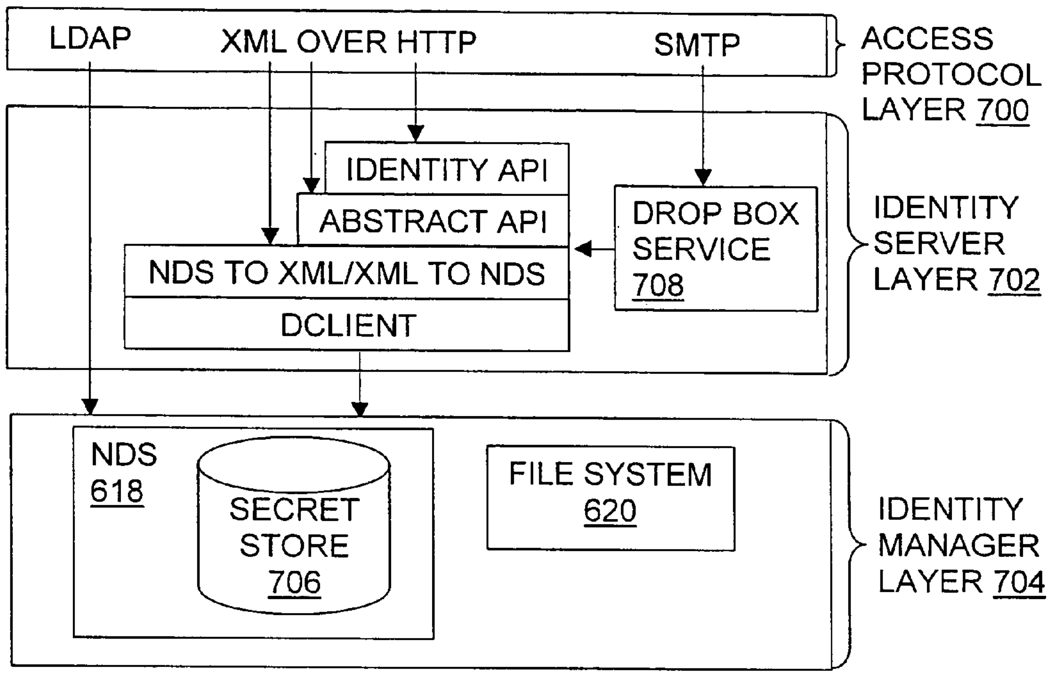
FIG. 7 is a diagram further illustrating one identity server according to the invention.

The identity Vault 202 provides storage of, and controlled access to, the identity data. In one embodiment, the identity Vault 202 is defined in three layers as illustrated in FIG. 7, namely, an access protocol layer 700, an identity server layer 702, and an identity manager layer 704. By way of the access protocol layer 700, industry standard protocols help provide access to the identity data, e.g., protocols such as LDAP, XML RPC-over-HTTP, XDAP (an XML version of LDAP), and/or SMTP. Secure Sockets Layer (SSL) encryption is preferably used to ensure security during the transmission of the data.

Figure 41:
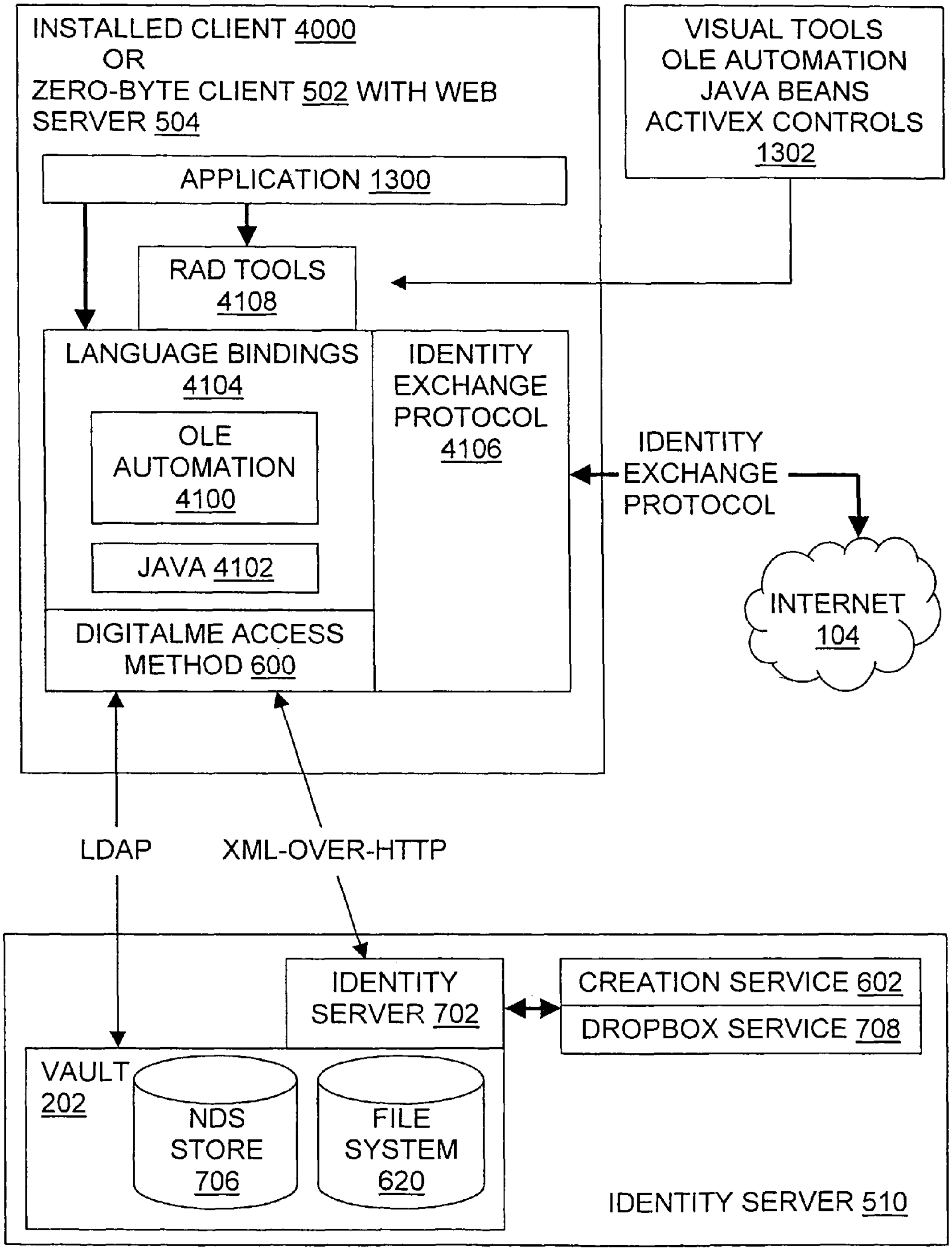
FIG. 41 is a diagram illustrating an alternate architecture according to the invention.

To emphasize the possibility of varying module definitions when implementing the invention, FIG. 41 shows an identity exchange protocol 4106 separate from the digitalme access method 600, rather than grouping the access protocol 700 with the API(s) and code 702 to form access method 616.

More generally, it will be understood that the Figures are not necessarily consistent with one another because the invention may be implemented in various ways, and more than one embodiment is being described herein. In particular, code functions may be grouped into modules, layers, or other components in various ways. Also, objects which are shown in the Figures as separate may be combined in a given embodiment. For instance, the user object, safe object, and profile object may be combined in a single object in some implementations. In addition, functionality may be apportioned between the client 106, the web server 504, and the identity server 510 (and between servlets and applets) in various ways while still providing the digital identity management services described herein.

The identity server layer 702 extends LDAP and XML RPC-over-HTTP to provide additional access to data stored in the Vault 202. The identity server layer 702 acts as an NDS access point and does not need to execute on every server in the NDS tree. Extensions for NLDAP and XML-over-HTTP provide three additional pieces of functionality, namely, access to data stored in NDS 618, transparent access to files 620 stored as file locations in NDS (the extension locates the file and returns the contents of the file rather than the file location), and the ability to set file 620 access rights. Additionally, HTTP extensions may provide interpretation of XML to NDS and NDS conversion to XML.

In one commercial design for identity server services, Novell software, as part of the identity server 510, provides the essential services. An API is not made available for third-party developers to provide additional services at this level. Novell's initial service offering is a Vault account creation service.

In the identity management layer 704, standard NDS authentication and authorization methods are used to control access to the data. In addition, form data is stored in NDS 618 storage using, e.g., a 128-bit private encryption key, a key of another length, and/or a key formed from one or more GUIDs. Of course, alternate approaches may be used in other embodiments.

NetWare's traditional security model is somewhat vulnerable to someone who has physical access to the server. With the right expertise and physical access, an intruder could gain access to all the data on the server (including NDS data). Physical access could thus provide the ability to circumvent the NDS authorization service to read the private data. In order to protect sensitive information like passwords and credit card numbers, form data is preferably stored in an NDS secret store 706 by using private key encryption. The secret store 706 optionally provides, but does not require, a non-repudiation feature, meaning the administration cannot change the user password and then log on as the user to obtain the secrets.

In addition to data stored in secret store 706, an application 1300 may choose to store data in a file 620 locally or on a server. The location of the file 620 is stored as an attribute in NDS 618, providing a level of indirection to the data. Motivations for storing data locally or on a server include frequency of update, and the ability to access data through existing tools, e.g., the ability to locate the file using NDS software and to access the file using a browser 1314 such as the Microsoft Explorer browser.

Figure 8:
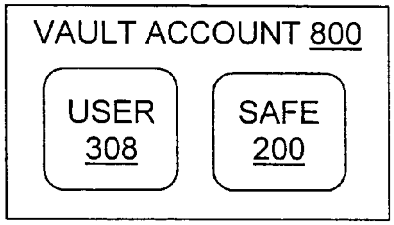
FIG. 8 is a diagram illustrating a vault account according to the invention.

As illustrated in FIG. 8, a Vault account 800 includes the user object 308 and the Safe 200. Conceptually, the user object 308 belongs to and is managed by the Vault host 510. The host 510 can set the policy on the user object 308, e.g., by limiting the resources the user consumes. The host 510 can also set password and login restrictions. The Safe 200 belongs to and is administered by the user, under the policy (such as a space restriction) set by the host 510. Standard NDS authorization mechanisms are used to control the user as well as the Safe. The end user may be an individual acting for herself or himself, or an authorized representative of a business or organization.

Figure 9:
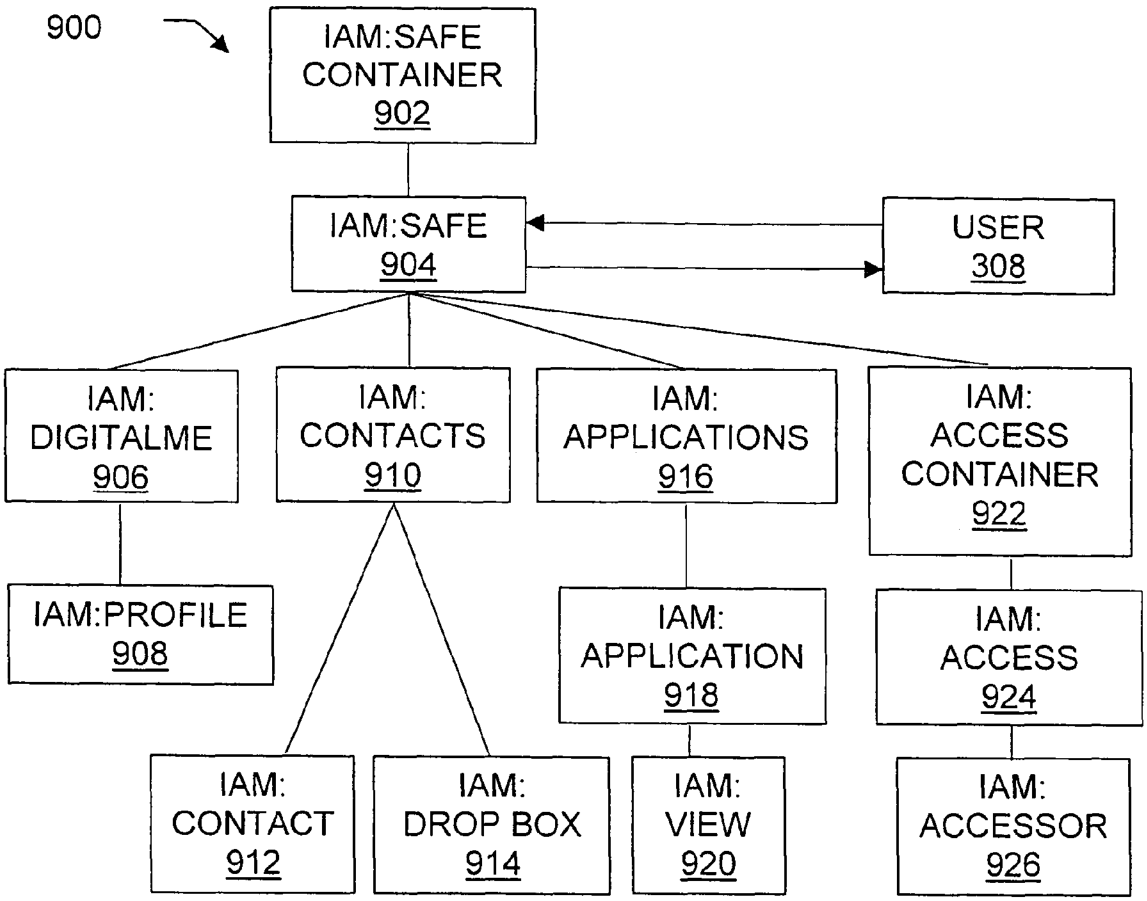
FIG. 9 is a diagram illustrating directory service schema components according to the invention.
Figure 11:
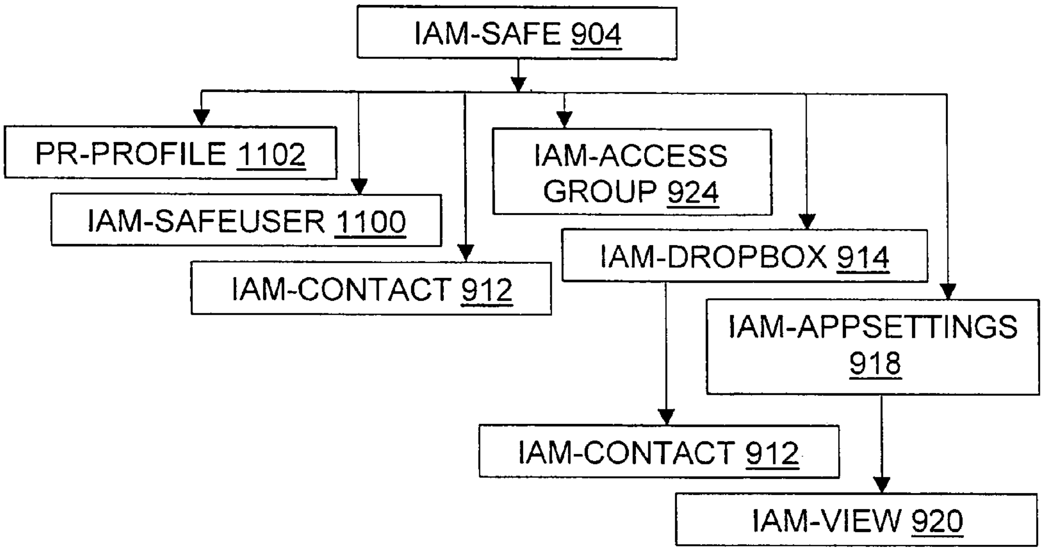
FIG. 11 is a diagram illustrating an alternative arrangement of directory service schema components according to the invention.

One DigitalMe™ architecture defines a few basic object class definitions 900 in the NDS schema. FIG. 9 illustrates the structure rules (containment) which are part of the definition of the class and which are enforced by NDS in one embodiment. An alternate approach is shown in FIG. 11, using somewhat different terminology and a different hierarchical organization. FIGS. 9 and 11 are not describing the inheritance of the class definition but rather illustrate two of the possible hierarchies for the instantiation of class definitions. The classes are described below; the acronym "IAM" used in one implementation by Novell refers to Identity Access Method. For convenience, we refer to object(s) which are instances of a class by the same reference number as the class.

We begin with an IAM:Safe Container or Vault class 902. The Vault object is a container of Safe objects as well as other Safe Container objects. There can be multiple Safe Container objects within a single NDS tree. The Safe Container can be created subordinate to Organization, Organizational Unit, Locality, Domain, and Safe Container. Multiple levels of Safe Container objects enable a hierarchy for ease of management and partitioning. To the extent that NDS does not support API modification or containment of existing objects' class definitions, currently defined NDS objects are excluded from a Safe Container. For example, user objects 308 cannot currently be created subordinate to a Vault object.

An IAM:Safe class 904 defines Safe objects. A Safe object is the root of the user-controlled space. The user is the administrator of this container and its contents. Safe objects can only be created subordinate to Vault. The Safe object encompasses all the objects associated with the user's data. It also facilitates easier access control in granting the user the rights needed to manage the data.

A User class 308 may be implemented using the base NDS User object class, or it may use a class 1100 created specifically for Safe users. The IAM-SafeUser class provides a default Profile. Its instance 1100 is the object that logs in, and default data about the Safe is kept in the IAM-SafeUser object.

An IAM:digitalme class 906 defines a Digitalme Container which holds all of the Profiles, and hence all of the user's identity data.

An IAM:Profile class 908 defines Profile objects which hold the identity data and are also containers. Profiles 300 can be described as roles or tasks performed by the user, such as Book Buyer, Traveler, Mountain Climber, and so forth.

An IAM:Contacts class 910 defines a Contacts object which is the parent of Contact 912 objects as well as any nested Contacts containers 910. It is a convenience container for easier organization.

An IAM:Contact class 912 defines a Contact object, each of which is contained by a Contacts (plural) object in the arrangement shown in FIG. 9. A Contact object represents an organization or individual outside the user's Safe Container 904. The Contact can be purely informational or the user can establish a Profile Access with the Contact. Relationships are established using Contact objects 912.

An IAM:Drop Box class 914 defines a drop box object which holds electronic business cards (e.g., DigitalMe™ meCards) and/or other notifications sent to this user through a drop box service 708. Contacts that have not been accepted or rejected are stored here.

An IAM:Applications class 916 defines an applications object which is a convenience container for easier organization; it holds Application objects.

An IAM:Application class 918 defines Application objects which hold data specific to a given application, such as application settings. In one version of DigitalMe™ goods and services, it holds the View object, which is used to define meCard business card appearance.

An IAM:View class 920 defines View objects, which specify a look for a given meCard digital business card.

An IAM:Access Container class 922 defines an Access Container which holds Accesses, which are objects that are granted rights to Profiles of identity data. The Access Container is for organizational purposes only, and does not have access data itself.

An IAM:Access class 924 defines Access objects, each of which associates a Profile 300 with a Contact. The Access object represents the Contact's access to the user identity data. Access rights are granted to this object on the Profile data.

An IAM:Accessor class 926 defines Accessor objects, which have public/private keys. A Contact accesses the user's Profile by logging into NDS as the Accessor object. DigitalMe™ goods and services use standard NDS access control methods to authorize the entity's use of the data.

In the embodiment illustrated by FIG. 11, a PR-Profile class 1102 defines objects that hold data which pertains to presence and online chat, such as aliases or screen names.

In an alternate embodiment (not shown) which uses some of these schema components in a different hierarchical organization, a Safe Container 902 contains Safe(s) 904, with each Safe corresponding to one user 1002 as in FIG. 9. The user 1002 may be an individual person, or the user 1002 may be an entity such as a business, an organization, an agency, or an institution. Each Safe 904 has a dependent Contacts 910 that includes zero or more Contact objects 912. Each Safe 904 also has a dependent Profile 908 that includes zero or more Profile Access objects. A given Contact can have only one corresponding Profile Access, and a given Profile Access can have only one corresponding Contact.

Figure 12:
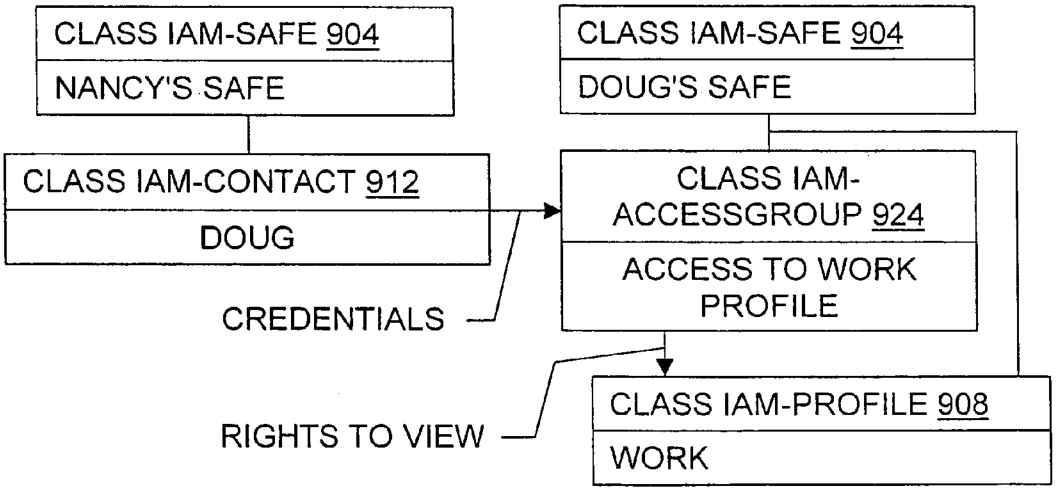
FIG. 12 is a diagram illustrating relationship management according to the invention.

With regard to FIGS. 11 and 12, some embodiments of the invention support electronic relationship management. This allows DigitalMe™ users 1002 to manage access to their identity information. More specifically, a user can change the information shared with another entity or revoke that entity's access entirely. With a schema extended for the DigitalMe™ architecture, NDS 618 holds several object classes that make electronic relationships possible. These include the IAM-Profile 908, IAM-Contact 912, and IAM-AccessGroup 924 classes. These classes are contained in a user's Safe as shown, for instance, in FIG. 11.

An important design goal of the DigitalMe™ architecture is user 1002 control over access to identity information. To this end, a DigitalMe™ user can always revoke or change access to his or her identity data. This is done through the user interface invoking calls to the DigitalMe™ access method. For instance, the user can change the identity information in the Profile 300, such as deleting information in an attribute or updating that information (like an address change). The user 1002 can also revoke access to the Profile, which implies deleting the Access (class IAM-AccessGroup) object.

In one scenario, relationship management includes selecting an object of the IAM-Profile class. The default Profile can be used or a new one can be created by the user. The default Profile is created automatically with a new DigitalMe™ account. Then an object of the IAM-AccessGroup class 924 is created. This object holds credentials to be used by other entities for access to a specific Profile. The IAM-AccessGroup object is given rights to the Profile object. Thus, the access can "see" a subset of identity information. The credentials, along with a display name (an attribute of the IAM-AccessGroup object) are sent to another entity. That entity becomes a "security equal" to the IAM-AccessGroup object.

An example is shown in FIG. 12. A relationship is initiated when a DigitalMe™ entity (such as user Doug) selects a Profile and sends a meCard structure to another DigitalMe™ entity (such as user Nancy). When Doug sends the meCard structure, an Access is created with rights over the Profile 300 he selected. The credentials are sent with the meCard to Nancy's Drop Box as a Contact. If Nancy accepts the Contact, it is moved out of her DropBox directly under her Safe. She then can use that Contact object to access the Profile information Doug has shared.

In addition, a DigitalMe™ community entity can initiate a relationship by using a memberCard structure. The community entity sends an invitation to the DigitalMe™ user, typically requesting certain information from the user 1002. The user can then create a memberCard having a Profile 300 with the requested information and grant an access over that Profile to the community. Again, the user retains control over the information and can preferably always change or cancel the relationship.

Figure 10:
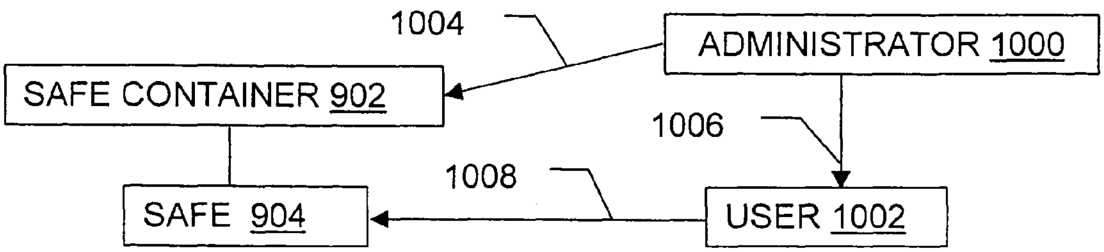
FIG. 10 is a diagram illustrating administrative control according to the invention.

Accordingly, FIG. 10 illustrates access control by an administrator 1000 and an end user 1002 in the DigitalMe™ architecture. As indicated by an arrow 1004 from the administrator 1000 to the Safe Container 902, the administrator 1000 has full administrative rights to the Vault. As indicated by an arrow 1006 from the administrator 1000 to the end user 1002, the administrator manages the user's account by setting space restrictions, login restrictions, and so on. Finally, as indicated by an arrow 1008 from the end user 1002 to the Safe 904, end users 1002 have full access control over their respective Safes. As noted elsewhere, a secret store may use encryption to guard user data against intrusion.

Figure 13:
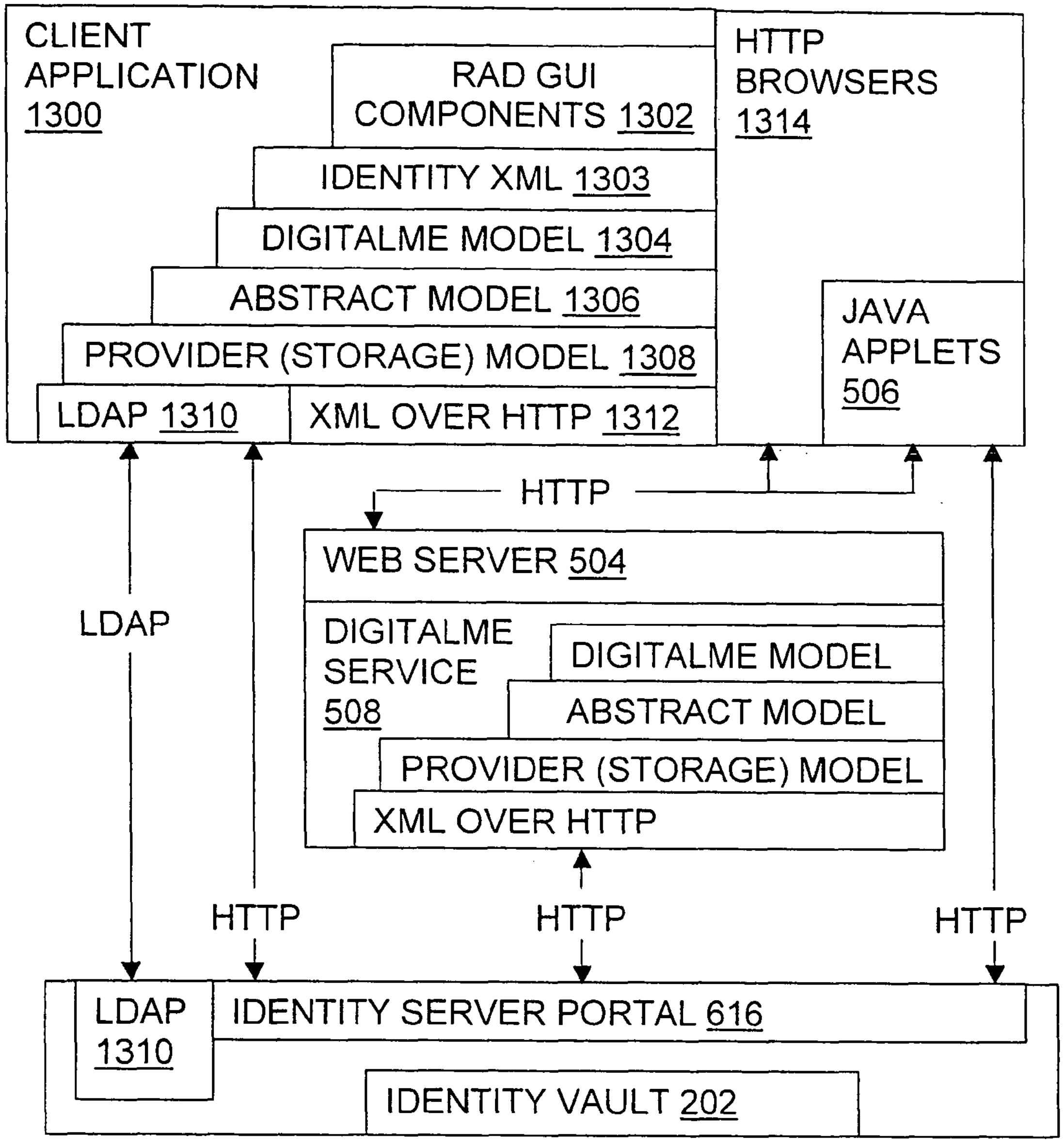
FIG. 13 is a diagram illustrating a user client, web server, and identity server according to the invention.

As noted briefly above, FIG. 13 illustrates application development in the DigitalMe™ architecture. For the user 1002, having a Safe with identity data is only as valuable as the services that take advantage of this information. For this reason it is preferably easy to add services and applications that consume the data. One of the goals of the DigitalMe™ architecture is to attract partners to develop DigitalMe™ architecture-aware services and applications. As illustrated in FIGS. 13 and 41, programming interfaces may exist at multiple levels, with several language bindings 4104 to accomplish this.

In the client 106, applications 1300 can consume interfaces at several layers. The top-most layer 1302 is a set of packaged components that include graphical widgets along with the data to allow for rapid application development (RAD) using RAD tools 4108. The source is included with these GUI components to show how to use the DigitalMe™ access method. This layer 1302 lets a developer create many different types and views of applications 1300 that utilize identity data. If this layer does not provide the graphical components that are needed, then the developer can drop down to a layer 1303 or 1304 and build on top of it.

The layer 1304 is a DigitalMe™ access method; layer 1303 is an XML representation of layer 1304. Each of these layers exposes the DigitalMe™ concepts of identity, profiles, and profile accesses. Using layer 1303/1304, a developer can design a totally customized application 1300 that utilizes identity data to provide a useful service to the client. In one embodiment, the XML Identity layer 1303 includes code such as the following:

```
<Identity Name=“UniqueName” Type = (Personal |Company)
URI=“https://host/Identity/username”>
    <Personal>
        <FirstName/>
        <MiddleNames/>
        <LastName/>
        <NickName/>
        <Honorific/>
        <GQualifier/>
        <Gender/>
        <Nationality/>
        <NationalID/>
        <StatProvID/>
        <MaritalStatus/>
        <Salutation/>
        <NameFormat/>
        <Interest/>
        <Birthday/>
            <Day/>
            <Month/>
            <Year/>
        </Birthday>
    </Personal>
    <PlaceList>
        <Place Name=“Novell”
        Type=“(Home|Work|Person|UserDefined?)”
URI=“xxxx”>
            <ShippingLabel/>
            <BillingLabel/>
            <AddressLine1/>
            <AddressLine2/>
            <MailStop/>
            <City/>
            <StateProv/>
            <PostalCode/>
            <Country/>
            <CountryCode/>
            <DevicePointerList>
                </Pointer>
                    <-- To device -->
            </DevicePointerList>
        </Place>
    </PlaceList>
    <DeviceList>
        <Device Name=“UniqueName”
Type=“(Cellular|Fax|Pager|Voice|Online|Email)” URI=“xxxx” >
        <Phone>
            <CountryCode/>
            <AreaCode/>
            <Number/>
        </Phone>
        <URI/>
        <EMail/>
        <ChatURL/>
    </DeviceList>
    <RelationshipList>
        <Relationship Name=“UniqueName”
Type=“(Work|Family|Friend|UserDefined?)” URI=“xxxx”>
            <DisplayName>Rel1</DisplayName>
            <Path>Friends</Path>
            <Note>Description of relationship</Note>
            <Target URL=“xxxx” Name=“yyyy” Password=“zzzz”/>
            <Source/> <-- Only when reading dereferencing -->
        </Relationship>
```

-continued

```
    </RelationshipList>
    <ApplicationList>
        <Application Name=“xxxx” URI=“xxxx”>
            <Revision/>
            <Data/> <-- Base 64 encoded -->
        </Application>
    </Applications>
</Identity>
```

Many developers will find all they need in layers 1302, 1303, and/or 1304 without directly accessing lower layers. However, the programmer can also manipulate identity and relationships through an abstract model 1306, though DigitalMe™ concepts and operations are not explicitly represented in the language binding. The abstract model API 1306 is appropriate for programmers wishing to write generic code such as a browser. For example, the operations insert( ), remove( ) and iterate( ) are preferably defined for all containers, including Profiles 300, address books and user objects 308; thus, programs can be written to display and otherwise manipulate these objects without knowing all of their implementation details.

A provider (storage) model 1308 is a lower layer, in the sense that it is closer to the actual storage being used. A programmer can write directly to this layer 1308 when extending and implementing new models. The programmer can also replace one of the abstract model classes. A protocol layer 1310, 1312 can also serve as a low-level, lightweight API that still provides a generic abstraction over the particular storage protocol being used. The lowest layer the programmer can write to is the wire protocol itself, or other APIs that expose the generic wire protocol. A programmer may want to manipulate identity information through a standard LDAP API 1310, or read and write the “wire” directly for XML-over-HTTP 1312. These points of entry 1310, 1312 are useful in many contexts, but provide no identity model abstraction, or abstraction over the particular storage protocol used. Therefore, code written to access LDAP directly, for instance, would be unable to build on a locally stored identity Vault.

On the server 504, only the lower four levels can be used to create a service that will consume identity data. Creating a service on the web server 504 allows a zero-byte client 502 access to the identity data using a standard browser 1314 configured with Java or other code 506 to operate according to the invention.

Identity services include those that execute on the identity server 510 and those that execute on the web server 504. As an architectural distinction, it may be said that the web server 504 plays the role of an application while the identity server 510 plays the role of a corresponding data server. An exception to this guideline may be found in any DigitalMe™ service which directly manages and maintains the Vault 202. In one embodiment, services that run on the identity server 510 are written to the HTTP stack and portal technologies. They may use Novell Dclient software to access the directory and the file system. Services on the web server 504 are written as servlets. They interact with the identity server 510 through the DigitalMe™ access method and protocol(s).

A variety of identity server services may be provided according to the invention. For instance, an Identity Access Protocol service implements low-level HTTP Stack commands; the data format is XML-over-HTTP.

Figure 44:
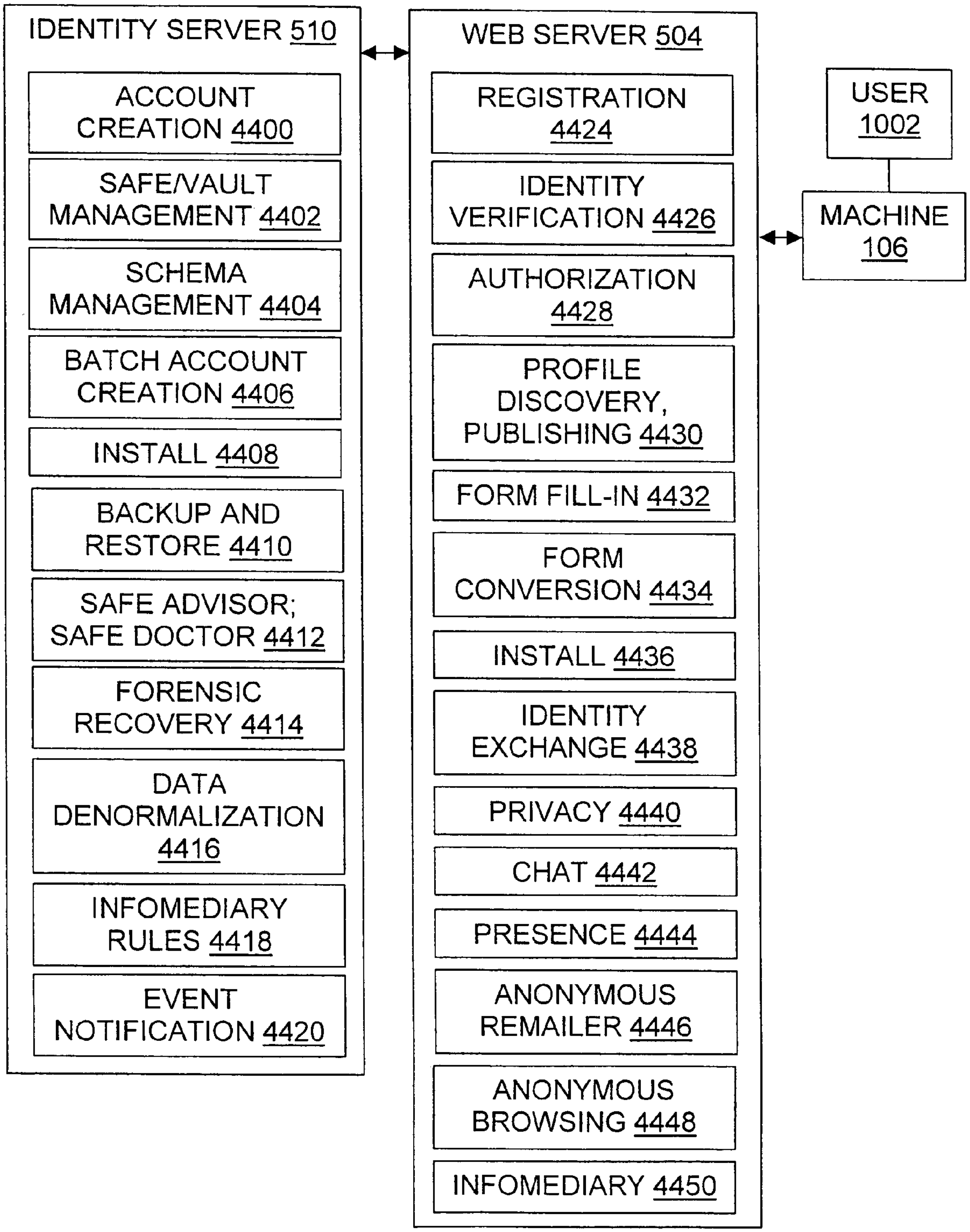
FIG. 44 is a diagram illustrating identity server services and web server services which are provided in various combinations in some systems according to the invention.

With reference to FIG. 44, an Account Creation service 4400 creates a new account (user, Safe, initial Profile, etc.) for a member 1002 based on an admin-defined template. Account creation is the result of registration and identity verification.

A Safe/Vault Management service 4402 provides an administrative tool to manage and maintain the Vault and Safes.

A Schema Management service 4404 permits an administrator 1000 to view the directory service schema, to add and delete schema packs, and to create and publish schema packs. This tool is web-based and in some implementations is written as Identity Server Portal pages, or as a servlet on the web server.

A Batch Account Creation service 4406 creates several accounts at one time. Two ways of doing this are creating them based on a file which specifies the accounts to be created, and creating them based on existing NDS User objects 308.

An Install service 4408 permits one to install and configure the identity server 510.

A Backup and Restore service 4410 allows one to backup and restore individual Safes 200, 904 and/or Safe Containers 902.

A Safe Advisor service 4412 allows one to verify the integrity of a Safe 200; it analyzes the Safe and reports any anomalies. A Safe Doctor service, which may be integrated with the Safe Advisor service 4412, allows one to fix or suggest fixes to a Safe.

In the event of fraud or abuse, a Legal Recovery tool 4414 recovers digital identity information when legally instructed to do so.

A Data Denormalization service 4416 provides integration with Virtual Replica (VR) technology to perform data transformation on fields within NDS 618 or with third party databases. An initial need is to synchronize any attributes on the User object 308 which may be selected within one or more Profiles 300. An alternate embodiment synchronizes any attributes on Profiles whose source may exist in another database. A meCard structure can be viewed as a fractional replica; as such, VR can update meCard structures.

A Rules service 4418 is one of many possible Infomediary class services. When an infomediary acts automatically on behalf of a user 1002, this service provides a common way to encode a rules language and an execution model for consistent behavior.

An Event Service 4420 allows the identity server 510 to register interest in and be notified of changes in the Vault 202.

Moreover, a variety of web server 504 services may be provided according to the invention. For instance, a Registration service 4424 allows the server 504 to register a new user with digitalme.com and other sites that host a Vault. The registration tool ties into the Identity Verification service and the Account Creation service.

An Identity Verification service 4426 allows one to verify the identity of a user 1002 based on registration information.

An Authorization service 4428 allows a process to verify any information gathered from the registration form. Once verified, the server 504 authorizes the user 1002 by creating an account. The user 1002 may be notified through a mechanism such as returning an HTML page or sending an email message, or through some other known or new method. The default may be set up to provide, among other options, verification of an email address, creation of an account, and notification by email.

A Profile Discovery/Publishing service 4430 allows users 1002 to publish their Profile(s) 300 with a discovery list. There may be multiple discovery lists, which provide "white pages" analogous to a telephone directory. Each list defines the visibility of the Profile, such as public, community, or groups-of-interest. Users can choose to participate or not. The discovery service allows the list to be searched or enumerated, based on access.

A Form Fill-In service 4432 allows a user 1002, while using an Internet browser 1314, to click a button or otherwise initiate a URL to the server, and thereby have the service fill in an online form from one of the user's Profiles 300. Thus, this feature allows the automatic filling of HTML forms on the Internet from user-selected sets of identity information (Profiles). Users can preferably define multiple Profiles 300 with different information such as postal address and email address, then select a Profile 300, and have this DigitalMe™ service fill in a given form using some or all of that Profile 300 data.

A Form Conversion service 4434 assists a webmaster 1000 in converting existing forms to standardized field names (e.g., ECML/P3P schema and/or a P3P proposal).

An Install service 4436 installs servlets 508 on the web server 504 and links to the identity server's web-based admin tools.

An Identity Exchange service 4438 is provided by a servlet that a site can deploy to enable it to speak the Identity Exchange portions of the P3P protocol or another privacy exchange protocol. It supports policies for identity negotiation and exchange. It also assists with the creation of the P3P proposal (see Form Conversion). Using P3P a user may be able to "sell" parts of their identity to an organization. For instance, an online retailer may give the user an extra discount if the user gives the retailer the user's home address, which is part of the user's digital identity.

A Privacy service 4440 augments the Identity Exchange servlet to support the privacy portions of P3P.

A Chat service 4442 sets up chat rooms so members 1002 can communicate with each other in real time.

A Presence service 4444 lets users 1002 specify where they are. It allows selected users access to this information and allows them to thereby discover another user's presence information. It may be provided using a switchboard module 4308 discussed later in this document.

An Anonymous Remailer service 4446 allows users 1002 to choose different email addresses for their different Profiles 300. The Remailer provides an indirection to a real mail server for purposes of anonymity.

An Anonymous Browsing service 4448 allows a user 1002 to browse the Internet 104 (through a proxy such as a Novell Border Manager proxy) in an anonymous fashion, preventing sites from collecting identity information about them.

An Infomediary service 4450 provides services for creating an infomediary, which acts as an identity defender and broker on behalf of the user 1002.

DigitalMe™ Access Methods

Figure 14:
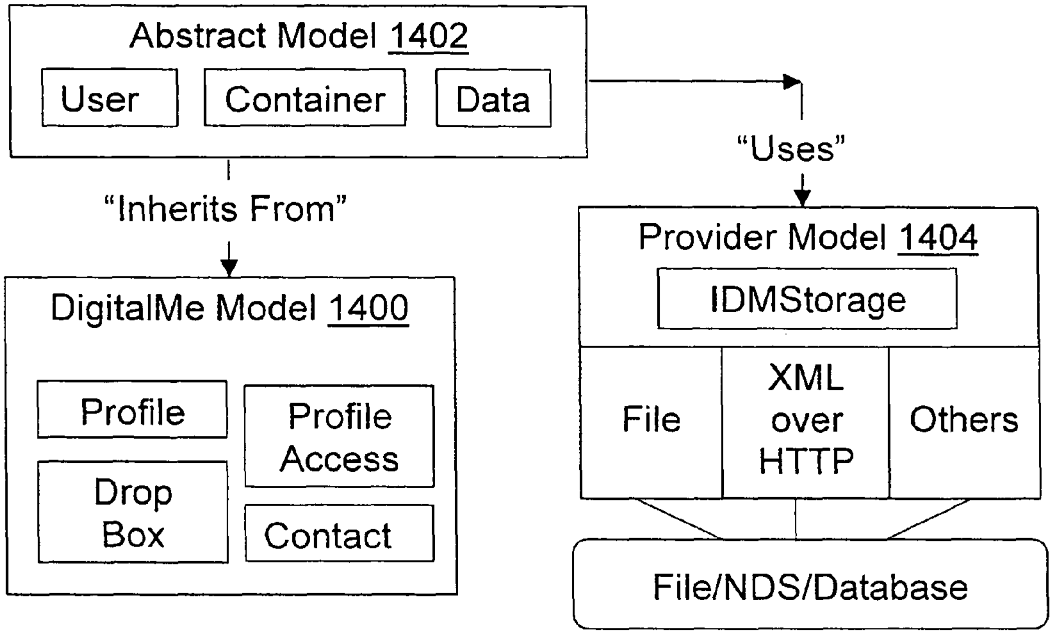
FIG. 14 is a diagram further illustrating three of the access method layers shown in FIG. 13, namely, a digitalme programmatic model layer, an abstract model layer, and a provider model layer.
Figure 15:
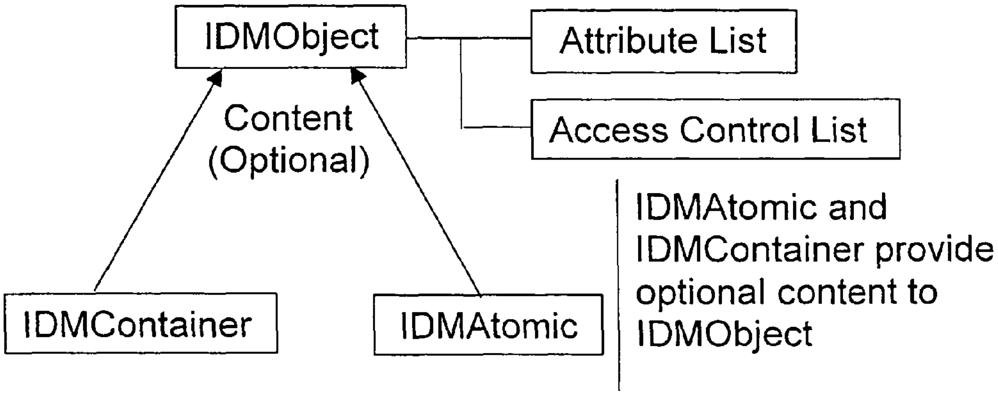
FIG. 15 is a diagram further illustrating the abstract model access method layer shown in FIG. 14.

As illustrated in FIG. 14, one implementation of a DigitalMe™ access method has three layers: a DigitalMe™ model 1400, an abstract model 1402, and a provider model 1404. The DigitalMe™ model 1400 is the access method intended for most DigitalMe™ applications. It provides a programmatic interface to identity items and operations that correspond generally to NDS objects, including the Safe 200/904, Profile 300/908, Contact 402/912, drop box 914, and accesses unique to DigitalMe™ products or services. The abstract model 1402 is a lower-level access method which offers a hierarchical storage system that wraps the storage layer in a simple representation of user, container, and data; one abstract model 1402 is further illustrated in FIG. 15. The provider model 1404 is the lowest-level access method. It abstracts the details of a particular directory and storage protocol, allowing applications to be implemented on, for instance, XML-over-HTTP. This design allows the same abstract or problem-space model to be transparently implemented on different storage mechanisms. These storage mechanisms can include directory services, file systems, and/or other storage mechanisms.

The DigitalMe™ architecture extends the NDS 618 schema to define the Vault 202 structure. The DigitalMe™ schema extensions include structure rules for Vault object classes, a base set of common attributes for the Vault object classes, and schema packages for specific industries using the DigitalMe™ architecture. All schema definitions may be included as a set of .sch files. In one implementation, all schema extensions defined for use only by DigitalMe™ products or services, such as Safe Container 902, have a common prefix, namely "IAM". General-purpose schema extensions, such as a user's home telephone number, do not have the IAM prefix, so that other applications can also use them.

The schema packages contain schema definitions for a specific Profile. They are provided as a convenience for the tree administrator 1000. For example, the data needed to fill in a form for a particular web site (e.g. www.travelocity.com) are expressed as NDS attributes on a Relationship object in a schema file (e.g., travel.sch). Applications 1300 are expected to provide any schema packages necessary for their operation.

Extending the schema requires administrative rights to the root of the directory service tree. Therefore, the host administrator 1000, not the user 1002, must perform the extension. If a user 1002 wants to use an application and the schema extension is not available, there are two choices. The user can ask the host to provide the definition. Alternately, the application can store the data as a "blob" (Binary Large OBject) in an XML stream attribute on both the Profile and Profile Access objects. In some embodiments, the user can use the DigitalMe™ API to dynamically extend a schema without having administrative rights to the root of the directory service tree.

With respect to data inheritance, DigitalMe™ products and services can use the hierarchical organization of the object classes in the Vault schema to implement data inheritance in the attributes.

Figure 16:
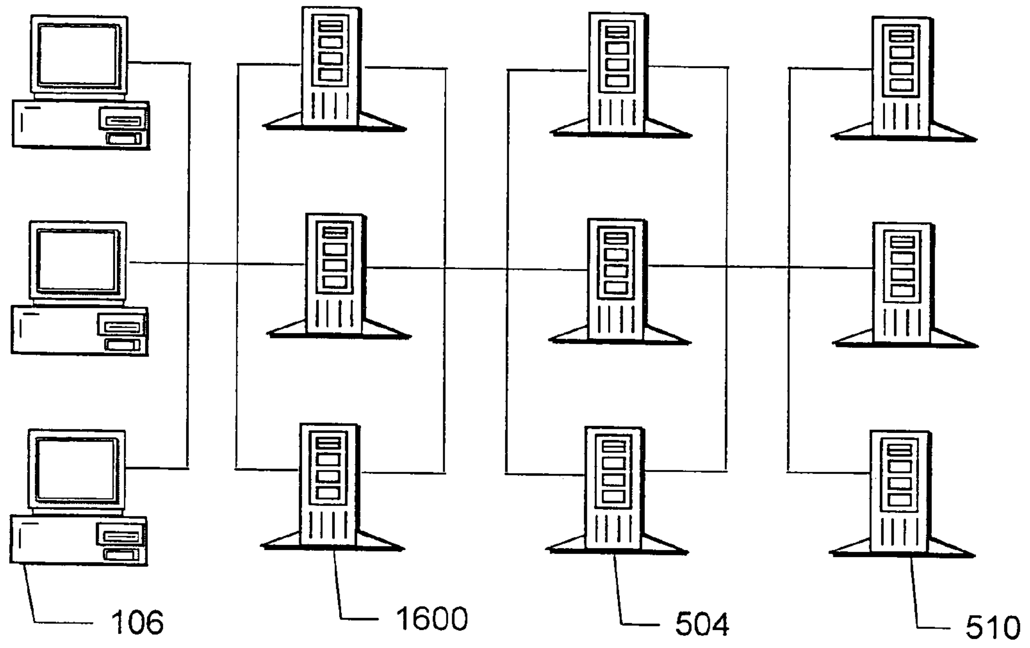
FIG. 16 is a diagram illustrating the context of security-related features of the invention, including client computers, cache server computers, web server computers, and identity server computers.
Figure 17:
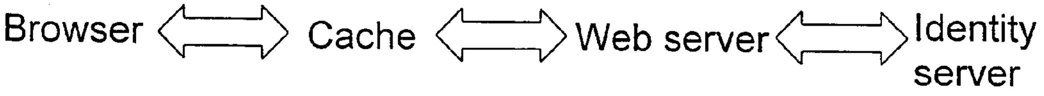
FIG. 17 is a diagram summarizing the flow of communications between the computers shown in FIG. 16.

FIG. 16 illustrates the context of security-related features of the DigitalMe™ physical architecture. In some cases, client browsers 1314 access DigitalMe™ services via the Internet 104 and Novell Internet Caching Servers (NICS) 1600, with the caching servers 1600 providing acceleration and load distribution to web servers 504 that run servlets 508 which access identity data on identity servers 510. The web servers 504 also serve up web pages to the clients, and provide the DigitalMe™ application functions. One suitable relationship between client browsers, caches, web servers, and identity servers is summarized in FIG. 17. In this environment, security can be implemented as follows.

The DigitalMe™ front pages, which contain generic site information and no personal user information, need not be secured.

Figure 18:
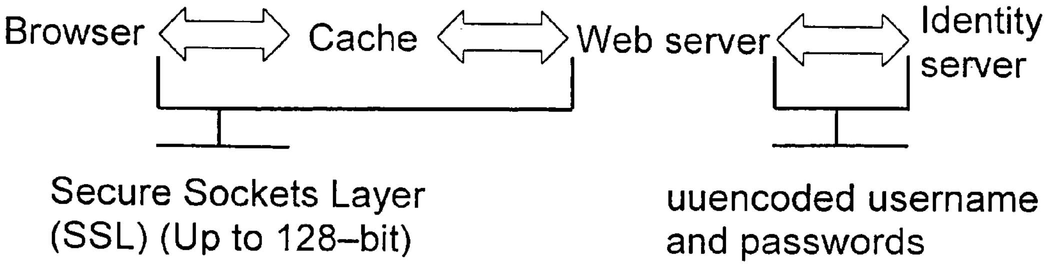
FIG. 18 is a diagram illustrating security measures to protect communication flows shown in FIG. 17.

With respect to DigitalMe™ user 1002 login, and with reference to FIG. 18, a Secure Sockets Layer (SSL) connection is initiated when the user accesses the login screen. This connection uses encryption with the key length supported by the browser 1314, up to 128 bits, for instance. NDS authentication begins when the user 1002 has sent the user name and password over the SSL connection to the web server 504. The web server sends the username and password, uuencoded, to the identity server 510. On the identity server 510, the HTTP stack (e.g., httpstk.nlm) performs a login for the user to NDS 618. If the NDS login is successful, the username and password are added to a table on the HTTP stack. After login, each request for identity data is accompanied by the uuencoded username and password and sent to the identity server 510. The identity server decodes the username and password, then compares it to its table of logged-in entities before filling the request.

Figure 19:
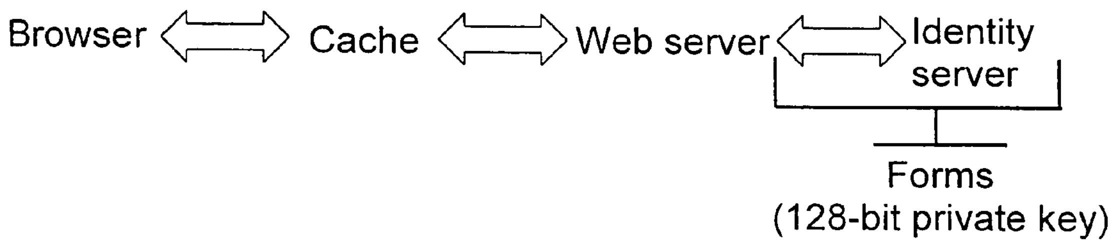
FIG. 19 is a diagram further illustrating security measures to protect communication flows shown in FIG. 17.

With respect to form secrets, and with reference to FIG. 19, user data input to forms protected by privateI web site hosting services, for instance, is expected to hold highly sensitive passwords and usernames for Internet relationships and transactions. DigitalMe™ services encrypt these secrets on the web server 504 using a 128-bit private key. The key is generated from a sixteen-byte base key and the identifier for an NDS object representing the web site requesting the form. The encrypted data is then sent to the identity server 510. When form data is requested on the client 106 by a web site hosting service, the web server 504 retrieves it from the identity server 510 and decrypts it for transmission over the (encrypted) SSL connection to the client 106.

Figure 20:
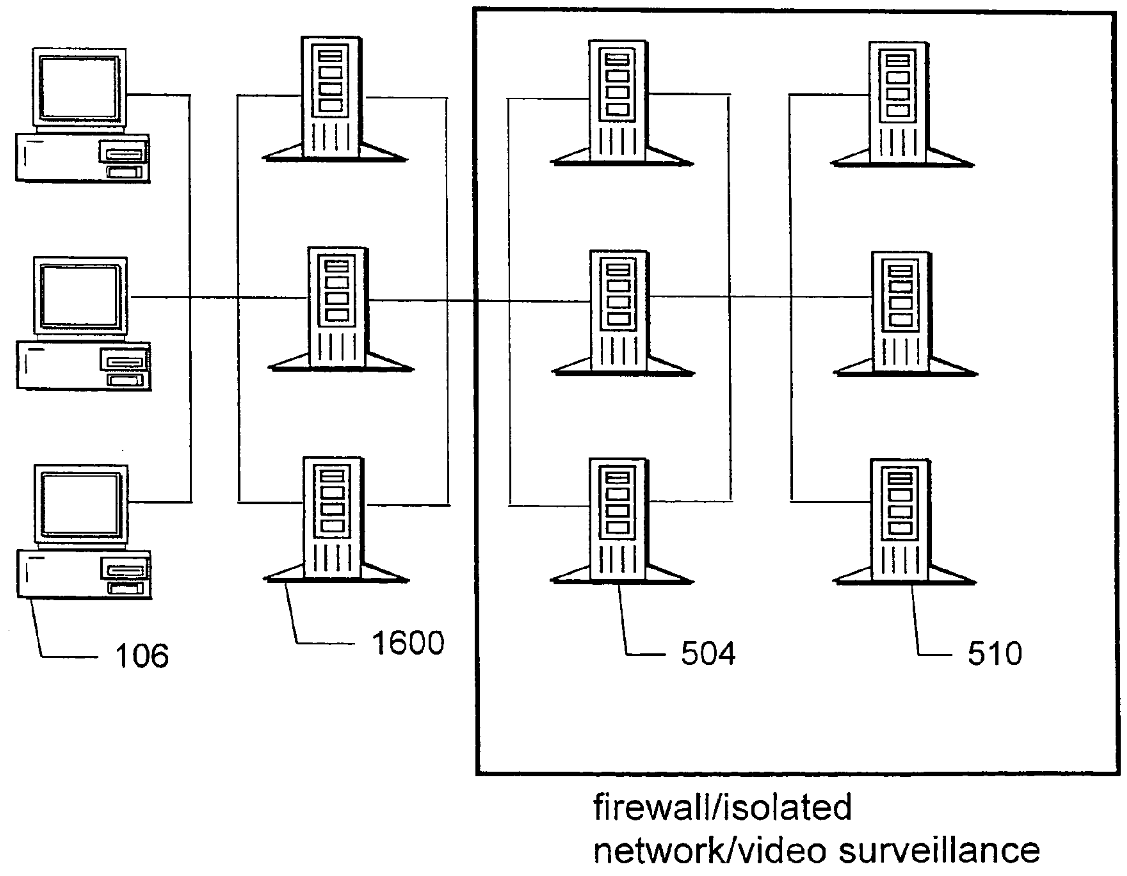
FIG. 20 is a diagram further illustrating security measures for computers shown in FIG. 16.
Figure 21:
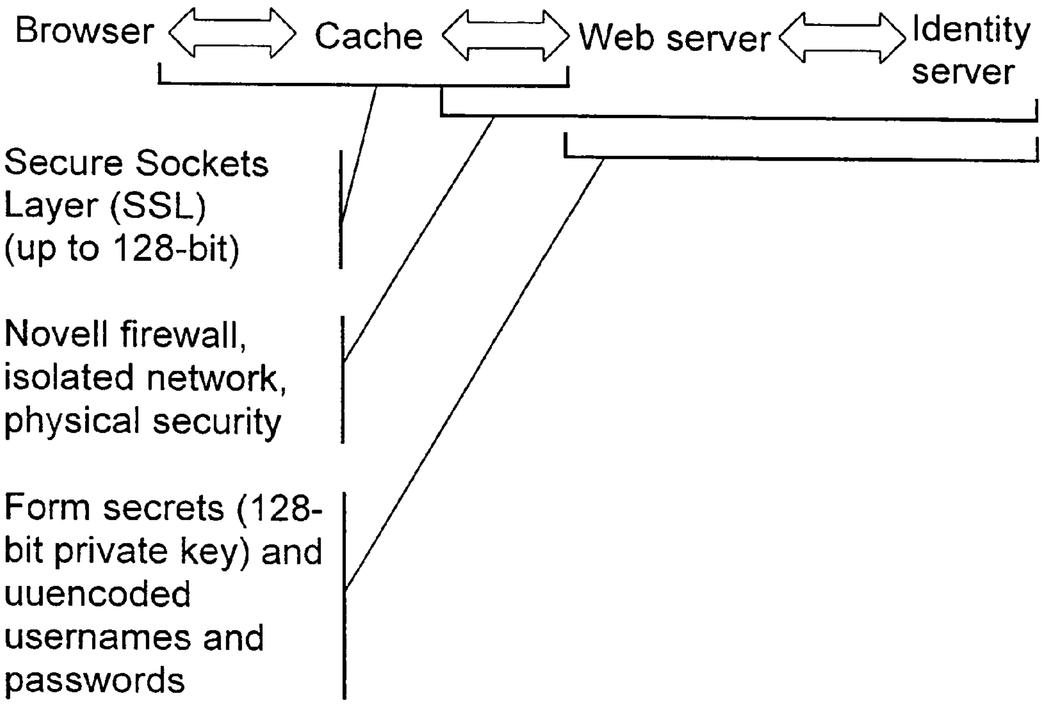
FIG. 21 is a diagram summarizing security measures for computers shown in FIG. 16.

With respect to physical and other security, and with reference to FIG. 20, the web server(s) and identity server(s) are preferably kept behind Novell's firewall (or another reliable firewall) on an isolated network. Physical security clearance is preferably required of any administrator 1000 who holds the administrative password to the identity servers. FIG. 21 summarizes the security offered by this DigitalMe™ architecture.

Federated Objects

Figure 22:
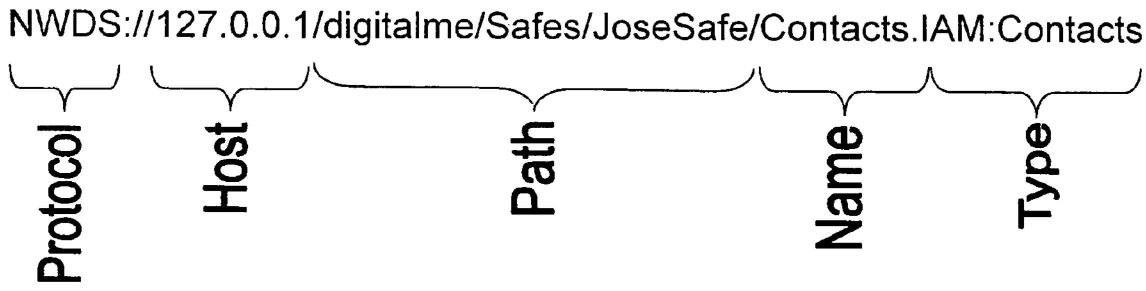
FIG. 22 is a diagram illustrating an example of a complete Universal Resource Identifier suitable for use by an access method to reference objects according to the invention.

This aspect of the inventive technology allows DigitalMe™ users 1002 (represented by NDS objects 308) to offer data access to users in an entirely different Vault 202. Applications using the DigitalMe™ access method reference objects by a complete URI (Universal Resource Identifier) such as the URI shown in FIG. 22. The complete URI allows the federation of objects by accommodating objects stored on different servers (hosts). For instance, the host portion of the complete URI can be the IP address of Novell's DigitalMe™ site or the site of any DigitalMe™ partner's Vault 202. Thus, when a user 1002 creates a relationship with another user 1002 outside of the user's Vault 202, DigitalMe™ software uses the complete URI to automatically federate the "external" object.

Figure 23:
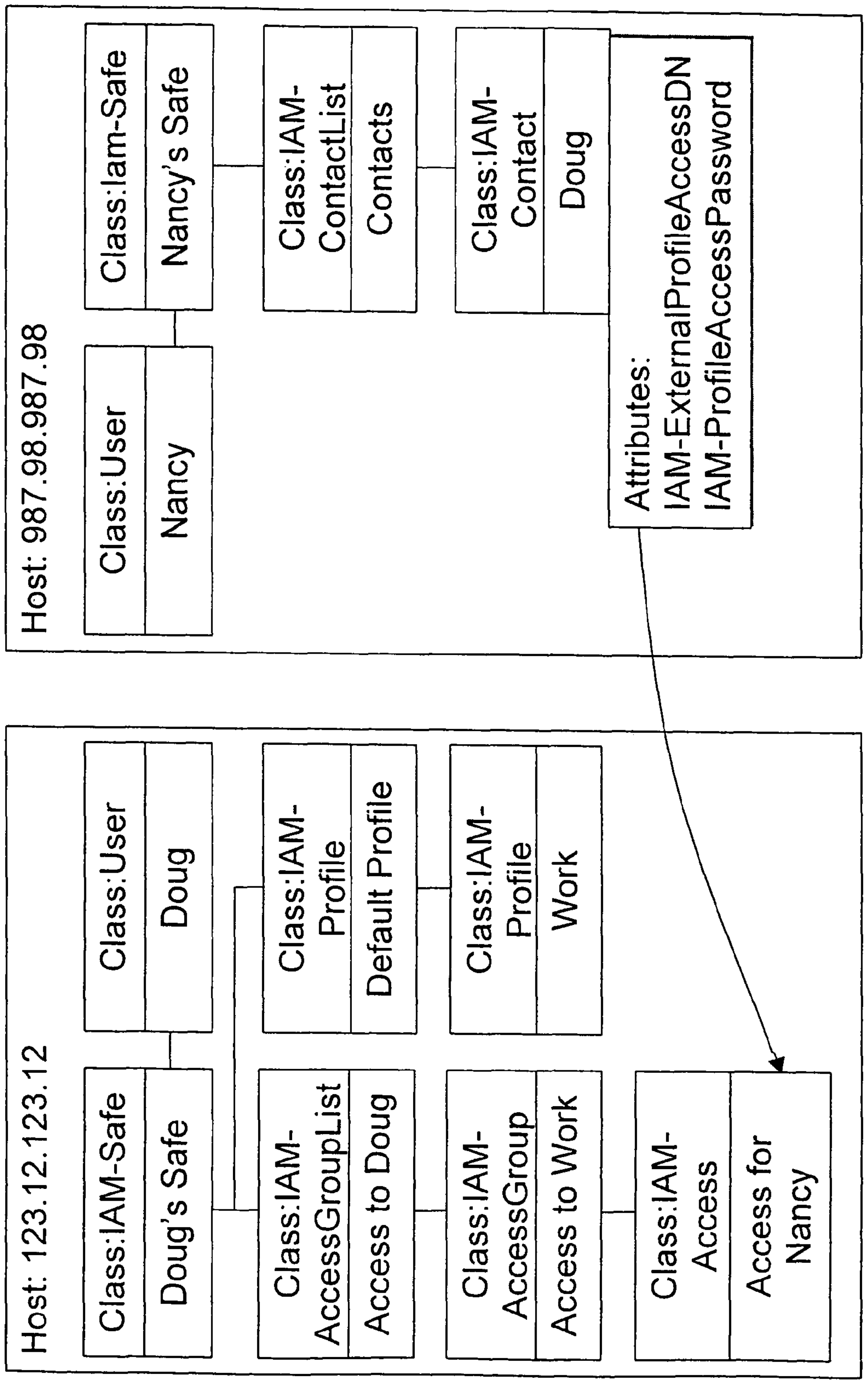
FIG. 23 is a diagram illustrating links for object access and relationship management according to the invention.

In the case illustrated in FIG. 23, Nancy's Contact object contains a link to Doug's Access object via the attribute IAM-ExternalProfileAccessDN. The attribute contains the complete URI to the Access object, which happens to be on a different host. DigitalMe™ software recognizes Doug's host from the host portion of the URI in the complete name of the Access object. Nancy's Contact object also contains a password in the attribute IAM-ProfileAccessPassword, allowing Nancy to authenticate to Doug's Access object. FIG. 23 also shows that Doug's Access object for the Profile 300 (in this case, Work) inherits rights from his IAM-AccessGroup object.

The user experience for creating a relationship with a federated object may be almost the same as any DigitalMe™ relationship. However, the user 1002 is located on a different DigitalMe™ site.

For instance, suppose DigitalMe™ user A makes his Work identity accessible to DigitalMe™ user B in another Vault 202 by sending her a meCard structure. From the user 1002 perspective, A logs into a DigitalMe™ site and searches for B in her site. A then sends B a meCard structure. A's meCard structure appears in B's drop box. B accepts the card. A and his Work information now appear in B's Contacts list.

The federated objects technology allows DigitalMe™ users (as NDS objects) to offer data access to non-DigitalMe™ (non-NDS) contacts and/or to users in an entirely different Vault. Thus, a user 1002 can act as an administrator in the traditional sense, by creating new objects and privileges over the data in the user's Safe.

Figure 24:
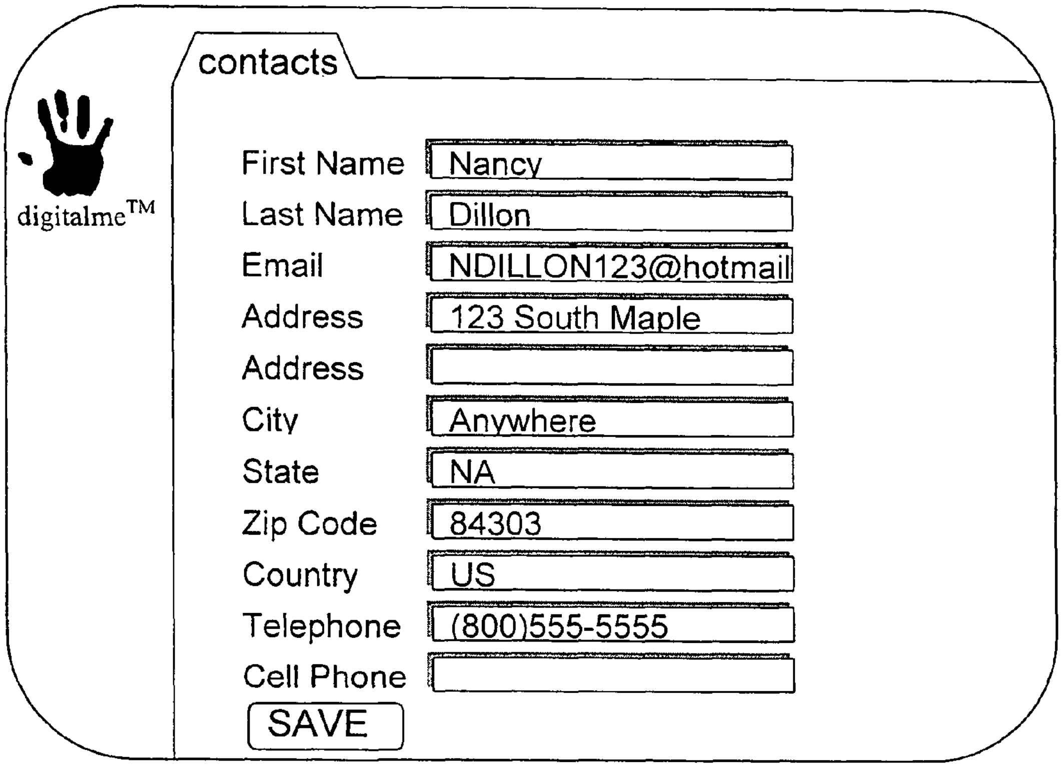
FIG. 24 is a screen portion of a user interface illustrating creation of a user contact according to the invention.

In one scenario, DigitalMe™ user Doug Mecham makes his public identity accessible to non-DigitalMe™ entity Nancy Dillon or to a member in another Vault. The user's perspective of the process is as follows. Doug Mecham logs into a DigitalMe™ site and creates the Nancy Dillon Contact; a suitable user interface screen is shown in FIG. 24. If Nancy is a user 1002 in another Vault 202, this step may be accomplished by Nancy sending Doug a meCard structure and Doug accepting it or by Doug searching for Nancy's public meCard structure in another Vault and adding it to his Contacts list. Either way, a Contact object containing Nancy's information is created in Doug's Safe 200.

Figure 25:
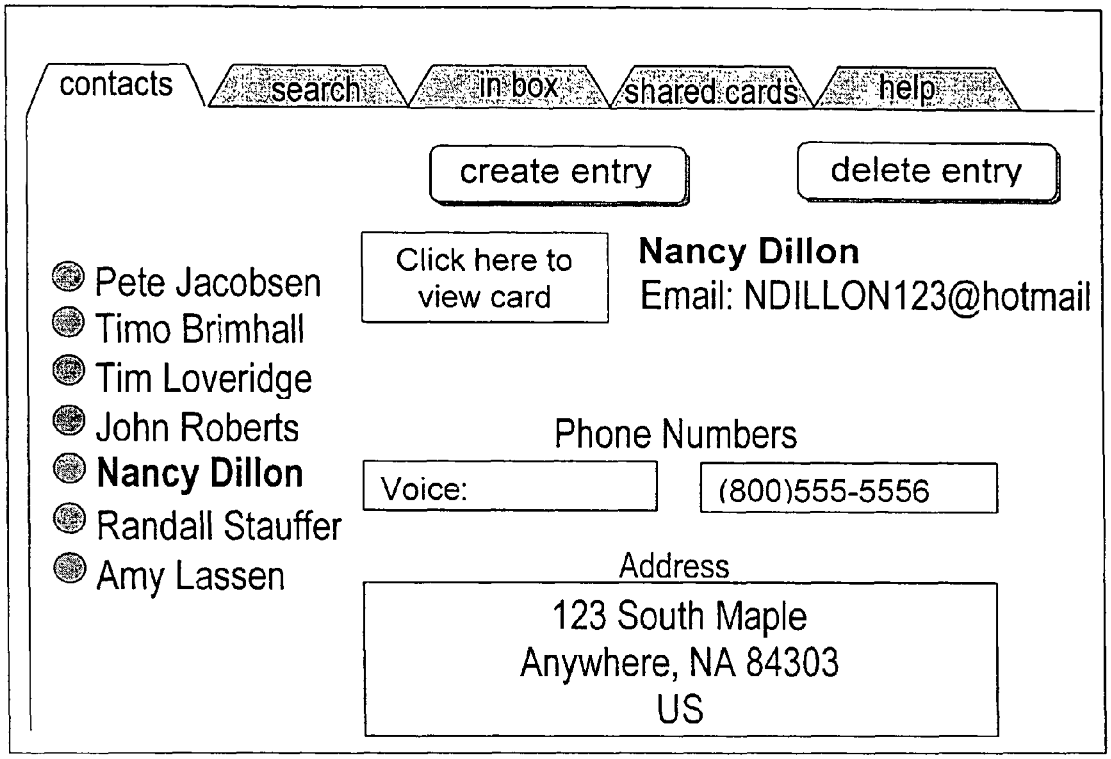
FIG. 25 is a screen portion of a user interface illustrating a user contact according to the invention.
Figure 26:
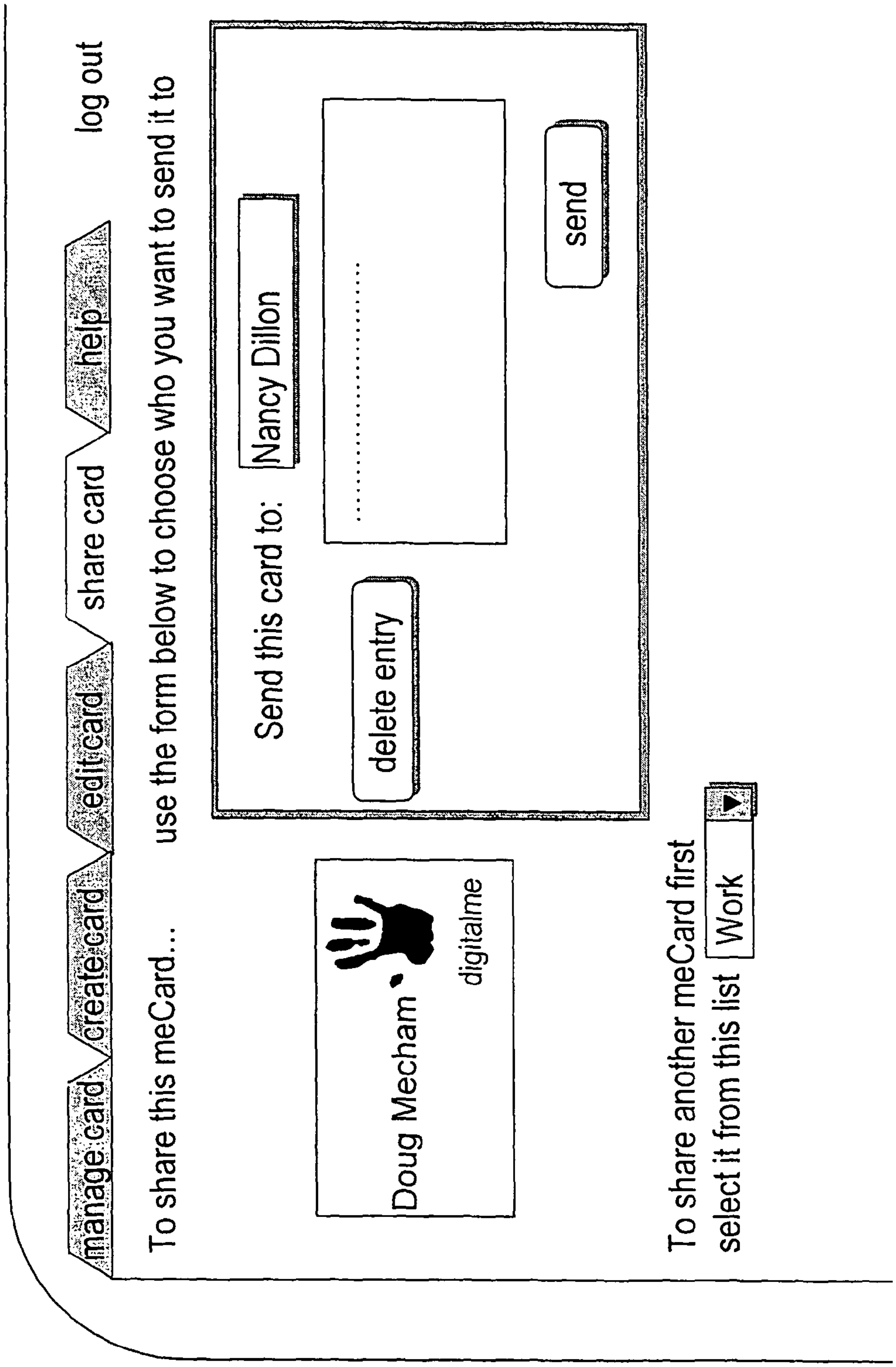
FIG. 26 is a screen portion of a user interface illustrating the sharing of a user meCard data structure according to the invention.
Figure 27:
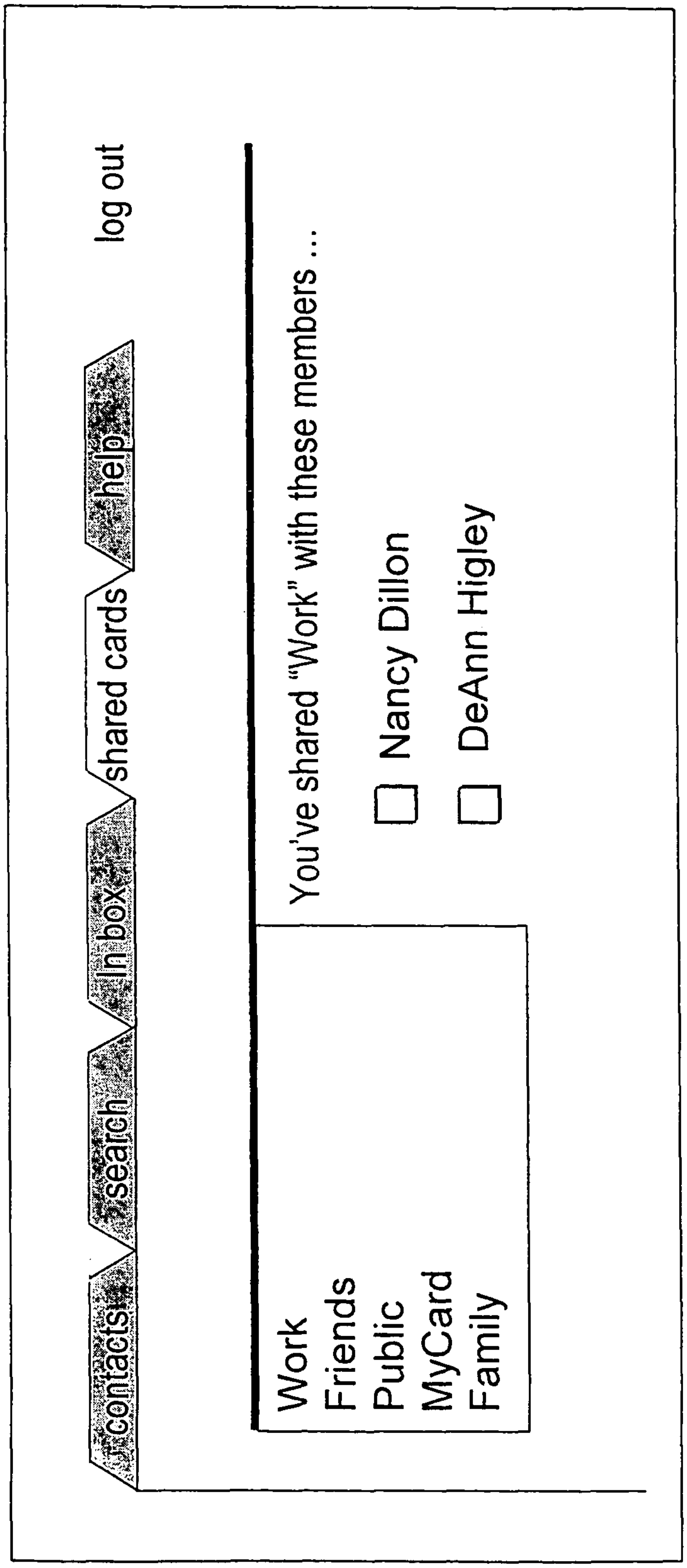
FIG. 27 is a screen portion of a user interface indicating shared user meCard data structures according to the invention.

Nancy Dillon now appears in Doug's Contacts list, along with his other DigitalMe™ Contacts. This is illustrated by a user interface screen shown in FIG. 25. Doug now shares his Work identity (meCard data structure) with Nancy; this is illustrated in FIG. 26. Nancy now has access to the information Doug has made available in his Work meCard, as illustrated in FIG. 27.

In one embodiment, federated object implementation for contact creation includes a new object of the class "IAM-Contact" which is created in the Vault. Attribute values denoting the contact information are stored, and a unique identifier (e.g., a GUID) is generated from the URI of the Contact. For meCard structure sharing, a new object of the class "IAM-Access" is created in the Vault. The Profile attribute of the "IAM-Access" object points to the identity (meCard) selected. The Contact's GUID is referenced as an attribute of the Access object. Credentials (password) are created for the Access object.

When Doug creates the Contact for Nancy or accepts her meCard, DigitalMe™ software creates a Contact object in the Vault under Doug's Safe. The new Contact object is stored in the Contacts Container. The new Contact is identified by a unique GUID, which DigitalMe™ software generates from the user's URI (Universal Resource Identifier). In the case of Vault-to-Vault federation, the URI contains the tree name of the external Vault along with the user ID. At this point, DigitalMe™ software can grant access to one of Doug's specific IAM-Profile objects.

The sharing of a meCard structure means the association of an IAM-Contact object (e.g., Nancy) with an IAM-Profile object (e.g., Work) and the creation of credentials for accessing that Profile 300. The association is done by creating the IAM-Access object containing the GUID attribute pointing to the Contact (Nancy) and if Nancy is in another Vault 202, the tree name of the Vault. Credentials are required to ensure the security of Doug's "Work" Profile information. The Profile attribute of the IAM-Access object identifies which meCard structure Doug has shared with Nancy.

Figure 28:
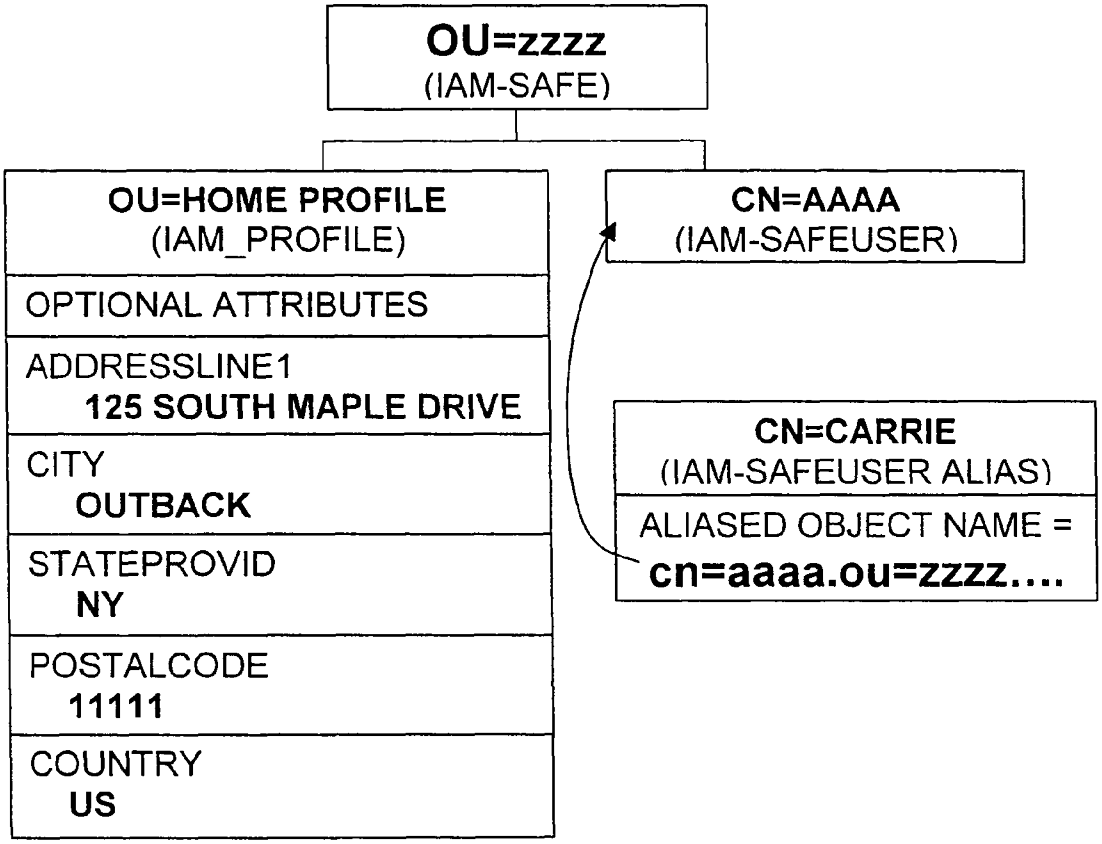
FIG. 28 is a diagram illustrating identity data and self-updating contact information according to the invention.
Figure 29:
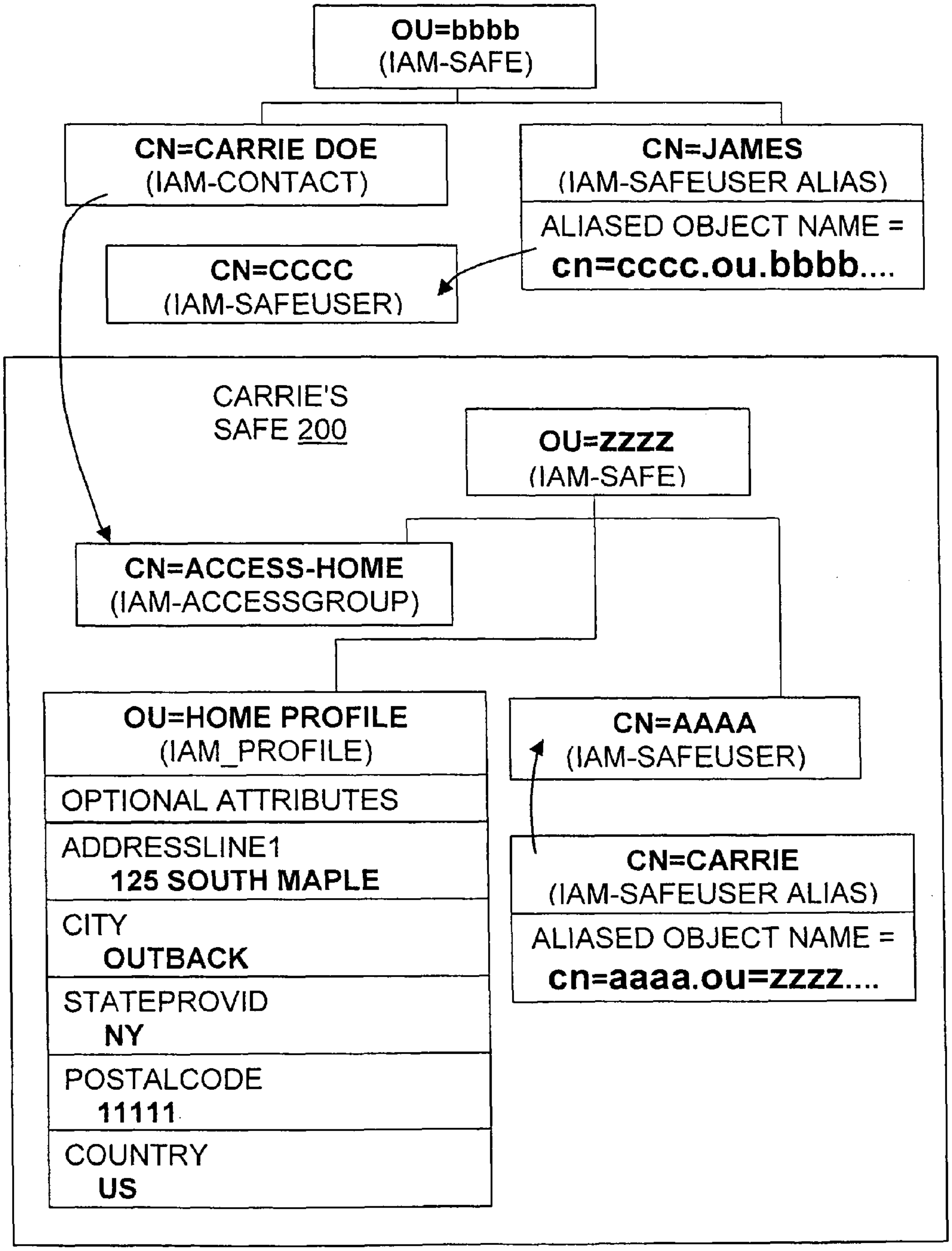
FIG. 29 is a diagram further illustrating identity data and information access according to the invention.

FIGS. 28 and 29 illustrate self-updating contact information according to the invention. Unlike a common address book, a Contacts list does not contain identity data. It is only a list of accesses to someone else's data. When a DigitalMe™ user 1002 has a digital relationship with another entity, that entity is responsible for changing its shared information. This reflects a core design goal, namely, that each user controls its own identity.

Each user's identity data is contained in one or many Profiles, contained in that user's Safe. For instance, FIG. 28 illustrates a relationship between user Carrie and her identity data. Carrie, being the owner of her Safe, has full control over data in her Profile. When Carrie sends a meCard structure to DigitalMe™ user James and he adds her to his Contacts list, James gets access to Carrie's Profile data, as illustrated in FIG. 29. James has no control over Carrie's data. He only has access to it. Carrie can change the data or eliminate the access. If there are multiple accesses to her Home_Profile, any change Carrie makes is reflected in all the other users' Contact lists for her record. Any updates to a person's Contacts list are preferably made transparently. Thus a user's Contacts are automatically maintained and always up-to-date.

Partner Access to DigitalMe™ Services

Novell's DigitalMe™ technology offers a way to securely authenticate a partner's users and encourage them to come back to the partner site. By incorporating a GIF with a "href" link to www.digitalme.com or another authorized DigitalMe™ site on its own login page, an affiliated site can take advantage of the secure authentication of NDS and give users 1002 the impetus to sign on late without having to remember and type in a specific password. The user receives relatively quick and simple access to the partner site via a trusted DigitalMe™ interface.

Figure 30:
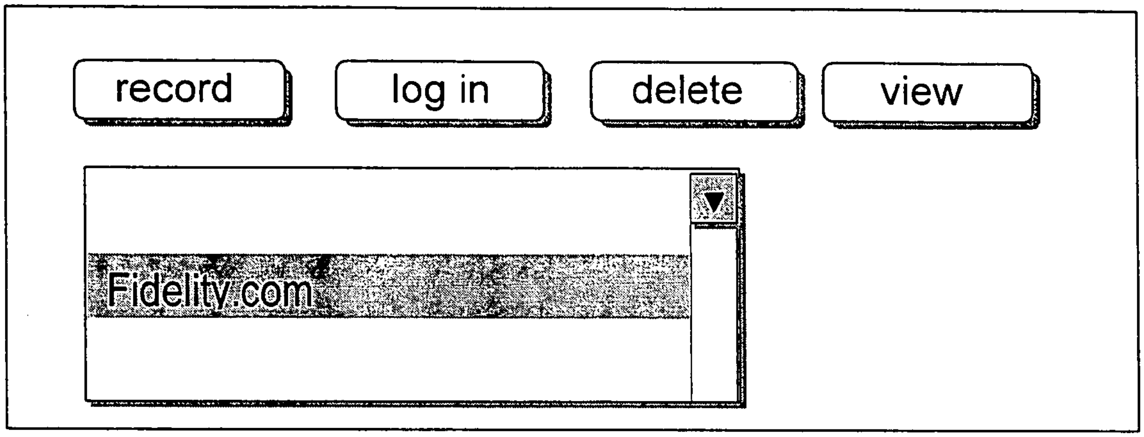
FIG. 30 is a portion of a user interface illustrating web site selection.

From a user 1002 perspective, the login process starts when the user goes to the partner's web site, by selecting a "log in" button as shown in FIG. 30 or by other familiar means of reaching the partner site. At the partner site, the user 1002 is presented with a login dialog that asks for the user's name and password but also includes a link such as a DigitalMe™ login handprint next to the normal login form; FIGS. 24 and 26 show a sample DigitalMe™ login image depicting a handprint. Alternately, the partner site may use only the DigitalMe™ login process. Whenever a DigitalMe™ login occurs a unique identifier stored in IAM_ID is added to the post buffer. Thus, a partner's site can use this unique identifier to consolidate and identify user 1002 accounts across that site and other sites.

If the user elects to use the traditional login, all proceeds as normal. If the user selects the DigitalMe™ login (e.g., by clicking on a "login using DigitalMe™" GIF), the Novell-provided link captures and wraps the site's URL (this is done, e.g., by JavaScript executed as part of the link represented by the DigitalMe™ login image), which is sent to a web sign-on servlet 508 at www.digitalme.com. Then one or more of the following scenarios will happen.

Figure 31:
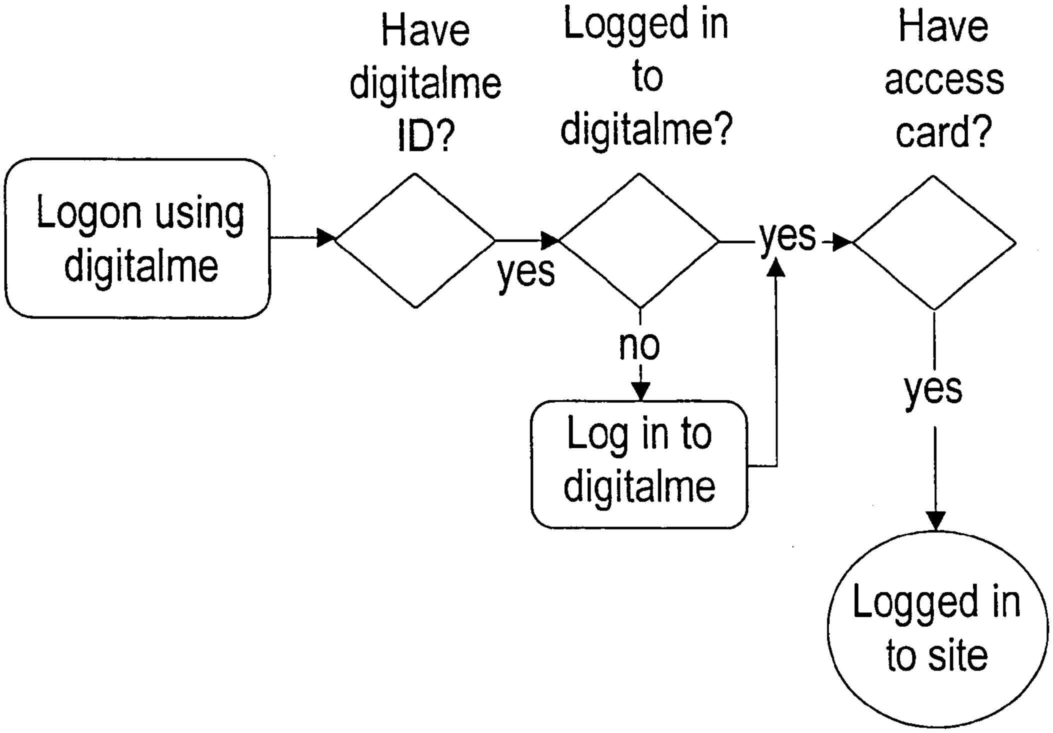
FIG. 31 is a flowchart illustrating a login process at a partner site when the user has a digital identity management ID, according to the invention.

A Normal Scenario is illustrated in FIG. 31. Normally the user 1002 will have both a DigitalMe™ account and a DigitalMe™ "accessCard" representing the partner site. If the user is already logged in to a DigitalMe™ account the partner site login happens automatically without any intervention when the DigitalMe™ login image (e.g., a hand print) is clicked. If the user 1002 hasn't logged in to a DigitalMe™ account, then the DigitalMe™ service prompts for a DigitalMe™ user name and password.

The digitalme.com server 504 uses session cookies to cache the login credentials for the user at the user's computer 106. These session cookies timeout after, e.g., fifteen minutes of inactivity. When the browser session cookies are still viable, no login prompt is needed. This global DigitalMe™ login is used for all integrated (partner) sites, saving the user from memorizing a new password for each site.

The DigitalMe™ servlet finds the site's accessCard structure by matching the site's wrapped URL to the URL stored in the accessCard structure. From accessCard attributes the servlet regenerates the action and post buffer for the site's login. Other than additional DigitalMe™ attributes in the post buffer (e.g., a DigitalMe™ globally unique id and an optimal access URL for the ability to collect other user identity attributes), the site will not be able to distinguish between this action and post buffer and ones that result from a submit that occurs off of the site's own login form.

The user 1002 should now be logged into the site, as if the user had submitted the information directly. In this normal use scenario, other than their DigitalMe™ user ID and password, which are prompted for only when needed, the users do not see any DigitalMe™ intervention pages. Users also need only remember their DigitalMe™ user ID and password; the DigitalMe™ software caches and submits all other web login credentials. Also, from the DigitalMe™ site, the user can list, maintain, and launch these accessCards directly.

Figure 32:
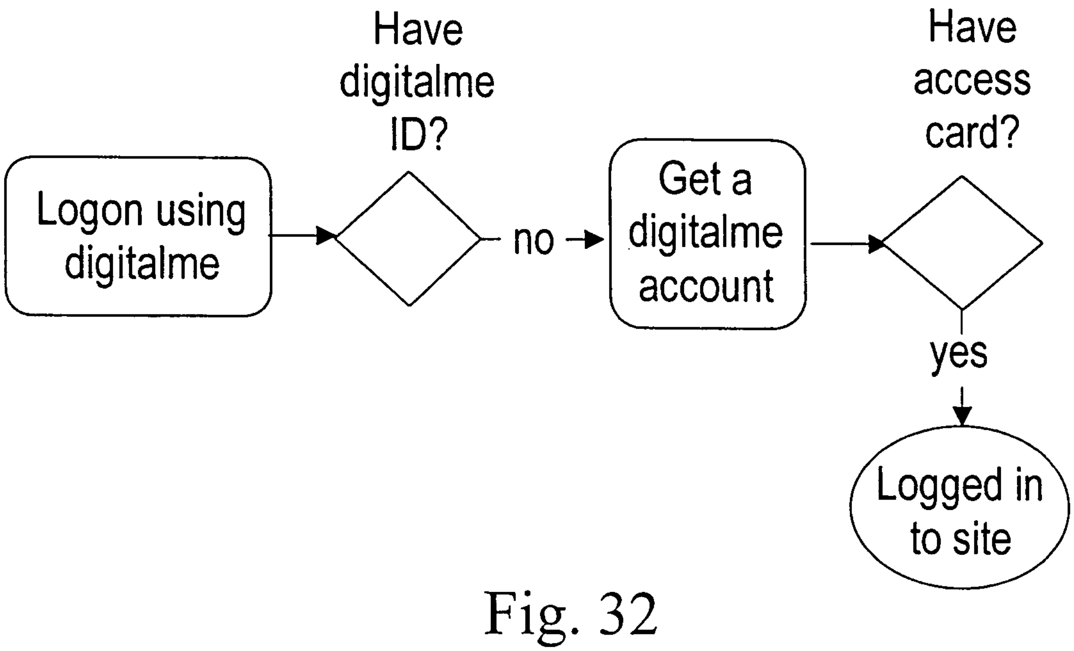
FIG. 32 is a flowchart illustrating a login process at a partner site when the user does not already have a digital identity management ID, according to the invention.

A No DigitalMe™ Account Scenario is illustrated in FIG. 32. If the user 1002 doesn't yet have a DigitalMe™ account, one is created (preferably with little fanfare) and the user is returned automatically to the partner site when logged in to the DigitalMe™ account. Users can join a DigitalMe™ community with a minimal set of information. The web sign-on servlet 508 will branch to the DigitalMe™ registration servlet when it encounters a user 1002 who cannot authenticate. Once the user is registered, the web sign-on servlet can continue.

Note that this case is detected because the login to digitalme.com fails, or the user 1002 chooses to register with a DigitalMe™ server instead of logging in to the partner site. The web sign-on servlet redirects to the registration servlet, but a session continuation cookie is set to preserve the user's original intentions. The user can cancel this process at any time. After the join is successful, the web sign-on servlet is continued.

Figure 33:
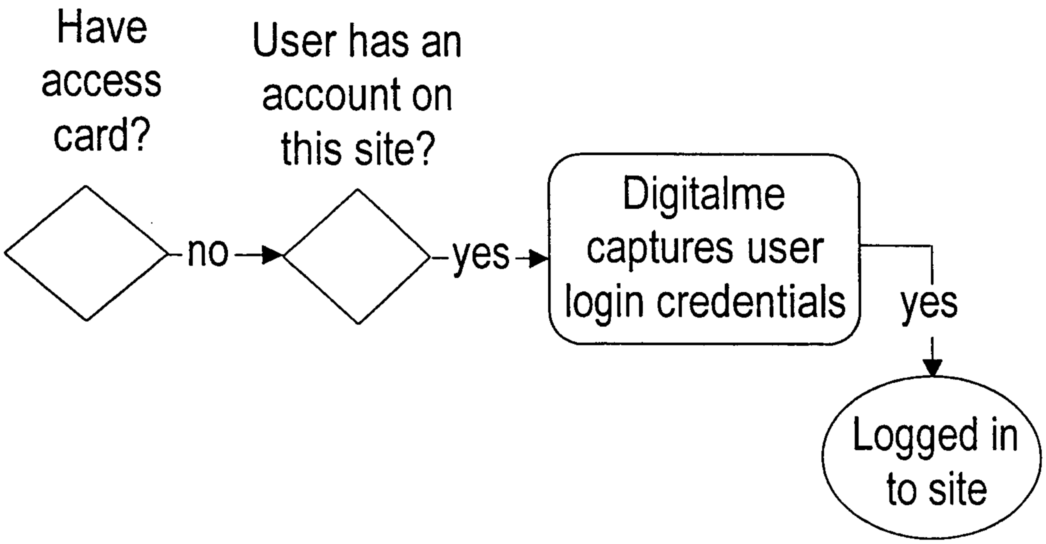
FIG. 33 is a flowchart illustrating a login process at a partner site when the user does not have an access card, according to the invention.

A No Access Card Scenario is illustrated in FIG. 33. If the user 1002 has no accessCard to the partner site, the user will see the site's invitationCard structure, if available. If the user indicates that they have an existing account, the user is taken back to the original site's login location. This time a banner at the top of the page indicates that the login data is being captured. After the user 1002 enters data into the login form and submits it, the user will be logged into the partner site and DigitalMe™ software will have captured this login data as an accessCard structure which can be applied to login automatically in the future. Thus it becomes easier for the user 1002 to return to the partner site.

Note that this case is detected because the servlet is not able to find an accessCard structure of the user for this site. The web sign-on servlet will display the partner's invitationCard, if available, and prompt, to determine if the user has an existing account on this partner's site. When the user indicates that they have an existing account, the user is taken back to the partner's login site. This time the "login using digitalme' GIF and link are no longer displayed; the HTML may be stripped out, it may deactivated, or some other method may be used. The DigitalMe™ software will then place a bold banner at the top of the page instructing the user that their login is being captured. After the user enters data into the login form, and submits the form, the user will be logged into the partner site and DigitalMe™ software will have captured this form's action and post buffers to an accessCard structure for subsequent resubmissions.

Figure 34:
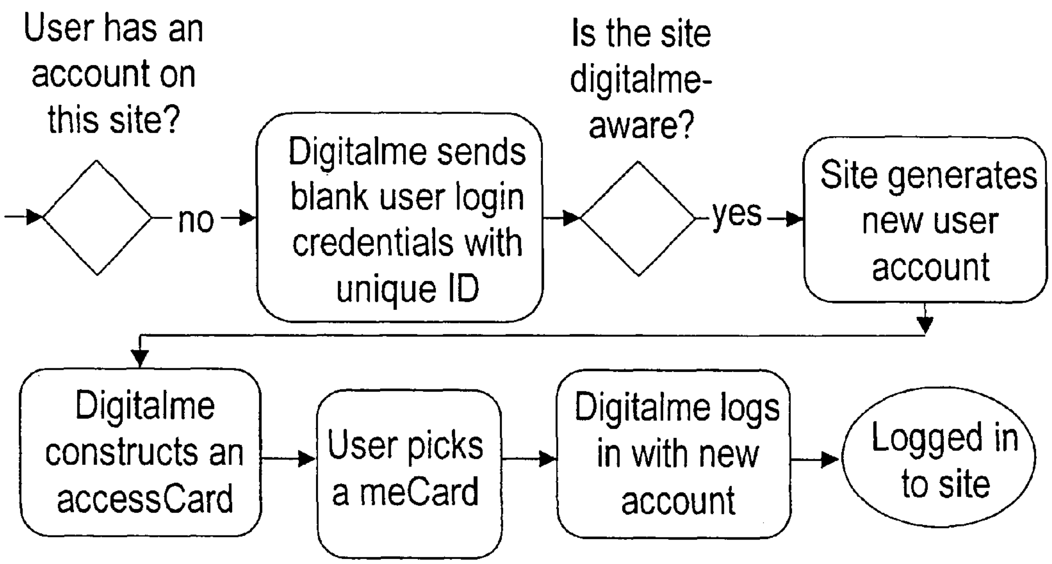
FIG. 34 is a flowchart illustrating a login process at a partner site when the user does not already have an account for the partner site, according to the invention.

A No Account On This Site Scenario is illustrated in FIG. 34. DigitalMe™ software attempts a login with blank login data, except for a globally unique identity for the DigitalMe™ user. The user's browser does not participate in this test. For tailored (DigitalMe™-aware) sites this will succeed, since they are expecting a DigitalMe™ login and will key off the DigitalMe™ unique ID. If the test post is successful, the servlet will construct an accessCard, prompt the user to associate a meCard, and re-issue the post on behalf of the user 1002. The user will now be logged into the partner site.

Note that the digitalme servlet hosts a cache of invitationCard structures for partners. The web sign-on servlet will branch to establish an accessCard relationship between the DigitalMe™ user and this site. This case is detected because the servlet 508 is not able to find the user's accessCard structure that matches the wrapped URL, and the user has responded that he or she does not want to use an existing account on the partner site. A search is made for the partner's matching invitationCard structure. The match is based upon the partner site's login URL. An invitationCard structure is a template for the creation of an accessCard structure. It allows the partner to specify graphics and text that are subsequently placed upon the visual representation of the accessCard structure. These invitationCards are optionally able to require that specific DigitalMe™ information be provided for operation of the accessCard. The user 1002 is prompted to associate an identityCard structure with the newly created accessCard structure. This accommodates the need to generate a globally unique id for the partner site, and also helps set up the partner site to have access to some of the user's identity information at the user's discretion. Under the preferred DigitalMe™ architecture, the user is always in control, and able to update or revoke access to this information at any time.

Figure 35:
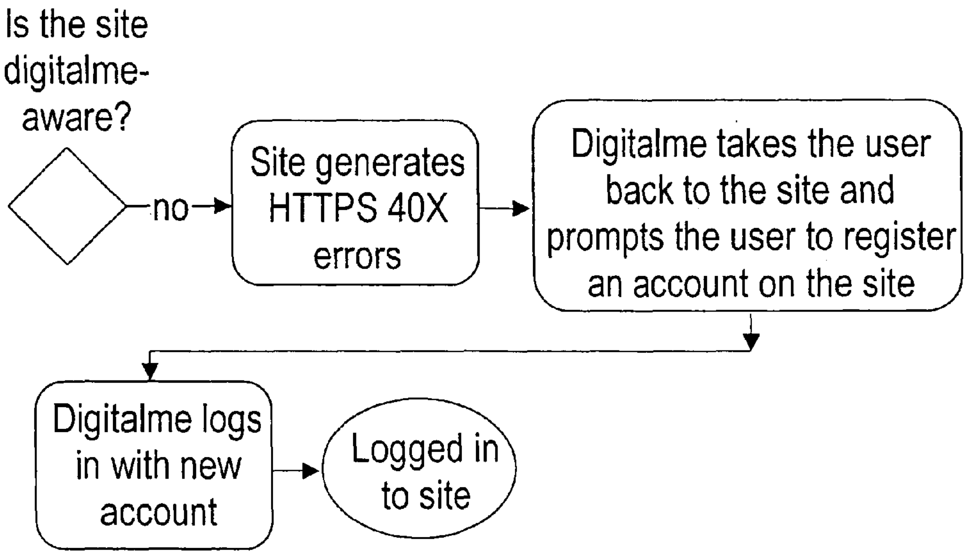
FIG. 35 is a flowchart illustrating a login process at a partner site which is not specifically tailored for digital identity management according to the invention.

A Site that is not DigitalMe™-Aware Scenario is illustrated in FIG. 35. If the test post is unsuccessful (HTTPS 40X errors), then the servlet will take the user 1002 back to the login site and prompt the user to register an account on the site. Then Digital software will start the login with the newly registered account.

Note that the DigitalMe™ web sign-on servlet preferably does not require full participation with the partner site. AccessCard structures can still be created for login sites using a capture mechanism. This case is detected because the servlet is able to find neither an accessCard structure nor an invitationCard structure that matches the wrapped URL, and the user 1002 has responded negatively when asked if they want to use an existing account on the partner site. The servlet will test a post of the login form action with no data, except a globally unique identity for the DigitalMe™ user. The user's browser need not participate in this test. For some sites, this will succeed, since they are expecting a DigitalMe™ login and will themselves key off of the DigitalMe™ unique id. If the test post is successful, the servlet will construct an accessCard structure, prompt the user to associate an identityCard structure, and reissue the post in behalf of the user. The user will now be logged into the partner site. If the test post is unsuccessful (HTTPS 40X errors), then the servlet will take the user back to the login site, but prompt the user to register an account on the site and to reattempt the 'login using digitalme' off of the newly registered account.

Whenever DigitalMe™ software is used to login to a site, a DigitalMe™ globally unique id will preferably be added to the post buffer. The name of this value in the post buffer in one embodiment is IAM-ID. Some partners may use this to completely remove previous registration and login capabilities from their site, offloading these functions wholly to the DigitalMe™ infrastructure. Some partners may use this unique id only to consolidate and identify user accounts across multiple partner sites and multiple partner databases of users, that is, to integrate with their existing backend infrastructures, not to replace them. Some partners may ignore this unique id entirely and rely solely upon the consistent action and values of the post buffer to enable site access.

Partner sites preferably have a variety of options for integrating DigitalMe™ web sign-on, so an administrator can choose the level of integration deemed best for a specific site.

The text below discusses the changes needed to the partner site, from easier to harder.

Under a first option, no changes are made. The partner site is not modified and the processes do not change. This has several advantages. Web sign-on will probably still work for many sites, from both an integrated DigitalMe™ browser toolbar and from a user's list of login sites. Without partner integration, DigitalMe™ software uses a cache of site login credentials instead of requiring the user to type in and remember those credentials.

Under another option, the partner site administrator copies one line of HTML to a location nearby the site's login form. This adds the user convenience of browsing directly to the site and clicking through the site login. The HTML for DigitalMe™ login is static, from the site's perspective. The site will not need to change or update login HTML, but this nonetheless allows the partner site to advertise and use secure NDS authentication.

Under another option, the partner site administrator copies the line of HTML by the site's login form and copies two lines of JavaScript for initializing DigitalMe™ variables for the URL to the partner site and attributes on the user's public meCard structure. This provides access to the user's public meCard information.

Under an InvitationCard option, the partner site will submit to the DigitalMe™ service a visual representation of their site's loginCard and any customer information requirements. This allows a yellow-page-style injection of a loginCard into the user's list of sites. The partner has control of the visual presentation and the customer information requirements.

One option utilizes a DigitalMe™ unique key. This key is always returned as part of the post buffer to the partner's site. The DigitalMe™ provided unique key allows the partner to consolidate digital identities from disparate processes, logins, and customer databases. The key will allow the partner to reduce or forego registration processes, account information storage and collection, and account management.

One option is for the partner site to verify a DigitalMe™ digital signature of the post buffer and a DigitalMe™ X.509 server certificate. Partner sites will thus be assured of the security and authenticity of the login from the DigitalMe™ service.

Another option is to collect customer-offered information. The partner, using a DigitalMe™ API or an identity server 510 HTTP(S) protocol, collects available consumer data (firstname, lastname, email address, etc.). Thus, the partner site could collect consumer information when necessary. This information could be used for consumer convenience, or for demographics, and so on. This information will be maintained by the consumer, and thus presumably has a high likelihood of being completely accurate.

Finally, one option is for the partner site to provide an integrated memberCard structure. By hosting a Provider Identity Server, including a Vault 202, the partner would be able to issue a memberCard or accountCard back to each consumer 1002. These cards could track data pertinent to partner's business. The exchange of information would be bi-directional. These cards would be associated with a meCard structure in the consumer's identity server, and information would be exchangeable to and from the two identity servers. Users 1002 would be able to view and edit any account information at the discretion of the partner. This relationship and any granted information access can preferably be modified and/or terminated by either party.

Every accessCard in this DigitalMe™ architecture is associated with a user's meCard structure. A partner site, when enabled using the DigitalMe™ API or the identity server HTTPS protocol, has the ability to further discover the DigitalMe™ identity information attached to the associated meCard structure. Because this might be an unexpected or unintentional side effect to the user 1002, the meCard information is only made available to the partner if the user has flagged the meCard as a public identity. In some embodiments, the partner site is able to negotiate more fully with the user 1002 over what identity information the user 1002 will be required to make available for the activation of the accessCard. In other cases, this public access flag is a compromise between user control and partner site information needs.

An illustrative public meCard structure has the attributes 'FirstName', 'LastName', and 'EmailAddress'. When the associated meCard has the public access flag set and the site's action post buffer specifies an SSL connection, DigitalMe™ code adds an additional value to the site's login action post buffer. The name of this value in the post buffer is IAM_ACCESS. This value represents the credentials, in URL form to access the user's identity information from the DigitalMe™ API or the identity server HTTPS protocol.

Security is important to all parties involved, and will be continuously advanced as new technologies are integrated with this DigitalMe™ architecture. In one embodiment, DigitalMe™ code connects parties with SSL to ensure security and authenticity. From the Novell provided "login using DigitalMe™" image, an SSL (HTTPS) connection to the DigitalMe™ server is established. The server's certificate is checked by the browser, and the user is warned if the server is not authentic. The DigitalMe™ server then collects the credentials of the user by prompting for a user ID and password. At this point, both the user and the DigitalMe™ server have been authenticated with industry standard security technologies.

Next, the DigitalMe™ servlet 508 will establish another connection to the partner's login site from the user's browser and post an action and buffer. When this post occurs over an SSL connection, the partner's site will be assured that the transmitted information is secure, but there is no assurance that the post, although apparently originating from the DigitalMe™ server, is indeed authentic. To provide this assurance of authenticity, the action post buffer will include two more attributes, which provide a digital signature of the post buffer. IAM_DIGEST will be set to, e.g., an RC5 encrypted SHA-1 digest of the previous contents of the post buffer. An IAM_CERTIFICATE will be set to the public key certificate of the DigitalMe™ server. The partner's site is encouraged to verify both the signature digest and the validity of the server's certificate. Additionally, the partner's site preferably uses SSL3 connections to the identity server's HTTPS protocol, and requests and verifies the identity server's "client" certificate.

In summary, partner integration options include adding the DigitalMe™ web sign-on HTML close to site's login form or replacing the login form entirely; integrating site processes to use a returned DigitalMe™ unique ID; getting a user's public meCard information; querying available customer information using DigitalMe™ APIs and/or protocols; publishing an invitationCard for use during user registration and as a visual representation to the customers of their access to the partner site; and/or verifying the post buffer's digital signature and certificate for secure authenticity.

In one version, the DigitalMe™ architecture includes one consumer identity server, at www.digitalme.com. As more consumer identity servers come online, the site www.digitalme.com can evolve to be a central name space router to these distributed identity servers. These down-line identity servers 510 can be identified by augmenting the digitalme- .com domain name. Thus, if an identity server were hosted for the residents of Orange County, Calif., its DNS name might be “oc.ca.us.digitalme.com”. When the locale of the DigitalMe™ user 1002 is deterministic, the redirection from www.digitalme.com to, in this case, oc.ca.us.digitalme.com will be automatic. Otherwise, the user will be prompted to help select the identity server serving their community. The selection will be cached when possible.

Turning now to details involving HTML and scripting, it will be appreciated that incorporating HTML described below into a page will facilitate the process of leveraging DigitalMe™'s web sign-on capabilities for an affiliated partner site.

For simple integration, a piece of JavaScript is hosted on the DigitalMe™ site so that partners are protected from changes to the referenced JavaScript, graphic, or servlet: <script src=“https://www.digitalme.com/servlet/DMPartnerServlet/setupPartnerLogin”> </script>

In an alternative embodiment, the partner site adds ‘<scriptlanguage=“JavaScript”src=http://www.digitalme-.com/partner/websignonl.js>, the digitalme Web Sign-On HTML, to site's login page, close to the login form, or replaces its login form entirely. One may use ‘<script language=“JavaScript” src=http://192.108.102.38/partner/websignonl.js></script>’ to test against the partner site.

As to DMPartnerServlet commands, setupPartnerLogin adds the DigitalMe™ hand graphic and JavaScript to enable the servlet, and listErrors displays a list of all errors and error messages. For example:

https://www.digitalme.com/servlet/DMPartnerServlet/listErrors

As to DMPartnerServlet arguments, an image argument to DMPartnerServlet can be specified as part of the query string; “image” specifies the name of the image (.gif, .jpeg) that the partner wants to display. These images are controlled by Novell, so the partner is not specifying a full path, just the name of the image. If not used, a default image will be displayed. For example:

https://www.digitalme.com/servlet/DMPartnerServlet/setupPartnerLogin?image=dmlogin_partner.gif As to requesting user 1002 information from the DigitalMe™ site, the partner can simply request info about the customer from the DigitalMe™ server. The information is returned in a post to a CGI on the partner site. This is done by adding the following info:

```
<script>
var IAM_RedirectURL="<url to cgi on the partner site>";
  //Required
var IAM_Attribute="<name1>, <name2>, <name3>, . . . ";
  //OPTIONAL
</script>
```

In another embodiment, XML can be used in place of the variables.

Variable descriptions for one embodiment follow; all variable names are case sensitive.

IAM_RedirectURL is the full path to the URL that the information will be posted to. If the partner site administrator wants information returned, then this variable is required. Otherwise, the simple case explained above is executed. If an SSL connection is not specified, then only the IAM_ID value is returned. Thus, IAM_RedirectURL must begin with “https:” rather than “http:”. For example:

var IAM_RedirectURL=“https://www.acme.com/servlet/GetInfo”;

IAM_Attribute is a comma-delimited list of attribute names requested from the servlet. The attribute's names are identical to those seen on digitalme.com (i.e. “FirstName”, “LastName”). The only attributes available are those to which one has authorized access. If IAM_Attribute is not used, then all available attributes will be returned. For example:

var IAM_Attribute=“First Name, Last Name, Work Email Address, Birthday”;

The information is returned in a post. All attributes have the “IAM_” key word prepended to the attribute name. They are as follows:

IAM_ID is a globally unique ID for the user.

IAM_Access is the credentials to access the user's identity information.

IAM_Digest is an RC5 encrypted SHA-1 digest of the data being sent.

IAM_Certificate is the public key certificate of the DigitalMe™ server.

IAM_Error is an error number that is sent only if an error has occurred.

IAM_ErrorDescription is a verbal description of the error is sent if IAM-Error is sent.

IAM_<Attribute>: All attribute information is returned prefaced by IAM_. So if one requested “First Name”, “IAM_First Name” is sent with its value.

In one embodiment, incorporating the HTML ‘script language=“JavaScript” arc=“http://wwwldigitalme.com/partner/websignonl.js”></script>’ into a partner site's login page will start the process of leveraging DigitalMe™ web sign-on capabilities for that site. This JavaScript is hosted on the DigitalMe™ site so the partners are protected from any changes to the referenced JavaScript, graphic, or servlet. The contents of the JavaScript is:

```
var dm_host=https://www.digitalme.com; //The partner site has this
specified as 'https://192.108.102.38'.
var dm_servlet=dm_host + "/servlet/DMFormsServlet";
var dm_gifPath="/partner/dmlogin_partner.gif"
document.write('<a href="javascript:DMSignOn( )"
ADD_DATE="937255141"
LAST_VISIT="0"
LAST_MODIFIED="0"><img src=' + dm_host + dm_gifPath +
' border=0 alt="Logon from digitalme"></a>');
function DMSignOn( ) {
    dl=location.href;
    if (dl.indexOf(dm_servlet) != -1) //Re-entrancy guard.
        alert('This feature is not available at this location.');
    else {
        location.href=dm_servlet + '/getli'+ '?url=' + escape(dl) +
    '&title=' + escape(document.title);
    }
}
```

Digital Identity Cards

One aspect of the invention allows users 1002 to beam business card applications, referred to as DigiCard™ instances, between handheld devices such as Palm brand computing devices. Unlike a simple electronic business card, the business card application includes not only data (name, phone number, address, etc.) but also a graphical user interface and corresponding code to implement the interface functions. Unlike existing beamed applications, the business card application may be specific to business cards, may include both code and data, and supports business card Profiles 300.

In some embodiments, the invention also supports data synchronization through a link with a DigitalMe™ server 504/510 or the like, regardless of whether data alone or data and code are beamed. Support for Profiles 300 means that the business card owner has control over which information is beamed to a given recipient. For instance, a default Profile 300 might include only a person's name and work telephone number, while a Profile 300 for friends also includes a home telephone number. A handshake is performed by the sender and recipient devices to determine what business card data gets beamed to the recipient. If the recipient is known to the sender's directory service (e.g., NDS in a DigitalMe™ environment) then the permissions/access rights specified in the directory control what is beamed. If the recipient is not known to the sender's directory, then the default (e.g., minimal) business card data is beamed. Thus, different recipients will receive different business cards from a given sender, depending on their relationship with the sender, without requiring the sender to keep multiple distinct cards explicitly and without requiring the sender to edit the information manually before it is beamed.

When the DigiCard™ application is used in a DigitalMe™ environment, recipients' copies of the previously received business card data can be updated when the recipients log into a DigitalMe™ server 504. Thus, their copies are synchronized with the current master copy maintained by the sender 1002 in the DigitalMe™ environment.

Figure 36:
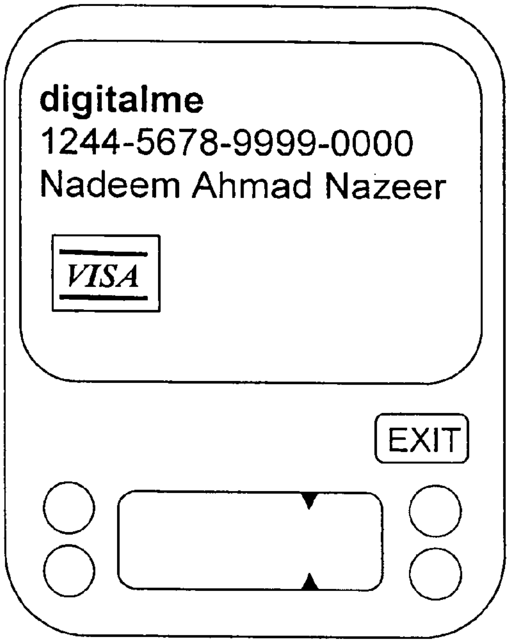
FIG. 36 illustrates a credit card structure embedded in a handheld computing device.

"Business cards" as discussed herein may include information such as credit card information. FIG. 36 shows an example of a Visa-brand credit card issued to an inventor (as a user 1002) by a DigitalMe™ service or the like; the card has the inventor's name and a sample account number on it. When the inventor (as a user) beams this card to a restaurant, for instance, the receiving machine verifies the account with the bank and does the transaction. In some cases the beamed card may be used in other ways, such as a serving as an access card which unlocks a hotel room or other locked room. These cards have the digital certificates issued by the issuer of the card, which can be verified upon use.

Figure 37:
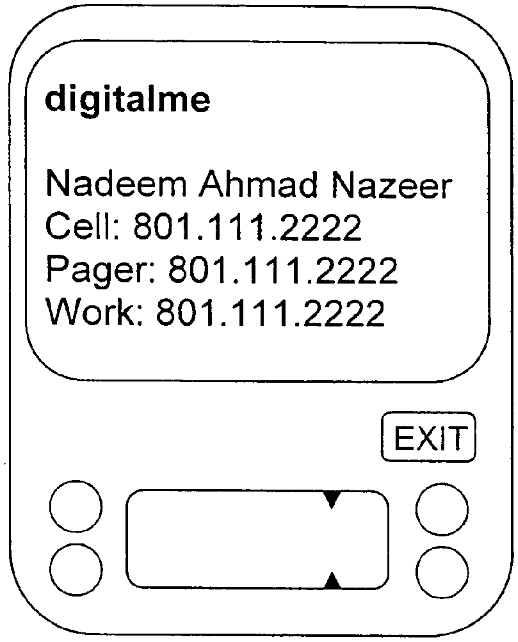
FIG. 37 illustrates a shared digital identity card according to the invention as it is referenced on a handheld computing device.

FIG. 37 shows an example of sharing a digital business card, namely, an example of how an inventor's business card looks when beamed to another person. The inventor (as the user 1002) gave that person access to the inventor's cell phone number, pager number, and work phone number. Of course, one can add or subtract other fields on such beamed or transferred cards, depending on what information one is sharing with the recipient in question.

Figure 38:
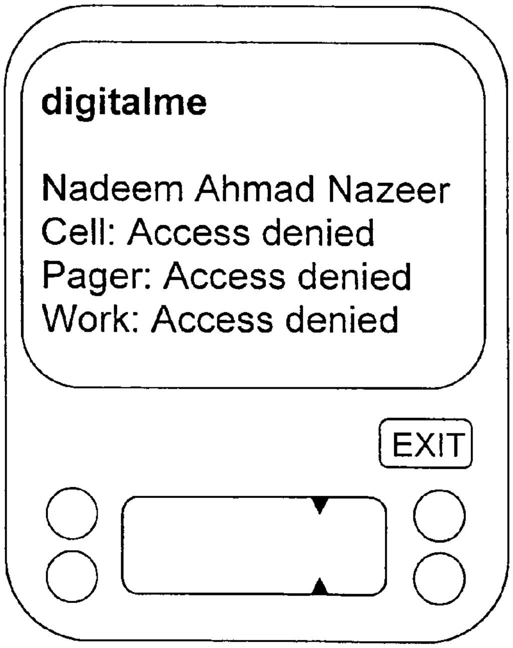
FIG. 38 illustrates an attempt by a recipient to access digital identity card data after the data owner has revoked the recipient's access.

FIG. 38 shows an example card at a recipient screen after the inventor (user 1002) revoked the recipient's access to inventor information in DigitalMe™ Profiles 300 and after the recipient did a "HotSync" or other synchronization with a DigitalMe™ server 504 or the like.

Figure 39:
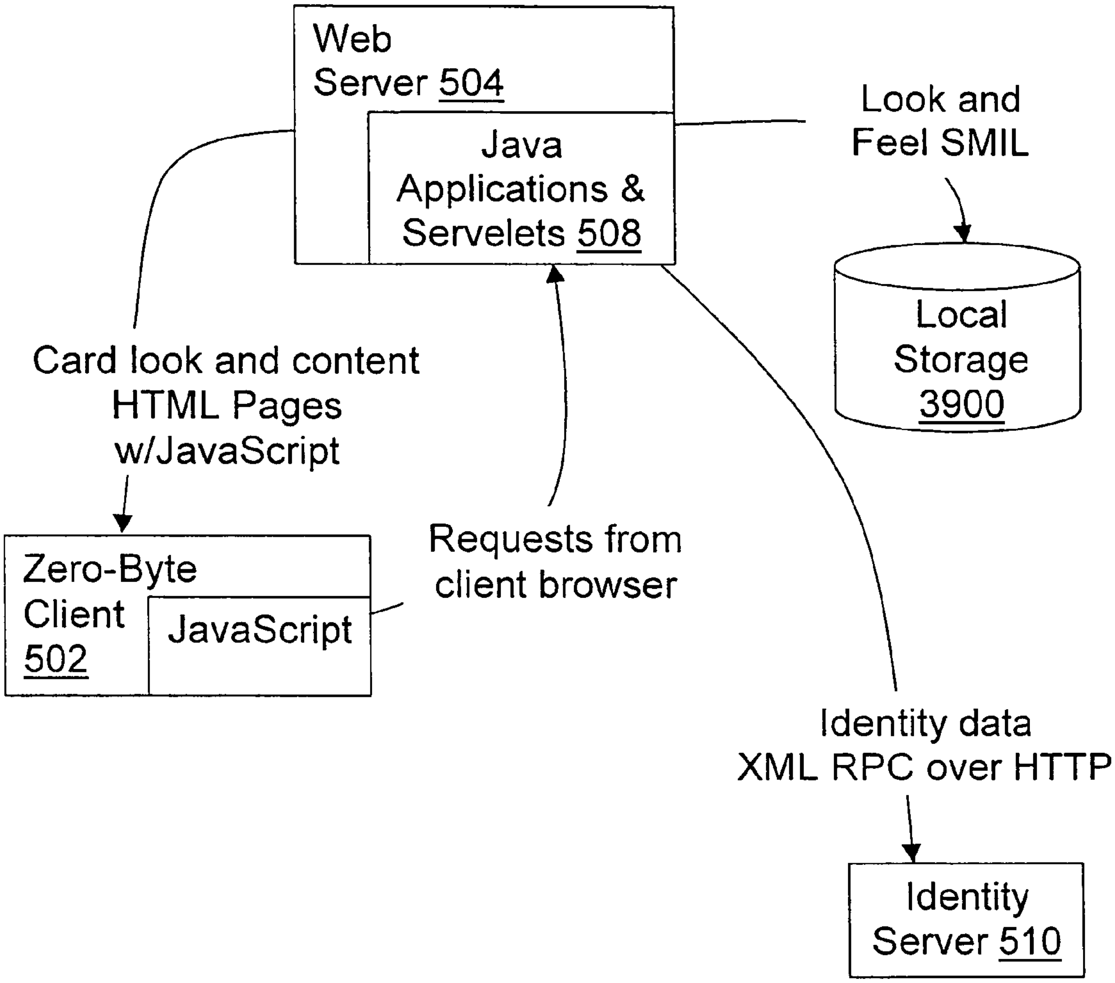
FIG. 39 is a diagram illustrating digital identity card implementation using a set of applications and servlets according to the invention.

In various embodiments, the inventive technology provides a visual card representation of identity data, allows users 1002 to change the look of the card, allows users 1002 to dynamically grant/revoke rights to the identity data, allows users 1002 to select a subset of their identity information to associate with the card, and/or allows negotiation of card content between an organization and the card owner 1002. In one embodiment, the technology includes both the meCard™ and memberCard™ identity cards. Identity cards may be implemented, in languages such as Java, using a set of applications and servlets 508 running on a DigitalMe™ web server 504, as shown in FIG. 39 or FIG. 40. The DigitalMe™ web server 504 stores and retrieves identity data to and from NDS via the DigitalMe™ access methods discussed here, using its XML RPS connection to the identity server 510 where the data is stored.

In the illustrated system, the look and feel of cards is handled on the web server 504 itself, using a local file system 3900. However, since the files representing look and feel are referenced by URL, either local or remote storage could be used.

One important characteristic of this technology is the use of SMIL (Synchronized Multimedia Integration Language) v1.0 to integrate a set of independent visual objects into a single presentation. For more information on SMIL, reference may be made to http://www.w3.org/TR/REC-smil. A sample SMIL-based card design is also shown below:

```
<smil>
    <head>
        <meta name="title" content="Digital Me Card Info" />
        <meta name="author" content="Mike McDonald and
Douglas Phillips" />
        <meta name="copyright" content="© 1999 Novell" />
        <layout>
            <!-- Root Layout Specifies Card Size -->
            <root-layout width="155" height="100" />
            <!-- Background Region -->
            <region id="back" left="0" top="0" width="155"
height="100" z-index="2" />
            <!-- Frame Region -->
            <region id="frame" left="0" top="0" width="155"
height="100" z-index="2" />
            <!--Graphic Element Regions -->
            <!--Text Element Regions -->
                <region id="element0" left="1" top="82"
width="152" height="15" z-index="3"
title="mmcdonald@novell.com" foreground-color="#ffff99"
font="Bookman Old Style-plain-12" />
                <region id="element1" left="84" top="7"
width="53" height="20" z-index="4" title="Mike" foreground-
color="#ffff99" font="Bookman Old Style-bold-16" />
                <region id="element2" left="64" top="21"
width="93" height="20" z-index="5" title="McDonald" foreground-
color="#ffff99" font="Bookman Old Style-bold-16" />
                <region id="element3" left="66" top="21"
width="93" height="15" z-index="6" title="digital" foreground-
color="#ffff99" font="Bookman Old Style-bold-12" />
                <region id="element4" left="109" top="61"
width="22" height="15" z-index="7" title="m" foreground-
color="#ff3333" font="Bookman Old Style-bold-12" />
                <region id="element5" left="138" top="61"
iwidth="17" height="15" z-ndex="8" title="e" foreground-color="#
ff3333" font="Bookman Old Style-bold-12" />
                <region id="element6" left="122" top="59"
width="23" height="15" z-index="9" title="ik" foreground-color="#
ffff99" font="Bookman Old Style-bold-12" />
        </layout>
    <head
    </body>
        <!-- Background Images -->
        <img src="boingoback.gif" region="back" />
        <!-- Frame Images -->
        <img src="null" region="frame" />
        <!—Graphic Element Regions -->
        <!—Audio Elements -->
        <audio src="avemaria.au" region="audio" />
    </body>
</smil>
```

When a user 1002 creates a DigitalMe™ account, a default meCard identity card is generated from the user's Public identity, with a look and feel that the user selects from design templates. A variety of design templates may be used, with various backgrounds, various placements of the DigitalMe™ mark or other provider mark, and various graphic design elements. In one embodiment, the user 1002 selects a design pack to choose the options for background and frame style design elements. Once a design pack is selected, a background, border style, text option, and text color can all be selected to personalize the meCard structure.

Figure 42:
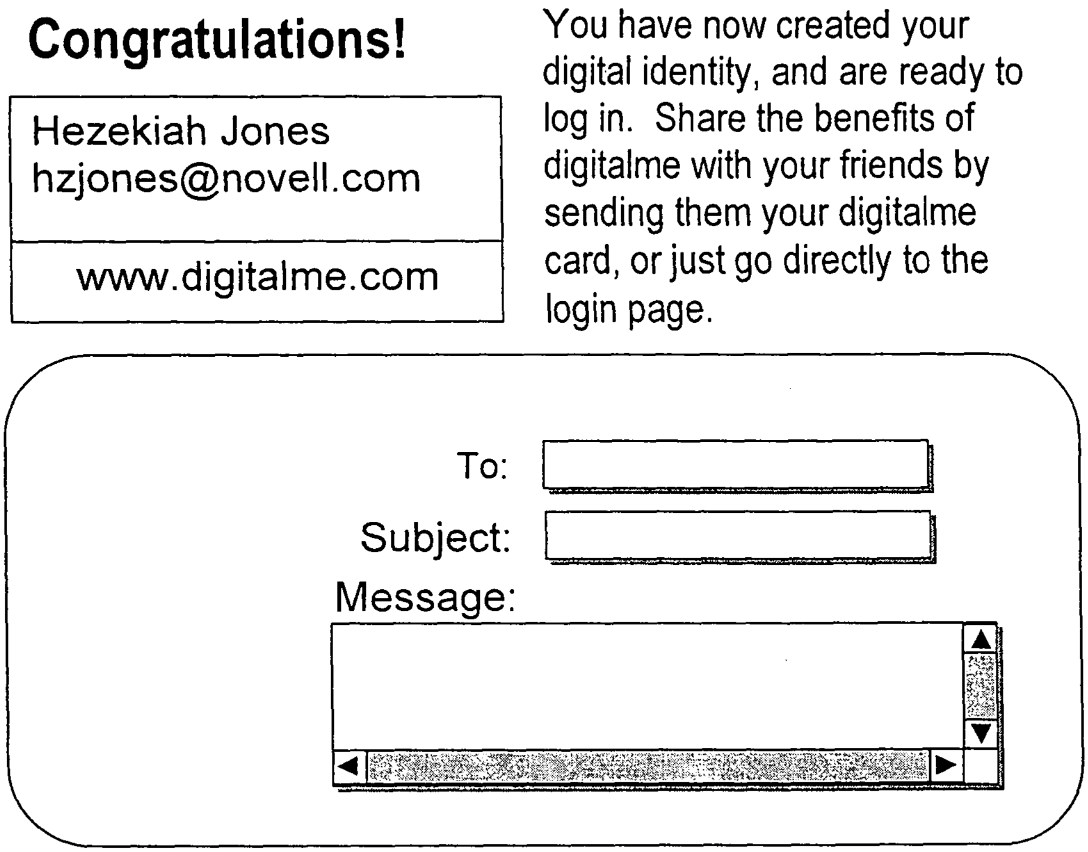
FIG. 42 is a portion of a user interface illustrating a result of creating a digital identity card according to the invention.

A DigitalMe™ user 1002 can send a meCard identity card to another user, as illustrated for instance in FIG. 42. When a card is sent to a non-DigitalMe™ address, the recipient gets an HTML-formatted representation of the card via email. The recipient can view the card and its associated information. If the recipient elects to join the DigitalMe™ community, the card will be included in the recipient's Contacts List.

When a card is sent to an existing DigitalMe™ user, that card is listed in the user's in-box. The card can either be accepted or rejected. If accepted, the card is listed in the recipient's Contacts List. The sender/owner of a digital identity card can preferably always revoke access to the card or specific information on the card. This gives the user 1002 complete control of identity information, which is a feature of the preferred DigitalMe™ architecture and other architectures according to the present invention.

Identity Server Appliance

In the Internet space, independent Internet Service Providers and other entities sometimes resist products branded or associated with particular vendors. This may present a considerable barrier to entry and acceptance. For instance, such an entity may be reluctant to install Novell NetWare servers to host a special version of NDS supporting an identity Vault 202. However, creating an 'unbranded', stand-alone, Internet product solution that is virtually self-installing and self-managing is an option many entities would more readily consider.

Such an appliance solution would define a new class of server, the Identity Server (also called the "Vault Appliance"), which is one version of the identity server 510. The Identity Server is packaged as a stand-alone product or "appliance", so it can preferably be brought in, set down, plugged in, and used without complicated NetWare or NDS installs. If the customer should ever decide to uninstall the Identity Server, a simple unplugging will preferably do that.

The Identity Server implements features and facilities of the DigitalMe™ architecture. It houses the secure store or Vault 202, and provides Internet standard ways of accessing the data in a secure manner, as discussed elsewhere herein. The Identity Server preferably appears on the network as a specialized HTTP or Web server. This is especially preferable for server and NDS management functions. The Identity Server may not even require a monitor.

One embodiment provides a method and apparatus for securely accessing DigitalMe™ Identity Server hosted data using Internet standard protocols while extending Remote Procedure Calls as described by an extension to the evolving XML-RPC description, also known as IDSXMLRPCAP (Identity Server Extensible Markup Language Remote Procedure Call Access Protocol) or IAM—Identity Access Method.

During DigitalMe™ development, it was recognized by Novell that DigitalMe™ architectures would greatly benefit from a quick, fast, robust, and open standard method of gaining and providing secure access to data stored and maintained by the DigitalMe™ Identity Server Appliance across the Internet. The standard Novell proprietary access protocol, Novell Core Protocol (NCP) was available, but required any requesting client to either have intimate knowledge of NCP or have an installed Novell Client to act on its behalf. Requiring a Novell Client nullified the concept and requirement of an initial zero-byte DigitalMe™ browser base client 502. The remaining choices were to use a form of NCP over Hypertext Transfer Protocol (HTTP) or secure Hypertext Transfer Protocol (HTTPS), or to use LDAP, which would have required considerable "enhancements" and "extensions". Conceivably, a proprietary protocol format could be devised to describe NCP requests and responses that could be transferred over HTTP, but this would result in yet another proprietary protocol. The advent of the HTTPSTK NLM created by Novell made HTTP(S) access to NetWare and NDS not only feasible, but efficient.

However, a standard extensible request description format or language was still required. One document description language that has been coming into favor is the Extensible Markup Language ("XML"). Describing NCP requests using XML could have been accomplished but might have resulted in yet another proprietary access protocol. An evolving, yet relatively unknown protocol description was investigated, adopted and extended; this protocol was XML-RPC.

As noted on the www.xml.com web site, XML-RPC is a specification and a set of implementations that allow software, running on disparate operating systems and running in different environments, to make procedure calls over the Internet. In particular, XML-RPC is remote procedure calling using HTTP as the transport and XML as the encoding. It is apparently designed to be as simple as possible, while allowing complex data structures to be transmitted, processed and returned.

An XML-RPC message is an HTTP-POST request. The body of the request is in XML. A procedure executes on the server and the value it returns is also formatted in XML. Procedure parameters can be scalars, numbers, strings, dates, and so on, and can also be complex record and list structures. Example XML-RPC requests and responses, header requirements, notes on syntax, and other pieces of background information are readily available online from sites such as www.xmlrpc and my.userland.com, and in the incorporated applications.

The DigitalMe™ Vault 202 development team investigated implementation of the Identity Server access methods using the XML-RPC description, and extended XML-RPC to satisfy the DigitalMe™ requirements. An example of a DigitalMe™ XML-RPC request and response follows:

```
digitalme Request:
<?xml version="1.0"?>
<methodCalls>
 <methodCall>
  <methodName>storage:getAttributeList</methodName>
  <params>
   <param>
    <value>NWDS://DAH/Safes/Safe12/Default
    Profile.IAM:Profile</value>
   </param>
  </params>
 </methodCall>
</methodCalls>
digitalme Response:
<?xml version="1.0"?>
<methodResponses>
<methodResponse>
  <methodName>storage:getAttributeList</methodName>
  <params>
    <param>
      <struct>
        <member>
          <name>Object Class</name>
          <value>IAM:Profile</value>
        </member>
      </struct>
    </param>
    <param>
      <struct>
        <member>
          <name>Object Class</name>
          <value>ndsContainerLoginProperties</value>
        </member>
      </struct>
    </param>
    <param>
        <struct>
          <member>
          <name>Object Class</name>
```

-continued

```
        <value>IAM:Profile Abstract Class</value>
      </member>
    </struct>
  </param>
  <param>
      <struct>
        <member>
        <name>Object Class</name>
        <value>Top</value>
      </member>
    </struct>
  </param>
  <param>
      <struct>
        <member>
        <name>Object Class</name>
        <value>Home Contact Info</value>
      </member>
  </struct>
  </param>
  <param>
      <struct>
        <member>
        <name>Object Class</name>
        <value>Work Contact Info</value>
      </member>
    </struct>
  </param>
  <param>
      <struct>
        <member>
        <name>Object Class</name>
        <value>Alternate Contact Info</value>
        </member>
    </struct>
  </param>
  <param>
    <struct>
      <member>
        <name>Object Class</name>
        <value>Personal Info</value>
      </member>
    </struct>
  </param>
  <param>
    <struct>
      <member>
        <name>OU</name>
        <value>Default Profile</value>
      </member>
    </struct>
  </param>
  <param>
    <struct>
      <member>
        <name>Revision</name>
          <value><int>7</int></value>
          </member>
    </struct>
  </param>
  <param>
    <struct>
      <member>
        <name>GUID</name>
        <value><base64>gQbsifZQ0xGJcwgACaxR4w==
        </base64></value>
      </member>
    </struct>
  </param>
  <param>
    <struct>
      <member>
        <name>Home City</name>
        <value>Provo</value>
      </member>
    </struct>
  </param>
  <param>
    <struct>
      <member>
```

-continued

```
        <name>HomeStateProv</name>
        <value>UT</value>
      </member>
    </struct>
  </param>
  <param>
    <struct>
      <member>
        <name>Home Telephone Number</name>
        <value>(801)555-1234</value>
      </member>
    </struct>
  </param>
  <param>
    <struct>
      <member>
        <name>Home Cellular Telephone Number</name>
        <value>>(801)555-4567</value>
      </member>
    </struct>
  </param>
 </params>
</methodResponse>
</methodResponses>
```

One familiar with NDS 618 access may recognize the above XML-RPC transaction as a request for the attribute values of the "default Profile" attribute of the "DAH/Safes/Safe12/" object. Although XML-RPC provides a basis for this DigitalMe™ implementation of the Identity Server access method, it is used in a non-traditional Web Server environment, HTTPSTK, to access NDS services and the NetWare file system. This confluence of technologies presents an opportunity to alter client/server access methods to use NetWare and NDS for relatively easy and secure access across the Internet. The HTTPSTK NLM may be bundled with the NetWare product, possibly in combination with a reimplementation of the Xplat and Dclient libraries using this protocol technology to provide NetWare and NDS applications that are freed from the dependency upon the "Fat" client. Applications that previously required the full "Fat" client can now be deployed on any platform that supports TCP/IP (even alongside the Microsoft client) without the burden of the huge download and install. Platforms that were previously unattractive for NDS application developers can now use industry standard access methods to access NetWare and NDS, which was apparently a goal of LDAP and JNDI. A special purpose HTTP responder and its associated service modules installed and delivered for every NetWare box and every NDS installation could provide services and benefits that other network vendors would have difficulty providing in the near time frame.

In short, one important aspect of the invention is use of a text document description language to describe and build and extensible infrastructure implementing core networking and directory service protocols. This includes implementing core networking and directory service protocols using a text document description language transported over an open standards hypertext transfer protocol. Bringing together non-core networking protocols (document description languages and text transfer protocols) in this manner provides basic network and directory service access in a simple and secure fashion. Using this access protocol technology maintains or improves scalability and performance. With the potential to "batch" requests, the XML-RPC payload can contain multiple requests. The use of this technology could also reduce network traffic, thus improving throughput.

Embossed Computer Icons

Figure 43:
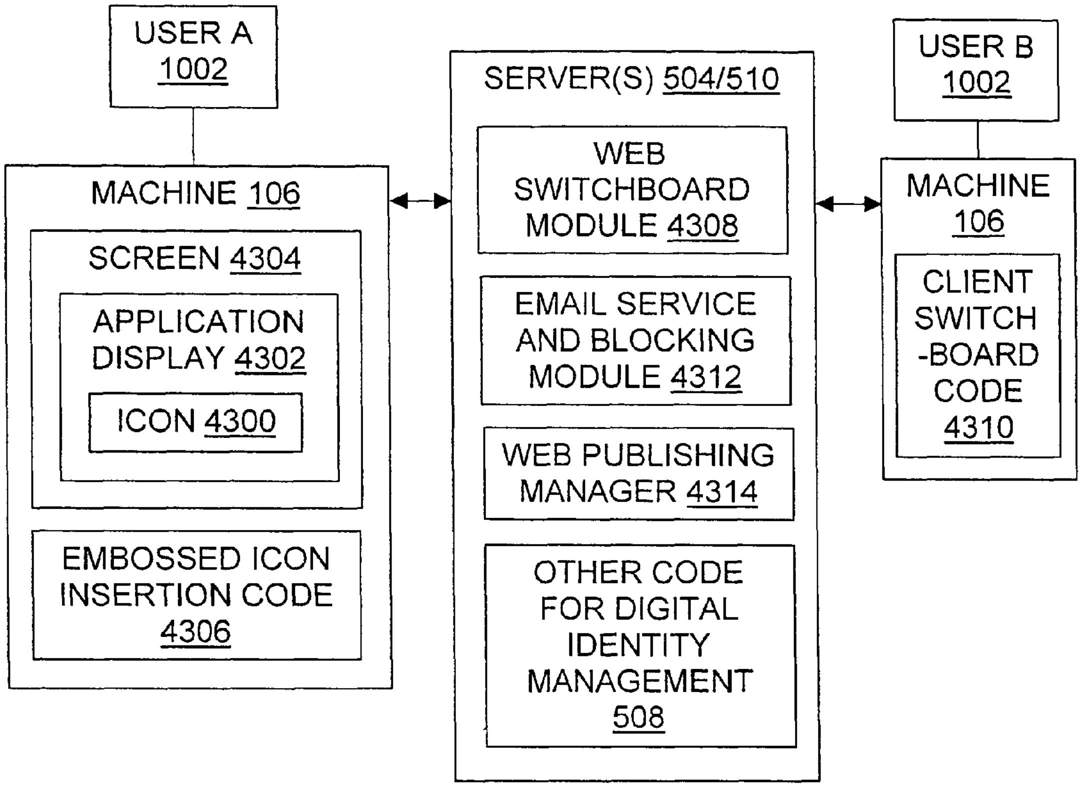
FIG. 43 is a diagram illustrating additional features of some systems according to the invention, such as a web switchboard, embossed icons, email blocking, and web publishing management.

With reference to FIG. 43, an embossed icon 4300 is a graphic icon that presents itself as an embossed shape or logo atop an associated application. For the most part the icon is transparent, and unobtrusive to the user of the underlying application. But the icon will be recognizable enough to convey brand, trademark, identity, and value. A user 1002 will recognize that the application is being augmented by an otherwise hidden computer process. Some implementations animate the embossed icon 4300 to show immediate processing activity. Information about any or all of the activity, brand, value, current operation, or other information may be conveyed to the user through use of the embossed icon. Thus, the invention provides a way to unobtrusively indicate the presence and activity of a hidden software process which is acting on top of and in conjunction with another, but otherwise unrelated, application. It is assumed that the hidden process is adding value to the application, but without some visual indication of this it is difficult to protect and project this value to the user 1002.

The invention applies a concept used in television media, but as yet (so far as the inventors know) not applied in computers according to the present invention, in order to alleviate these recognition concerns. That is the concept of a graphic icon that presents itself as an embossed shape or logo atop the associated application, e.g., in an application's screen display area 4302 on a monitor or other display device 4304. For the most part the icon is transparent, and unobtrusive to users of the underlying application. But the icon 4300 will be recognizable enough to convey brand, trademark, identity, and value. The user 1002 will recognize that the underlying application is being constructively and desirably augmented by an otherwise hidden computer process. The invention can be additionally enhanced by animating the embossed icon to show immediate processing activity.

Television channel feeds use embossed icons for brand recognition and copyright, but this differs from embossed icons 4300 on a computer used according to the present invention to brand the constructive augmentation of one process which is enhancing another process. Several computer operating systems have a system tray that shows icons for running applications, but this is not the same, because there is no apparent connection between icons in the tray, and no indication that they are cooperating together or adding value to one another. Some applications, such as Internet browsers, add icons to a toolbar when their functionality is enhanced by a plug-in. But these icons are visually associated with the browser rather than being visually associated with the current activity in the display area 4302, and these icons are static in that they remain present whether the plug-in is in use or not. By contrast, the invention allows Novell and its licensees to protect brand and value recognition to end-users, even if the software they produce previously had no active visual presence to garner recognition of the significant value being provided to the user. The icon 4300 may be representative of any of a wide variety of value-adding agents, such as agents for filtering or content blocking.

The invention optionally also provides a transaction history mechanism. After the embossed icon 4300 is no longer visible because the agent it represents is done, there remains behind a visual indication (e.g., a related but visibly different icon 4300) on the resource that indicates activity has occurred. Alternatively, the visual icon indicates that activity has occurred and has not yet been reviewed by the user. The user is normally the resource owner. Selecting this icon provides the user with access to the transaction log and/or otherwise allows the user to obtain more information concerning the transaction(s) performed by the agent. The icon 4300 may also provide an authentication mechanism for login and/or provide a launch point for launching other applications, e.g., email or instant messaging applications.

This aspect of the invention may be implemented in at least two different ways. First, a proxy 4306 may be run locally on a user's machine 106 to inject a Java script into every web page that is loaded into the browser 1314, or into selected web pages. The Java script displays the embossed icon 4300, and provides the transaction history mechanism discussed above if so desired. Alternately, if the Microsoft Internet Explorer browser is used, the Microsoft API provided for writing into the data stream can be used to inject the icon code. A callback function 4306 is registered with Internet Explorer through the API. The registered callback function is called when the page is loaded, and it then modifies the displayed page to show the embossed icon and provide a transaction history if so desired. The Netscape browser and the Microsoft Internet Explorer browser each provide a "floating layer", in which the icon 4300 can be displayed.

Web Switchboard

With continued reference to FIG. 43, an inventive name-to-address translation module 4308 keeps track of how two end-points (users 1002 or hosts) can connect to each other on a net using Dynamic Host Configuration Protocol ("DHCP"). Under DHCP an end point is given a new address each time they log in. As a result a source has no idea what the address of its destination is and the destination does not know the source's address. The invention allows two users 1002 using DHCP to find each other on the net 104 using, e.g., an "Instantme" service and NDS 618 according to the invention. This is useful in a web switch board for people using Voice-over-IP, for instance.

This switchboard module 4308 permits people and software to determine the last known IP address of a particular person (or machine). In operation, it may be used as follows. The user 1002 turns on a computer (e.g. a laptop, PDA, or desktop). That machine 106 connects to the Internet 104 and gets assigned an Internet Protocol (IP) address. The user then logs onto a service such as Novell's DigitalMe™ service; this may be accomplished by the software discussed herein. During the login process, the user 1002 provides authentication information that permits the service to identify the user.

A piece of client software 4310 on the user's current machine 106 sends the machine's current IP address and the user's identifying information to the switchboard module 4308 on the DigitalMe™ server 504 or the like. The switchboard module 4308 thus maintains a table or other data structure which identifies the last known IP address for a given DigitalMe™ or similar user 1002. The client software 4310 may be pre-loaded on the user's machine 106, or it may be downloaded by the user for this purpose if the user is at a machine that's new to the user, for instance.

In the case of the DigitalMe™ service, the user also has a Profile 300 which specifies types of user-specific information and groups of people who can access that information. If the Profile 300 for the user allows someone making a query to learn the user's last known IP address from the service, then the web server 504 or identity server 510 can provide that information to the person or software agent that is making the query.

After learning a person's last known IP address, the person or agent making the query can then retrieve a web page from the located user 1002 if a web server is running on that machine, or establish a peer-to-peer connection directly with the located user to perform other exchanges. In this way, a particular user 1002 can be contacted directly even if they use different machines at various times. A given user 1002 can likewise be contacted if they use a machine that has dynamically allocated IP addresses which change over time.

Email Blocking

Conventional approaches to email blocking are based on the sender's email address. For instance, a conventional "white list" filter only allows passage of email whose source is (at least apparently, as indicated by the email header) an email address on a list of approved addresses. A conventional "black list" filter similarly refuses passage of an email message whose apparent source is on a list of disapproved addresses.

By contrast, an email module 4312 of the present invention permits use of the recipient's email address as a basis for filtering. A DigitalMe™ server or the like using the module 4312 generates dynamic email addresses for a user 1002, with the relationship between the user and the person sending that user email encoded in the recipient's address. Email blocking may utilize a DigitalMe™ module on an email server that maps email addresses to DigitalMe™ names, the user-owned Profile access inherent in the DigitalMe™ technology, and separate mailboxes for each sender within an in-box.

For instance, if the recipient/user's conventional email address is "Russ@Domain.com", then the dynamic address for mail sent to the user Russ through the DigitalMe server may take the form "Russ<relationship>@digitalme.com", where <relationship> is a set of dynamically generated characters based on the user Russ's stated relationship to the sender, as reflected in the user's DigitalMe™ Contact List 402.

Mail from specific senders or groups of senders can then be filtered out by the module 4312 on the DigitalMe™ server or like, if the user Russ so desires. A valid <relationship> text is preferably difficult to guess, so unwanted email cannot evade the filter. Even if a proper relationship was guessed, the sender's email address can be verified through the relationship with the sender. This relationship contains the email address of the sender. This prevents someone from guessing or copying the address and using it.

Also, the <relationship> can be used to determine who gave the user's email address to the sender, if the email is sent to Russ by some third party instead of the person designated in the DigitalMe™ Contact list 402 for Russ and the <relationship>.

In one embodiment, the <relationship> is four randomly generated characters whose uniqueness within the context of the recipient/user's relationships is verified by the system. If periods are used as separators, and Fred has been granted email rights by Russ, then Fred could see something like "Russ.xqkm@Domain.com" as Russ's email address. Some embodiments of the system use groups to define Russ's contacts, and embed the group name in the email address. In this case, Fred could see something like "Russ.friends.xqkm@Domain.com" as Russ's email address. The characters "xqkm" are randomly generated, and their uniqueness within the "Russ" context, or within the "Russ.friends" context, respectively, is verified by searching the other contact Profiles in the Russ Profiles subtree, or the Russ friend Profiles subtree, respectively.

If Russ turns on the "email tracking" feature, the module 4312 uses the characters "xqkm" and other <relationship> characters to determine the sender's relationship with Russ by checking Russ's Profiles, and then the system allows or denies passage of the message accordingly.

Web Publishing Resource Management

A filesystem conventionally enforces access controls on users who are accessing files locally or remotely. A directory service, such as Novell's NDS directory service, is also known for its ability to enforce access controls. The DigitalMe™ service or the like provided, for instance, by Novell, defines user Profiles 300, and allows users 1002 to manage those Profiles. For instance, a DigitalMe™ user can specify that different people will see different Profiles, so that a friend sees a home telephone number where a business contact only sees a work telephone number.

In some embodiments this resource management goes further, by providing code 4314 which permits people 1002 to control which of their published Web pages are seen by particular viewers or groups of viewers. With a Web publishing resource manager 4314, a user 1002 can specify which portions of Web information published by the user are seen by which other persons and/or software agents. The granularity for the enforcement of access rights, and the type of rights (e.g., read-only or read/write), each depend in part on the underlying directory service and/or filesystem that contains the published information and in part of the user's DigitalMe™ (or similar service) Profile 300. For instance, a user might specify that certain Web pages can be viewed only by people who are listed in the user's DigitalMe™ Contact list 402 under "friends". Other pages might be open to access by anyone, provided they are somewhere in the user's DigitalMe™ Contact list. Still other pages might be open to access by any member of the public, regardless of whether they are listed in the user's Contact list.

Although FIG. 43 shows several modules just discussed, it will be appreciated that particular embodiments of the invention may omit one or more of the illustrated components. For instance, a given embodiment may support a web switchboard without using embossed icons, while another embodiment supports embossed icons and email blocking but does not include a web switchboard or a web publishing manager. More generally, components shown in one or more Figures may be omitted from a given embodiment, repeated, combined or grouped differently, located on different machines, named differently, and/or supplemented by familiar tools and techniques not expressly shown, to the extent that doing so does not prevent use of the claimed invention. Method steps discussed herein may likewise be omitted, repeated, performed concurrently or in different orders, or otherwise differ from the specific illustrations and discussions provided here, so long as doing so does not prevent use of the claimed invention.

Summary

The present invention provides a basic architecture for managing digital identity information in a network such as the World Wide Web. The managed information may include, for instance, user login information, addresses and other contact information, and/or credit card numbers and other private financial information. A user of the architecture can organize his or her information into one or more profiles which reflect the nature of different relationships between the user and other entities, and grant or deny each entity access to a given profile. The invention also provides a wide variety of enhancements which may be provided through the architecture, such as tools for filtering email, controlling access to user web pages, locating other users and making one's own location known, browsing or mailing anonymously, filling in web forms automatically with information already provided once by hand, logging in automatically, securely logging in to multiple sites with a single password and doing so from any machine on the network, and other enhancements. The invention may be implemented using Novell directory services software and other software which is either standard in the industry or readily implemented in view of the present teachings.

Although particular embodiments such as method embodiments or system embodiments are expressly described herein, it will be appreciated that other embodiments such as signals configuring a memory, apparatus, and article embodiments may also be formed according to the present invention. Unless otherwise expressly indicated, the description herein of one type of embodiment of the present invention therefore extends to corresponding other types of embodiments to the extent deemed reasonable; this prevents unnecessary repetition.

As used herein, terms such as "a" and "the" and item designations such as "client" are generally inclusive of one or more of the indicated item. In particular, in the claims a reference to an item generally means at least one such item is required.

The invention may be embodied in other specific forms without departing from its essential characteristics. The described embodiments are to be considered in all respects only as illustrative and not restrictive. Any explanations provided herein of the principles employed in the present invention, the design goals of particular embodiments, and the implementation details of the DigitalMe™ system, are illustrative only. Headings are for convenience only. The scope of the invention is, therefore, indicated by the appended claims rather than by the foregoing description. All changes which come within the meaning and range of equivalency of the claims are to be embraced within their scope.

What is claimed and desired to be secured by patent is:

1. In a computer operating environment, a method for managing digital identity information, comprising the computer-assisted steps of:

obtaining from a user first digital identity information of the user;

causing the first digital identity information to be placed in a first profile in a database;

obtaining from the user second digital identity information of the user;

causing the second digital identity information to be placed in a second profile in the database, both the first and second profiles existing in a safe object of the database, the safe object existing in a vault object of the database;

providing the user with access rights to the digital identity information of the first and second profiles in the safe object to allow the user to update the digital identity information while also (1) wholly denying any system administrator of the computer operating environment access rights to the digital identity information of the first and second profiles in the safe object and (2) granting at least one system administrator access rights to the vault object to manage the safe object in the vault; and at the exclusion of the any system administrator, providing an entity other than the user with read-only access to one of the first and second profiles of the user in response to instructions from the user.

2. The method of claim 1, wherein the method further comprises creating a contact list for the user in response to instructions from the user.

3. The method of claim 1, wherein the method further comprises automatically logging the user into a web site using at least part of the digital identity information from a profile of the user.

4. The method of claim 1, wherein the method further comprises automatically filling in a web form using at least part of the digital identity information from a profile of the user.

5. The method of claim 1, wherein the method further comprises capturing login information of the user for a web site and storing at least part of the captured information in the database.

6. The method of claim 1, wherein the step of providing the entity other than the user with read-only access right comprises granting multiple access rights to multiple other entities to read the first and second digital identity information of the first and second profiles in the safe object while still denying the any system administrator access rights to the digital identity information while still granting the at least one system administrator access rights to the vault object to manage the safe object in the vault.

7. The method of claim 1, wherein the method further comprises revoking access to a profile of the user and subsequently denying read-only access which was previously allowed.

8. The method of claim 1, wherein the method further comprises restricting access to web pages of the user based at least in part on a profile of the user.

9. The method of claim 1, wherein the method further comprises encoding contact relationship information in an email address of the user.

10. The method of claim 1, wherein the method further comprises using a profile to filter email sent to the user.

11. A configured computer-readable storage medium for managing digital identity information in a computer operating environment having multiple users, the storage medium configured to perform the steps of:

obtaining from a user first digital identity information of the user;

causing the first digital identity information to be placed in a first profile in a memory configured as a database;

obtaining from the user second digital identity information of the user;

causing the second digital identity information to be placed in a second profile in the database, both the first and second profiles existing in a safe object of the database, the safe object existing in a vault object of the database;

providing the user with access rights to the digital identity information of the first and second profiles in the safe object to allow the user to update the digital identity information while also (1) wholly denying any system administrator of the computer operating environment access rights to the digital identity information of the first and second profiles in the safe object and (2) granting at least one system administrator access rights to the vault object to manage the safe object in the vault; and providing an entity other than the user with read-only access to one of the first and second profiles of the user, the entity also having at least one profile of underlying digital identity information in at least one safe object in the vault of the database with access rights in the underlying digital identity information provided exclusively to the entity other than the user while at the same time the at least one system administrator is granted access rights to the vault object to manage the at least one safe object.

12. The configured storage medium of claim 11, wherein the method further comprises creating a contact list for the user in response to instructions from the user.

13. The configured storage medium of claim 11, wherein the method further comprises automatically logging the user into a web site using at least part of the digital identity information from a profile of the user.

14. The configured storage medium of claim 11, wherein the method further comprises automatically filling in a web form using at least part of the digital identity information from a profile of the user.

15. The configured storage medium of claim 11, wherein the method further comprises restricting access to web pages of the user based at least in part on a profile of the user.

16. The configured storage medium of claim 11, wherein the method further comprises encoding contact relationship information in an email address of the user.

17. The configured storage medium of claim 11, wherein the method further comprises using a profile to filter email sent to the user.

* * * * *